US008202406B2

(12) United States Patent
Tsukuda et al.

(10) Patent No.: US 8,202,406 B2
(45) Date of Patent: Jun. 19, 2012

(54) POROUS SHEET, SEPARATOR FOR ELECTROCHEMICAL ELEMENT, AND METHOD FOR MANUFACTURING POROUS SHEET

(75) Inventors: Takahiro Tsukuda, Tokyo (JP); Masatoshi Midorikawa, Tokyo (JP); Tomohiro Sato, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 275 days.

(21) Appl. No.: 12/664,578

(22) PCT Filed: Jun. 13, 2008

(86) PCT No.: PCT/JP2008/060824

§ 371 (c)(1),
(2), (4) Date: Dec. 14, 2009

(87) PCT Pub. No.: WO2008/153117

PCT Pub. Date: Dec. 18, 2008

(65) Prior Publication Data

US 2010/0252426 A1 Oct. 7, 2010

(30) Foreign Application Priority Data

Jun. 15, 2007 (JP) ................................ 2007-159027

(51) Int. Cl.

| | |
|---|---|
| ***C25B 13/02*** | (2006.01) |
| ***C25B 13/04*** | (2006.01) |
| ***C25B 13/08*** | (2006.01) |
| ***C25C 7/04*** | (2006.01) |
| ***H01M 2/14*** | (2006.01) |
| ***H01M 2/16*** | (2006.01) |

(52) U.S. Cl. ........ 204/295; 204/296; 429/129; 429/247; 429/248; 429/249; 429/250

(58) Field of Classification Search .................. 204/295, 204/296; 429/129, 247, 248, 249, 250
See application file for complete search history.

(56) References Cited

U.S. PATENT DOCUMENTS

| | | | | |
|---|---|---|---|---|
| 6,310,763 | B1 | 10/2001 | Suhara et al. | |
| 6,905,798 | B2 * | 6/2005 | Tsukuda et al. .............. | 429/249 |
| 2001/0006452 | A1 | 7/2001 | Kimura et al. | |
| 2003/0180622 | A1 * | 9/2003 | Tsukuda et al. .............. | 429/249 |
| 2006/0167091 | A1 | 7/2006 | Ishii et al. | |
| 2007/0287062 | A1 * | 12/2007 | Tsukuda et al. .............. | 429/129 |
| 2010/0151333 | A1 * | 6/2010 | Nakamori et al. ............ | 429/249 |

FOREIGN PATENT DOCUMENTS

| | | | |
|---|---|---|---|
| JP | 5-267103 | A | 10/1993 |
| JP | 11-168033 | A | 6/1999 |
| JP | 2000-3834 | A | 1/2000 |
| JP | 2001-244150 | A | 9/2001 |
| JP | 2005-42235 | A | 2/2005 |
| JP | 2006-100512 | A | 4/2006 |
| JP | 2007-125821 | A | 5/2007 |
| WO | WO-2005/101432 | A1 | 10/2005 |

* cited by examiner

*Primary Examiner* — Bruce Bell
(74) *Attorney, Agent, or Firm* — Birch, Stewart, Kolasch & Birch, LLP

(57) ABSTRACT

A porous sheet which has good balance between electrolytic solution permeability and dry-up resistance, is superior in high-rate property, and is suitable for a separator for an electrochemical element, and a manufacturing method thereof are provided.

The present invention relates to a porous sheet comprising a porous substrate containing non-fibrillar fibers having an average fiber diameter of 0.01-10 μm and a net-like structural body composed of a polymer, the net-like structural body having penetrating pores with a pore diameter of 0.01-10 μm, wherein the net-like structural body is present at the surface and at the internal of the porous substrate and the non-fibrillar fibers having an average fiber diameter of 0.01-10 μm and the net-like structural body are entangled; to a separator for an electrochemical element comprising the porous sheet; and to a method for manufacturing the porous sheet.

15 Claims, 7 Drawing Sheets

POROUS SHEET, SEPARATOR FOR ELECTROCHEMICAL ELEMENT, AND METHOD FOR MANUFACTURING POROUS SHEET

FIELD OF THE INVENTION

The present invention relates to a porous sheet suitable as a separator for an electrochemical element such as an electrical double layer capacitor, an electrolytic capacitor, a solid electrolytic capacitor, a lithium ion battery, a polyacene battery, an organic radical battery or the like, a separator for an electrochemical element comprising the porous sheet, and a manufacturing method thereof.

BACKGROUND OF THE INVENTION

Conventionally, as a separator for an electrochemical element such as an electrical double layer capacitor, an electrolytic capacitor, a solid electrolytic capacitor or the like, a paper separator comprising mainly of fibers which is obtained by subjecting solvent-spun cellulose fibers or regenerated cellulose fibers under beating process (for example, see Patent Documents 1-3) has been used. Recently, with respect to the electrical double layer capacitor, increase in electrostatic capacity and voltage are advancing, and thus usage in application which requires high energy or high output, such as auxiliary power for automobile and railroad vehicle, is expected. Conventional paper separator is extremely weak in puncture strength when it is in a state impregnated with electrolytic solution. Therefore, for example, during the manufacture of a stack-up type electrical double layer capacitor, the paper separator tears or becomes punctured in a pressure applying process, thus resulting in a problematic high percentage of defective products. In addition, when exposed to high voltage of 3.0 V or higher, capacity decreases immediately since the paper separator goes under oxidation degradation, and thus the lifetime of an electrical double layer capacitor using a paper separator is disadvantageously short.

As a separator other than the paper separator, a separator for electrical double layer capacitor which is made by forming porous layer of an aromatic polyamide onto both surfaces of a non-woven fabric, the main structuring material of the fabric being fibers comprising a thermoplastic resin with a melting point of 220° C. or higher, is disclosed (for example, see Patent Document 4). Since this separator has the porous layer of an aromatic polyamide formed onto both surfaces of the non-woven fabric, there is a disadvantage that electrolytic solution permeability is poor. In addition, regarding this separator, since the area in which the aromatic polyamide porous layer, which is an insulator, comes in contact with an electrode is large, the contact resistance between the aromatic polyamide porous layer and the electrode becomes high, resulting in a problem that the internal resistance of the electrical double layer capacitor is high. Further, the manufacturing method for a separator disclosed in Patent Document 4 comprises coating both surfaces of a non-woven fabric with a polymer solution mainly containing an aromatic polyamide and an amide solvent , followed by formation of a solid film by immersing the non-woven fabric into an amide solidifying solution, and then allowing formation of a porous layer of the aromatic polyamide onto both surfaces of the non-woven fabric by immersing the non-woven fabric into a water bath. Therefore, in some cases, pores were not provided in a sufficient manner, which results in a disadvantage that the aromatic polyamide film would remain. In addition, when a polymer other than the aromatic polyamide, such as polyethersulfone or polyamide imide, is used, problems would arise since the precipitating polymer would not become porous but rather form a film, and the film would have a wrinkled form. In other words, this manufacturing method for the separator cannot be applied to polymers other than the aromatic polyamide. Here, the aromatic polyamide mentioned in Patent Document 4 is obtained by copolymerizing a wholly aromatic polyamide with an aliphatic diamine or an aliphatic dicarboxylic acid, in a ratio of 20 mol % or less with respect to the repeating unit of the wholly aromatic polyamide.

As a separator for an electrical double layer capacitor other than those described above, a separator for an electrical double layer capacitor comprising a fiber sheet containing fibers having fibril and polyester fibers having a fineness of 0.45 dtex or less is disclosed (for example, see Patent Document 5). When the thickness of this separator is decreased, especially when it is less than 40 μm, internal short circuit caused by pinhole and increase in current leakage would occur, which are regarded as problems.

As a battery separator, a combined porous film obtained by integrating a porous film A comprising a resin having a melting point of 150° C. or lower, with a porous film B comprising a resin having a glass transition temperature of 150° C. or higher, is proposed (for example, see Patent Document 6). Regarding this combined porous film, average pore diameter of the porous film A is extremely small as 0.01-0.1 μm. Therefore, in essence, the porous film B is hardly formed in the void of the porous film A, which causes a disadvantage that the porous film A and the porous film B are prone to interlayer delamination. In addition, the air permeability of the combined porous film is too low; that is, the air penetrating property is extremely poor. Therefore, when this combined porous film is used as a separator for an electrochemical element such as an electrical double layer capacitor or battery, the internal resistance of these electrochemical elements would become extremely high, which is regarded as a problem. Further, during usage, an electrolytic solution gradually leaks out from the separator, resulting in dry-up of the separator, which would cause the internal resistance of the electrochemical element to rise gradually, reducing capacity and shortening lifetime of the electrochemical element.

As a separator for a lithium ion battery, which is one type of an electrochemical element, a porous film is generally used. Since fine pores of the porous film is very small, an electrolytic solution would hardly permeate when the electrolytic solution such as an ionic liquid has a high viscosity, which is regarded as a problem. On the other hand, when the viscosity of the electrolytic solution is low, dry-up of the separator would occur, which would raise the internal resistance of the lithium ion battery and shorten the lifetime of the lithium ion battery. In addition, there was a problem that the high-rate property is poor, and that the capacity decreases rapidly when electrical discharge is conducted with high current.

Patent Document 1: Japanese Laid-open Patent [Kokai] Publication No. Hei 5-267103
Patent Document 2: Japanese Laid-open Patent [Kokai] Publication No. Hei 11-168033
Patent Document 3: Japanese Laid-open Patent [Kokai] Publication No. 2000-3834
Patent Document 4: Japanese Laid-open Patent [Kokai] Publication No. 2006-100512
Patent Document 5: Japanese Laid-open Patent [Kokai] Publication No. 2001-244150
Patent Document 6: Japanese Laid-open Patent [Kokai] Publication No. 2007-125821

SUMMARY OF THE INVENTION

By taking the afore-mentioned circumstances into consideration, an object of the present invention is to provide a porous sheet which is suitable as a separator for an electrochemical element which elongates the lifetime of the electrochemical element, thin, has good balance between electrolytic solution permeability and dry-up resistance, and is excellent in high-rate property, and to provide a separator for an electrochemical element comprising the porous sheet. In addition, it is also an object to provide a method for manufacturing a porous sheet, which does not encounter problems such as formation of film and wrinkles, even in a case where a polymer other than an aromatic polyamide or a particularly special aromatic polyamide is used.

The inventors of the present invention conducted extensive studies to solve the problems, and found out that a porous sheet having a structural body with a special form formed at the surface and at the internal of a porous substrate containing fibers having a fiber diameter in a particular range, is suitable for the separator for an electrochemical element. Further, by elaborating the method to integrate the structural body with the special form and the porous substrate, the inventors found out that a porous sheet which is suitable as a separator for an electrochemical element which elongates the lifetime of the electrochemical element, thin, has good balance between electrolytic solution permeability and dry-up resistance, and is excellent in high-rate property, can be manufactured efficiently. In addition, the inventors found out that a porous sheet which does not encounter formation of film and wrinkles, even in a case where a polymer other than an aromatic polyamide or a particularly special aromatic polyamide is used can be manufactured, thereby leading to completion of the invention.

That is, the present invention is a porous sheet comprising a porous substrate containing non-fibrillar fibers having an average fiber diameter of 0.01-10 μm and a net-like structural body composed of a polymer, the net-like structural body having penetrating pores with a pore diameter of 0.01-10 μm, wherein the net-like structural body is present at the surface and at the internal of the porous substrate, and the non-fibrillar fibers having an average fiber diameter of 0.01-10 μm and the net-like structural body are entangled.

Preferably, regarding the porous sheet of the present invention, the net-like structural body has 20 or more penetrating pores, in a square region having 10-fold length of the average pore diameter of the penetrating pores as the side of the square.

Preferably, regarding the porous sheet of the present invention, the polymer structuring the net-like structural body is at least one selected from the group consisting of polyamide, polyethersulfone, and polyamide imide.

Preferably, regarding the present invention, the polymer structuring the net-like structural body is polyamide, and the polyamide comprises an aromatic polyamide containing an aromatic diamine derivative unit represented by the following general formula (1), and/or an aromatic dicarboxylic acid derivative unit represented by the following general formula (2):

(1)

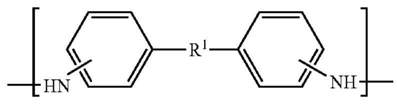

(2)

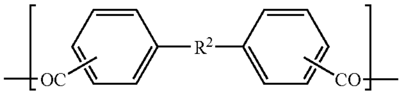

wherein, $R^1$ and $R^2$ independently represent —O—, —NH—, —S—, a sulfonyl group, a carbonyl group, a carbonate group, an urea group, an urethane group, an arylene group, an alkylene group having 1-30 carbons, and an alkenylene group having 2-30 carbons.

In addition, the present invention relates to a separator for an electrochemical element comprising the porous sheet of the present invention.

Further, the present invention relates to a method for manufacturing a porous sheet. A first method for manufacturing the porous sheet according to the present invention comprises a step of coating one surface of a porous substrate containing non-fibrillar fibers having an average fiber diameter of 0.01-10 μm with a polymer solution having an organic solvent as a main medium, and a step of allowing a surface of the porous substrate which is not coated with the polymer solution (also referred to as non-coated surface in the present specification) to come in contact with an aqueous solution so as to allow precipitation of a net-like structural body composed of a polymer which entangles with the non-fibrillar fibers having an average fiber diameter of 0.01-10 μm, at a surface and at an internal of the porous substrate.

A second method for manufacturing the porous sheet according to the present invention comprises a step of coating one surface of a porous substrate containing non-fibrillar fibers having an average fiber diameter of 0.01-10 μm with a polymer solution having an organic solvent as a main medium, and a step of immersing the porous substrate in an aqueous solution, the surface of the porous substrate coated with the polymer solution (hereinafter also referred to as coated surface) facing up, so as to allow precipitation of a net-like structural body composed of a polymer which entangles with the non-fibrillar fibers having an average fiber diameter of 0.01-10 μm, at a surface and at an internal of the porous substrate.

A third method for manufacturing the porous sheet according to the present invention comprises a step of laminating a porous substrate containing non-fibrillar fibers having an average fiber diameter of 0.01-10 μm and a porous support, a step of impregnating the laminated body of the porous substrate and the porous support with a polymer solution having an organic solvent as the main medium, a step of allowing a surface of the porous support to come in contact with an aqueous solution so as to allow precipitation of a net-like structural body composed of a polymer which entangles with the non-fibrillar fibers having an average fiber diameter of 0.01-10 μm, at a surface and at an internal of the porous substrate, and a step of peeling off the porous support from the porous substrate.

The porous sheet of the present invention comprises a porous substrate containing non-fibrillar fibers having an average fiber diameter of 0.01-10 μm and a net-like structural body composed of a polymer, the net-like structural body having penetrating pores with a pore diameter of 0.01-10 μm, wherein the net-like structural body is present at the surface and at the internal of the porous substrate, and the non-fibrillar fibers having an average fiber diameter of 0.01-10 μm and the net-like structural body are entangled. The non-fibrillar fibers having an average fiber diameter of 0.01-10 μm functions as the skeleton portion of the porous sheet, and provides strength and electrolytic solution permeability to the porous sheet. By the addition of the net-like structural body to this skeleton portion, effects such as improvement in puncture strength when it is in a state impregnated with the electrolytic solution, suppression of electrolytic solution leakage, that is, dry-up resistance, can be obtained. Therefore, the porous sheet according to the present invention is suitable as a separator for an electrochemical element, can decrease fraction defective of manufacture regarding the electrochemical element, can suppress increase in current leakage and internal resistance, is excellent in high-rate property, and can elongate lifetime of the electrochemical element. In addition, even in a case where the porous sheet according to the present invention contains cellulose which is weak against high voltage, the presence of the net-like structural body gives an effect to suppress degradation of cellulose . Accordingly, lifetime of the electrochemical element can be elongated even when it is used at high voltage.

With respect to the porous sheet according to the present invention, since the non-fibrillar fibers having an average fiber diameter of 0.01-10 μm and the net-like structural body are entangled, the net-like structural body does not separate nor breakup from the porous substrate. Therefore, even when the surface of the porous sheet is scratched by a finger or a device when handling the porous sheet or during production of an electrochemical element, the porous sheet does not become fluffy and interlayer delamination does not occur, which enables to avoid obstacles.

In addition, according to the manufacturing method for a porous sheet of the present invention, the ratio of the net-like structural body having penetrating pores with an average pore diameter of 0.01-10 μm that accounts for the polymer precipitate can be increased. Therefore, the manufacturing method according to the present invention can efficiently manufacture a porous sheet which is thin and is excellent in electrolytic solution permeability and dry-up resistance. Here, a polymer precipitate means the entire precipitate comprising a polymer that precipitated at the surface and at the internal of the porous substrate, regardless of form, size of penetrating pores, and presence or absence of the penetrating pores.

DETAILED DESCRIPTION OF THE INVENTION

Figure 1:
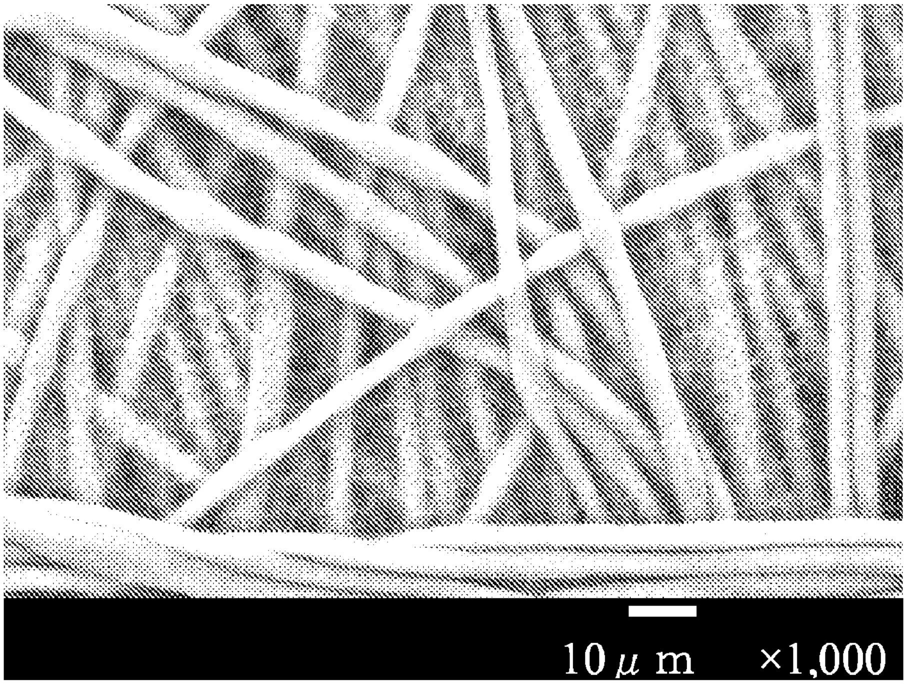
FIG. 1 shows an electron microscope photograph (1000-fold magnification) of a coated surface of a porous sheet 5 prepared in Example 5 of the present invention.

The porous sheet according to the present invention comprises a porous substrate containing non-fibrillar fibers having an average fiber diameter of 0.01-10 μm and a net-like structural body composed of a polymer, the net-like structural body having penetrating pores with a pore diameter of 0.01-10 μm, wherein the net-like structural body is present at the surface and at the internal of the porous substrate. Hereinafter, unless otherwise indicated, “porous substrate” is a “porous substrate containing non-fibrillar fibers having an average fiber diameter of 0.01-10 μm”.

As the non-fibrillar fibers having an average fiber diameter of 0.01-10 μm, non-fibrillar fibers comprising organic fibers or inorganic fibers can be mentioned. Examples of the organic fibers include fibers made from a resin such as polyethylene terephthalate, polybutylene terephthalate and derivatives thereof, polyesters such as aromatic polyester and wholly aromatic polyester, polyolefin, acryl, polyacetal, polycarbonate, aliphatic polyketone, aromatic polyketone, aliphatic polyamide, aromatic polyamide, wholly aromatic polyamide, polyimide, polyamide imide, polyphenylenesulfide, polybenzoimidazole, polyether ether ketone, polyether sulfone, poly (para-phenylenebenzobistiazole), poly(para-phenylene-2,6-benzobisoxazole), polyvinylidene fluoride, polytetrafluoroethylene, polyvinyl alcohol, polyurethane and polyvinyl chloride, as well as cellulose fibers.

Among these organic fibers, polyester, wholly aromatic polyamide, polyimide, polyphenylenesulfide, or polyether ether ketone are preferable since they are excellent in solvent resistance and heat resistance, as well as manufacturing stability of the porous substrate. In addition, it is also preferable that the porous substrate contains polyolefme fibers. This is because a function to break the current between the positive and negative electrodes when the internal temperature of the electrochemical element reaches or becomes higher than the melting point of the polyolefm fibers can be provided, which is, in other words, a shut down function.

As the non-fibrillar fibers other than the organic fibers, inorganic fibers including glass, alumina, silica, zirconia, silicon carbide, and various ceramics can be mentioned.

Non-fibrillar fibers are fibers that are not branched. Non-fibrillar fibers manufactured by methods such as melt spinning, solution spinning, liquid crystal spinning, flash spinning, electrospinning, flame elongation method, rotary method or the like, can be used. The non-fibrillar fibers can be used alone, or can be used by combining 2 or more types. The cross-sectional shape of the non-fibrillar fibers may be any one of circle, flat or polygonal.

As used herein, "aromatic" as in aromatic polyamide and aromatic polyester refers to, unlike the "wholly aromatic" which is structured only by an aromatic skeleton, a substance having an aliphatic chain for example, in part of or all of the main chain. The wholly aromatic polyamide may be either one of a para-form or a meta-form. Poly(para-phenylenebenzobisthiazole) may be either one of a trans-form or a cis-form.

Acryl as used in the present invention refers to the one composed of 100% acrylonitrile polymer, and the one which is obtained by copolymerization of the acrylonitrile with (meth)acrylic acid derivatives such as acrylic acid, methacrylic acid, acrylic acid ester, methacrylic acid ester or the like, or vinyl acetate. As the cellulose fibers, solution spinning cellulose, regenerated cellulose, hemp, parenchyma cell fibers or the like can be mentioned. The parenchyma cell fibers are fibers having cellulose as a main component and is insoluble in water, wherein the cellulose is obtained by alkaline treatment or the like of a portion mainly composed of a parenchyma cell present in stem, leaf, root, fruit or the like of a plant.

Preferably, the non-fibrillar fibers having an average fiber diameter of 0.01-10 μm has a fiber length of 1-15 mm, more preferably 2-6 mm When the fiber length is shorter than 1 mm, it may fall off from the porous sheet. When it is longer than 15 mm, the fibers is prone to tangle and form lumps, resulting in cases where unevenness in thickness may be observed. When the average fiber diameter of the non-fibrillar fibers is less than 0.01 μm, strength of one strand of the non-fibrillar fibers is weak, and thus may cause a case where the strength of the porous substrate is insufficient. When it is larger than 10 μm, it becomes difficult to make the thickness of the porous substrate thin. More preferably, the average fiber diameter of the non-fibrillar fibers is 0.1-10 μm.

The content of the non-fibrillar fibers having an average fiber diameter of 0.01-10 μm in the porous substrate is preferably 5-100% by mass. When the content of the non-fibrillar fibers having an average fiber diameter of 0.01-10 μm in the porous substrate is less than 5% by mass, and the non-fibrillar fibers having an average fiber diameter of less than 0.01 μm is a major component, air-gaps between the fibers formed by the non-fibrillar fibers becomes small, which makes the formation of the net-like structural body at the air-gaps between the fibers difficult. This results in occurrence of the net-like structural body covering the surface of the porous substrate, and thus the electrolytic solution permeability tends to become insufficient. When the content of the non-fibrillar fibers having an average fiber diameter of 0.01-10 μm in the porous substrate is less than 5% by mass, and the non-fibrillar fibers having an average fiber diameter of larger than 10 μm is a major component, air-gaps between the fibers formed by the non-fibrillar fibers becomes too large, and thus the net-like structural body easily drops out. In addition, the net-like structural body may be formed unevenly, and there is a tendency that the content of the net-like structural body becomes insufficient.

Preferably, the maximum pore diameter of the porous substrate measured by a bubble point method is 0.1-80 μm, more preferably 0.5-50 μm. The basis weight of the porous substrate is preferably 5-40 $g/m^2$, more preferably 8-20 $g/m^2$. When the basis weight of the porous substrate is less than 5 $g/m^2$, the strength of the porous substrate tends to be insufficient, causing cases where the impregnating property and the coating property of the polymer solution when the net-like structural body is formed are regarded problematic. When the basis weight exceeds 40 $g/m^2$, it would become difficult to make the thickness of the porous sheet thin.

The porous substrate may contain fibers other than the non-fibrillar fibers having an average fiber diameter of 0.01-10 μm. In particular, pulp fibers, fibrillar fibers, fibrid, non-fibrillar fibers having an average fiber diameter of less than 0.01 μm, non-fibrillar fibers having a fiber diameter of larger than 10 μm or the like can be mentioned. As these fibers, fibers composed of a resin exemplified for the non-fibrillar fibers having an average fiber diameter of 0.01-10 μm can be mentioned. In addition, solution spinning cellulose, regenerated cellulose, wood fibers, linter, lint, hemp, parenchyma cell fibers or the like can also be mentioned. With respect to the pulp fibers or the fibrillar fibers, it is preferable that Canadian Standard Freeness is in the range of 0-500 ml, and the mass average fiber length is in the range of 0.2-2 mm As the pulp fibers or the fibrillar fibers, cellulose is preferable since it can be made evenly fine easily.

The fibrillar fibers refers to fibers which is a fiber-like matter having a portion that is split extremely finely in a direction parallel to mainly the fiber axis, whilst at least a part of the fiber having a fiber diameter of 1 μm or less. The fibrillar fiber is manufactured by using a refiner, a beater, a mill, a grinding apparatus, a rotary blade homogenizer which applies a shear force with a high speed rotary blade, a double-cylinder type high speed homogenizer which generates a shear force between a cylinder-shaped inner blade which rotates at a high speed and a fixed outer blade, an ultrasonic crushing machine which achieves refinement by the impact of ultrasonic wave, a high pressure homogenizer which applies a shear force and a cleavage force to the fibers by applying at least 13 MPa of pressure difference to the fiber suspension and allowing the suspension go through a small diameter orifice so as to gain high speed, and then allowing it to collide and sharply reduce the speed. The fibrid means a fiber-like or a film-like small particle which is not granular nor rigid. Fibrid can be manufactured by subjecting a polymer solution to shear precipitation in a poor solvent (coagulating bath), as defined in U.S. Pat. Nos. 2,999,788 and 3,018,091.

Pulp fibers, fibrillar fibers and fibrid are preferable since they have an effect to make the air permeability of the porous substrate easily adjustable and an effect to suppress falling off of the net-like structural body. The total content of pulp fibers, fibrillar fibers And fibrid preferably accounts for 0-40% by mass of the porous substrate, and more preferably accounts for 1-20% by mass. When the total content of pulp fibers, fibrillar fibers and fibrid is more than 40% by mass, the air permeability and electrolytic solution permeability of the porous sheet tend to become insufficient.

The porous substrate according to the present invention can be manufactured by a wet paper-making method, an electro-spinning method, a melt blown method, a flash spinning method or a combination of these. The porous substrate is subject to a calendaring process, a heat calendaring process, a heat process or the like, if necessary.

The net-like structural body refers to a structural body that is composed of a polymer, having air-gaps comprising penetrating pores formed successively, and is spread in a net-like form with thickness, wherein the plane area percentage of the penetrating pores accounts for 10% or more of a plane area of the entire net-like structural body. In order to obtain the plane area percentage of the penetrating pores accounting for the plane area of the entire net-like structural body, an electron microscope photograph of the net-like structural body is taken first, and then the average pore diameter of the penetrating pores are calculated. The average pore diameter of the penetrating pores is an average value of pore diameters of 20 penetrating pores that are selected randomly among the penetrating pores existing in the net-like structural body. Here, the pore diameter means a diameter when the area of the penetrating pore is converted to an area of a perfect circle. The number of the net-like structural body existing in a square region having 10-fold length of the average pore diameter of the penetrating pores as the side of the square is measured, and the number of the penetrating pores is multiplied with the area of the penetrating pore having the average pore diameter to obtain total plane area S3 of penetrating pores. The total plane area S4 of the net-like structural body existing in a square region having 10-fold length of the average pore diameter of the penetrating pores as the side of the square is measured, and S3 is divided by S4 then multiplied with 100 to give the plane area percentage of the penetrating pores accounting for the plane area of the entire net-like structural body. Hereinafter, this value is referred to as "plane area percentage of pore". When the plane area percentage of pore is lower than 10%, there may be cases where the electrolytic solution permeability of the porous sheet becomes poor, and cases where the contact resistance with the electrode becomes high. The penetrating pores of the net-like structural body can be confirmed by observation of an electron microscope photograph taken at 500-fold magnification or higher, preferably at 5000-fold magnification or higher.

The net-like structural body of the present invention has penetrating pores with a pore diameter of 0.01-10 μm. The shape of the penetrating pores of the net-like structural body is circle, flat, polygonal or the like. When the pore diameter of the penetrating pores is smaller than 0.01 μm, there may be cases where the electrolytic solution permeability of the porous sheet becomes poor, and cases where the contact resistance with the electrode becomes high. When the pore diameter of the penetrating pores is larger than 10 μm, there may be cases where strength of the porous sheet and the puncture strength when it is in a state impregnated with the electrolytic solution becomes insufficient, and cases where current leakage increase.

In addition, the net-like structural body has penetrating pores with a pore diameter of 0.01-10 μm, and it is preferable that 20 or more penetrating pores exist in a square region having 10-fold length of the average pore diameter of the penetrating pores as the side of the square, and it is more preferable that 30 or more penetrating pores exist. For example, in a case where the net-like structural body has penetrating pores with an average pore diameter of 1 μm, it is preferable that 20 or more penetrating pores exist in a square region having 10 μm as the side of the square. When the number of penetrating pores that exist in a square region having 10-fold length of the average pore diameter of the penetrating pores as the side of the square is less than 20, there may be cases where the electrolytic solution permeability of the porous sheet becomes poor, and cases where the contact resistance with the electrode becomes high.

The net-like structural body takes forms such as a net-like form, a form resembling a cross-section of a thinly sliced angled loofah, a honey comb form, a spider web form, a sponge-like form or the like, and it may be mono-layered or multi-layered. In addition, there are also cases where it is partially mono-layered and partially multi-layered. The porous sheet of the present invention may include a net-like structural body with different forms and average pore diameter. In addition, the porous sheet of the present invention may include a net-like structural body having penetrating pores with a pore diameter other than 0.01-10 μm.

The net-like structural body according to the present invention is formed by allowing a polymer to precipitate in air-gaps between the fibers, at the surface and at the internal of the porous substrate. Here, since the non-fibrillar fibers having an average fiber diameter of 0.01-10 μm which structure the porous substrate entangle with the net-like structural body, the net-like structural body cannot be physically isolated from the porous sheet. Therefore, the net-like structural body does not separate nor breakup from the porous substrate. Here, entangle means a condition where at least a part of the non-fibrillar fibers are wrapped by the net-like structural body, or a condition where the net-like structural body is entangled with at least a part of the non-fibrillar fibers. With respect to the porous sheet according to the present invention, the net-like structural body needs only to be present partially at the surface and at the internal of the porous substrate, and may for example, be present only at one surface and at the internal of the porous substrate. When the net-like structural body is present at both of the front surface and the back surface of the porous substrate, the area of the net-like structural bodies present at the front surface and at the back surface may be different.

The content of the polymer precipitate based on the porous sheet of the present invention is preferably 1-40% by mass, more preferably 3-30% by mass. When the content of the polymer precipitate is less than 1% by mass, there are cases where puncture strength when the porous sheet is in a state impregnated with the electrolytic solution becomes insufficient, and cases where current leakage becomes large when the porous sheet is used as a separator for an electrochemical element. When the content of the polymer precipitate is more than 40% by mass, there are cases where the electrolytic solution permeability becomes insufficient, and cases where the internal resistance of the electrochemical element becomes high. In addition, the total content of the non-fibrillar fibers having an average fiber diameter of 0.01-10 μm and the polymer precipitate based on the porous sheet of the present invention is preferably 6-100% by mass, more preferably 9-100% by mass, and even more preferably 50-100% by mass. When the total content of the non-fibrillar fibers having an average fiber diameter of 0.01-10 μm and the polymer precipitate is less than 6% by mass, there are cases where the strength of the porous sheet and the puncture strength when it is in a state impregnated with the electrolytic solution become insufficient.

The content of the net-like structural body having penetrating pores with a pore diameter of 0.01-10 μm accounting for the polymer precipitate that is present at the front surface and at the back surface of the porous sheet of the present invention is preferably 50-100%, more preferably 70-100%, when converted to area share. Here, the area share means a value which is obtained by taking an electron microscope photograph of the front surface and the back surface of the porous sheet; then calculating the total area Si of the polymer precipitate that is present in a square region which is 50 μm on a side, the square region being arbitrarily selected for each of the front surface and the back surface of the porous sheet, and the total area S2 of the net-like structural body having penetrating pores with a pore diameter of 0.01-10 μm; and dividing S2 by S1 and then multiplying with 100. When the area share of the net-like structural body is less than 50%, the penetrating pores of the net-like structural body may become smaller than 0.01 μm and a film portion without penetrating pores being punctured may exist, thereby causing cases where the electrolytic solution permeability becomes poor and cases where the contact resistance with the electrode becomes high. On the other hand, the penetrating pores may be larger than 10 μm, and there are cases where strength of the porous sheet and the puncture strength when it is in a state impregnated with the electrolytic solution become insufficient, and there are cases where current leakage becomes large.

The thickness of the net-like structural body is preferably 0.01-10 μm, more preferably 0.1-5 μm. When the thickness of the net-like structural body is less than 0.01 μm, there are cases where the strength of the porous sheet and the puncture strength when it is in a state impregnated with the electrolytic solution become insufficient. When the thickness of the net-like structural body is more than 10 μm, there are cases where the electrolytic solution permeability becomes problematic. The thickness of the net-like structural body can be confirmed by observation of an electron microscope photograph of the surface or the cross-section of the porous sheet taken at 500-fold magnification or higher, preferably at 5000-fold magnification or higher.

In the present invention, as the polymer which composes the net-like structural body, polyamide, polyethersulfone, polyamide imide, polyimide, acryl, polyether ether ketone, polyetherimide, polycarbonate, polyvynilidene fluoride and cellulose can be mentioned. Among these, polyamide, polyethersulfone and polyamide imide are preferable. This is because the effect of polyamide to strengthen the puncture strength when the porous sheet is in a state impregnated with the electrolytic solution is large. Polyethersulfone and polyamide imide are preferable since they have high solubility in organic solvent, can form a net-like structural body easily, and thus can achieve high area share regarding the net-like structural body having penetrating pores with a pore diameter of 0.01-10 μm. Further, polyamide is preferable since it can achieve high plane area percentage of pore regarding the net-like structural body. Here, as the polyamide, aromatic polyamide containing an aromatic diamine derivative unit represented by the following general formula (1) and/or an aromatic dicarboxylic acid derivative unit represented by the following general formula (2) are preferable, since they have high solubility in organic solvent and can achieve high plane area percentage of pore.

(1)

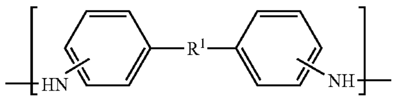

(2)

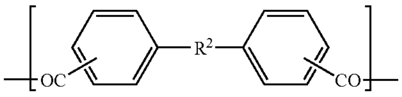

In general formulas (1) and (2), linkage to the phenylene group may be at any one of a para-position, a meta-position or an ortho-position. Here, the para-position is preferable in terms of solubility in an organic solvent, heat resistance of the polymer, capability of controlling the size and number of penetrating pores of a net-like structural body in a desired range, and capability of adjusting the balance between the electrolytic solution permeability and the dry-up resistance. In addition, $R^1$ and $R^2$ each independently represents —O—, —NH—, —S—, a sulfonyl group, a carbonyl group, a carbonate group, an urea group, an urethane group, an arylene group, an alkylene group having 1-30 carbons, and an alkenylene group having 2-30 carbons.

Here, examples of the arylene group may include, but are not limited to, a phenylene group, a biphenylene group, a naphthalene group or the like. These arylene groups may have a substituent group such as a halogen atom, e.g. F, Cl, Br and I; an alkyl group, e.g. $CH_3$—, $C_2H_5$— and $CF_3$—; an alkoxy group, e.g. $CH_3O$—, $C_2H_5O$—, $CF_3O$— and $C_3H_7O$—; an amino group, e.g. $(CH_3)_2N$— and $(C_2H_5)_2N$—; $C_3F_7SO_2$— and a cyano group.

The alkylene group having 1-30 carbons is a straight chain, a branched chain or a cyclic alkylene group; and specific examples thereof may include a methylene group, an ethylene group, a propylene group, a butylene group, a pentylene group, a hexylene group, a heptylene group, an octylene group, a nonylene group, a decylene group, an undecylene group, a dodecylene group, a tridecylene group, a tetradecylene group, a pentadecylene group, a hexadecylene group, a heptadecylene group, an octadecylene group, a nonadecylene group, an icosylene group, an eicosylene group, a henicosylene group, a heneicosylene group, a docosylene group, a tricosylene group, a tetracosylene group, a pentacosylene group, a hexacoxylene group, a heptacosylene group, an octacosylene group, a nonacosylene group, a triacontylene group, a cyclopropylene group, a cyclobutylene group, a cyclopentylene group, a cyclohexylene group, a cycloheptylene group, a cyclooctylene group, a cyclononylene group, a cyclodecylene group, a cycloundecylene group, a cyclododecylene group, a cyclotridecylene group, a cyclotetradecylene group, a cyclopentadecylene group, a cyclohexadecylene group, a cycloheptadecylene group, a cyclooctadecylene group, a cyclononadecylene group, a cycloicosylene group, a cycloeicosylene group, a cyclohenicosylene group, a cycloheneicosylene group, a cyclodocosylene group, a cyclotricosylene group, a cyclotetracosylene group, a cyclopentacosylene group, a cyclohexacosylene group, a cycloheptacosylene group, a cyclooctacosylene group, a cyclononacosylene group, a cyclotriacontylene group or the like.

The alkylene group having 1-30 carbons may have a substituent group such as a halogen atom, e.g. F, Cl, Br and I; an alkyl group, e.g. $CH_3$—, $C_2H_5$— and $CF_3$—; an alkoxy group, e.g. $CH_3O$—, $C_2H_5O$—, $CF_3O$— and $C_3H_7O$—; an amino group, e.g. $(CH_3)_2N$— and $(C_2H_5)_2N$—; $C_3F_7SO_2$—; a cyano group and a thioalkyl group.

The alkenylene group having 2-30 carbons is a straight chain, a branched chain or a cyclic alkenylene group; and specific examples thereof may include an ethynylene group, a propynylene group, a butynylene group, a pentynylene group, a hexynylene group, a heptynylene group, an octynylene group, a nonynylene group, a decynylene group, an undecynylene group, a dodecynylene group, a tridecynylene group, a tetradecynylene group, a pentadecynylene group, a hexadecynylene group, a heptadecynylene group, an octadecynylene group, a nonadecynylene group, an icosynylene group, an eicosynyiene group, a henicosnylene group, a heneicosynylene group, a docosynylene group, a tricosynylene group, a tetracosynylene group, a pentacosynylene group, a hexacosynylene group, a heptacosynylene group, an octacosynylene group, a nonacosynylene group, a triacontynylene group, a cyclopropynylene group, a cyclobutynylene group, a cyclopentynylene group, a cyclohexynylene group, a cycloheptynylene group, a cyclooctynylene group, a cyclononynylene group, a cyclodecynylene group, a cycloundecynylene group, a cyclododecynylene group, cyclotridecynylene group, a cyclotetradecynylene group, a cyclopentadecynylene group, a cyclohexadecynylene group, a cycloheptadecynylene group, a cyclooctadecynylene group, a cyclononadecynylene group, a cycloicosynylene group, a cycloeicosynylene group, a cyclohenicosynylene group, a cycloheneicosynylene group, a cyclodocosynylene group, a cyclotiricosynylene group, a cyclotetracosynylene group, a cyclopentacosynylene group, a cyclohexacosynylene group, a cycloheptacosynylene group, a cyclooctacosynylene group, a cyclononacosynylene group, a cyclotriacontynylene group or the like.

The alkenylene group having 2-30 carbons may have a substituent group such as a halogen atom, e.g. F, Cl, Br and I; an alkyl group, e.g. $CH_3$—, $C_2H_5$— and $CF_3$—; an alkoxy group, e.g. $CH_3O$—, $C_2H_5O$—, $CF_3O$— and $C_3H_7O$—; an amino group, e.g. $(CH_3)_2N$— and $(C_2H_5)_2N$—; $C_3F_7SO_2$—; a cyano group and a thioalkyl group.

In the porous sheet of the present invention, a net-like structural body is present at the surface and at the internal of the porous substrate containing non-fibrillar fibers having an average fiber diameter of 0.01-10 μm, and the non-fibrillar fibers having an average fiber diameter of 0.01-10 μm and the net-like structural body are entangled. In the porous sheet of the present invention, it is preferable that a part of the non-fibrillar fiber having an average fiber diameter of 0.01-10 μm is exposed at the surface of the porous sheet. Here, the condition in which a part of the non-fibrillar fibers having an average fiber diameter of 0.01-10 μm is exposed at the surface of the porous sheet means a condition in which both surfaces of the porous sheet are not completely covered with the net-like structural body, and a part of the non-fibrillar fibers is exposed at the outer-most surface. Determination on whether a part of the non-fibrillar fibers is exposed at the surface of the porous sheet can be confirmed by observation of an electron microscope photograph of the surface or the cross-section of the porous sheet. By allowing a part of the non-fibrillar fibers to be exposed at the surface of the porous sheet, it can attain an advantage of good electrolytic solution permeability, when compared with the case where the surface of the porous sheet is covered with the net-like structural body completely.

Figure 2:
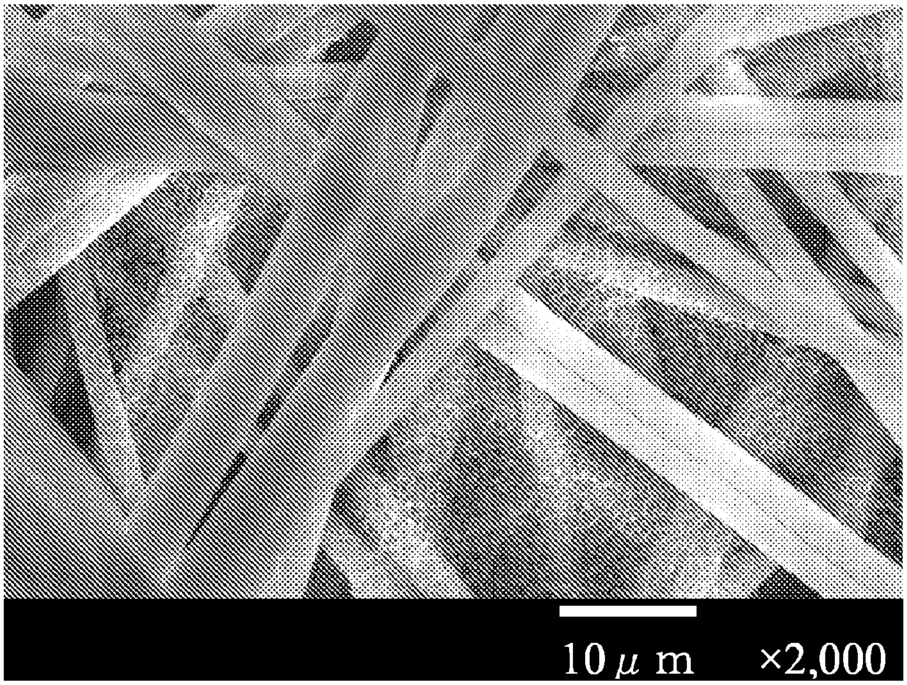
FIG. 2 shows an electron microscope photograph (2000-fold magnification) of a surface of a porous sheet 16 prepared in Example 16 of the present invention.
Figure 3:
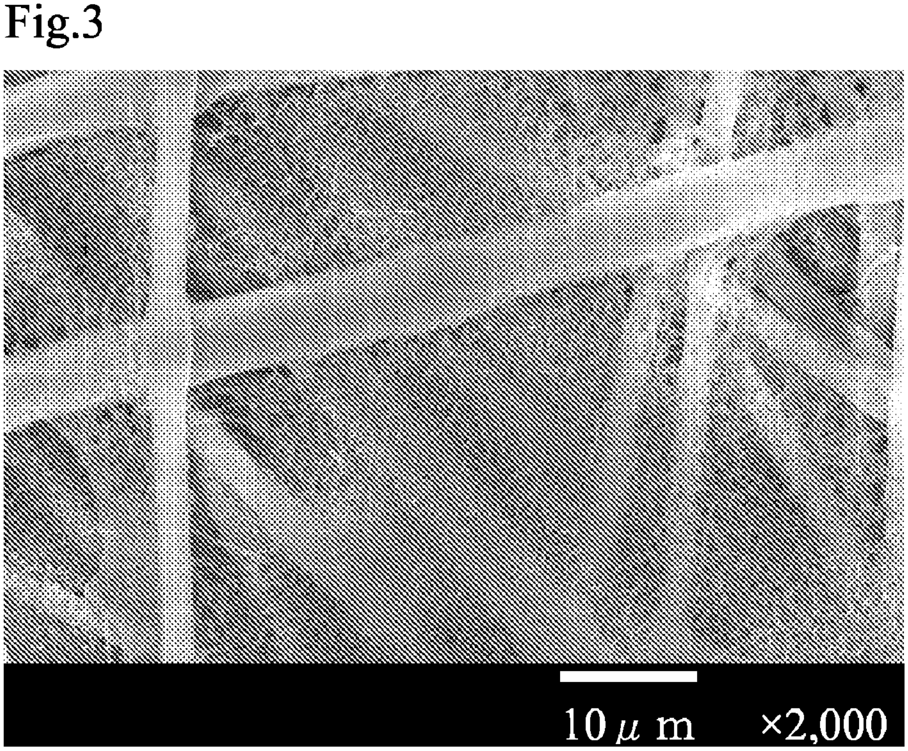
FIG. 3 shows an electron microscope photograph (2000-fold magnification) of a coated surface of a porous sheet 14 prepared in Example 14 of the present invention.
Figure 4:
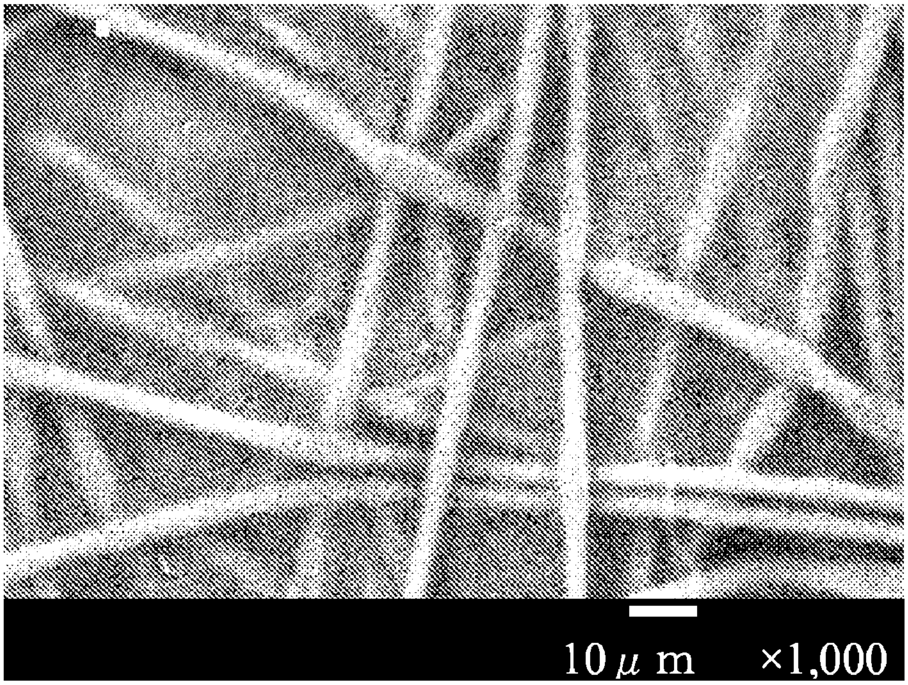
FIG. 4 shows an electron microscope photograph (1000-fold magnification) of a surface of a porous sheet 11 prepared in Example 11 of the present invention.

FIGS. 1-4 are electron microscope photographs of one example of the surface of the porous sheet of the present invention. In FIGS. 1-3, the net-like structural body is formed in a broad area in a condition where the net-like structural body covers over or is buried under the non-fibrillar fibers having an average fiber diameter of 0.01-10 μm. Thus, it can be understood that a part of the non-fibrillar fibers having an average fiber diameter of 0.01-10 μm is exposed at the surface of the porous sheet. In FIG. 4, the net-like structural body covers the surface of the porous substrate completely, and the non-fibrillar fibers having an average fiber diameter of 0.01-10 μm is not exposed at the surface of the porous sheet.

Figure 11:
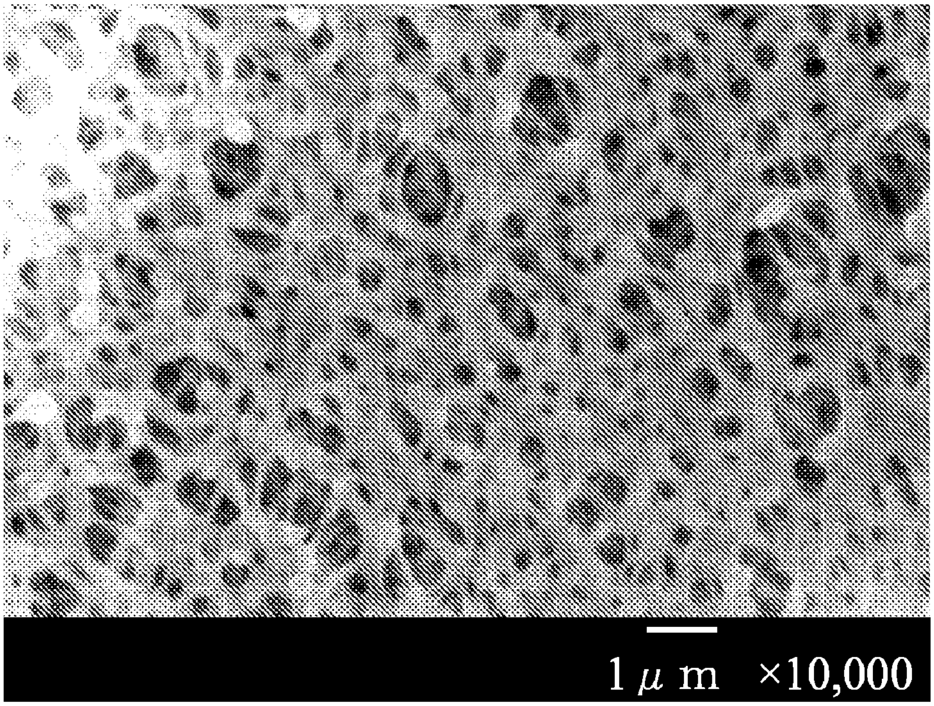
FIG. 11 shows an electron microscope photograph (10000-fold magnification) of a net-like structural body contained in a porous sheet 8 prepared in Example 8 of the present invention.
Figure 12:
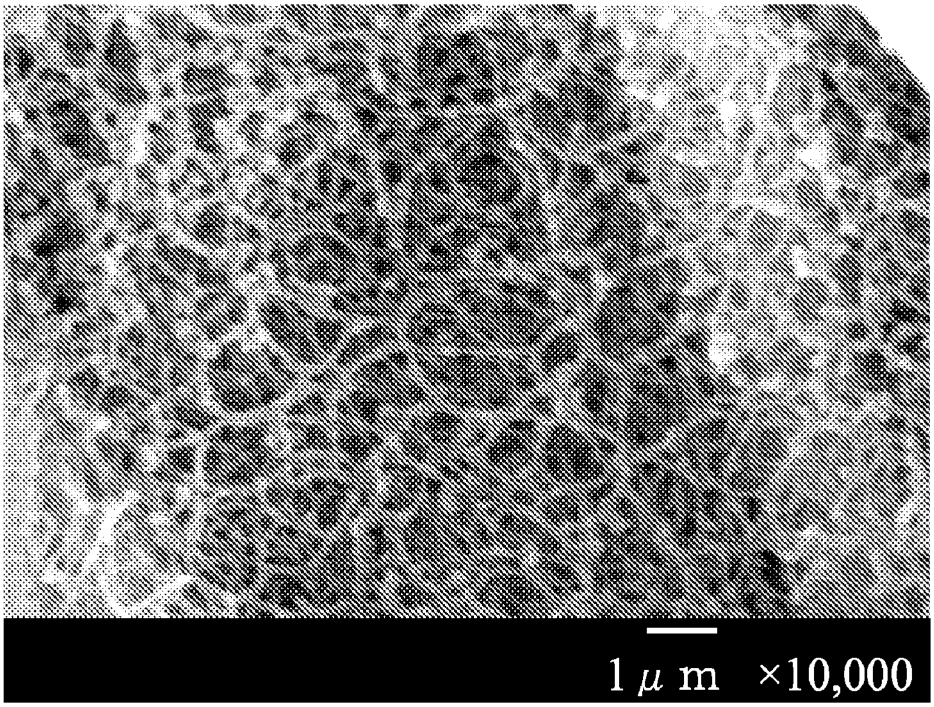
FIG. 12 shows an electron microscope photograph (10000-fold magnification) of a net-like structural body contained in a porous sheet 16 prepared in Example 16 of the present invention.

FIGS. 5-12 are pictures of the net-like structural body that are taken with a high fold magnification. The net-like structural body in FIG. 5 has penetrating pores having a pore diameter of 0.11-1.77 μm and has a multi-layer structure. The net-like structural body in FIG. 6 has polygonal penetrating pores having a pore diameter of 3.33-5.55 μm which are regularly spread as a single layer; and thus has a honey comb-like appearance. The net-like structural body in FIG. 7 has penetrating pores having a pore diameter of 0.08-1.34 μm and has a multi-layer structure. The net-like structural body in FIG. 8 has penetrating pores having a pore diameter of 0.05-1.22 μm and has a multi-layer structure. The net-like structural body in FIG. 9 has penetrating pores having a pore diameter of 0.04-1.16 μm and has a multi-layer structure with a form resembling a cross-section of a thinly sliced angled loofah. The net-like structural body in FIG. 10 has penetrating pores having a pore diameter of 0.13-4.24 μm and has a multi-layer structure. The net-like structural body in FIG. 11 has penetrating pores having a pore diameter of 0.05-1.22 μm and has a multi-layer structure. The net-like structural body in FIG. 12 is the net-like structural body of FIG. 2 which is taken with a high fold magnification, having penetrating pores with a pore diameter of 0.11-2.27 μm and a multi-layer structure.

The net-like structural bodies in FIGS. 1-12 have a plane area percentage of pore of 10% or higher, and have 20 or more penetrating pores in a square region having 10-fold length of the average pore diameter of the penetrating pores as the side of the square.

Figure 13:
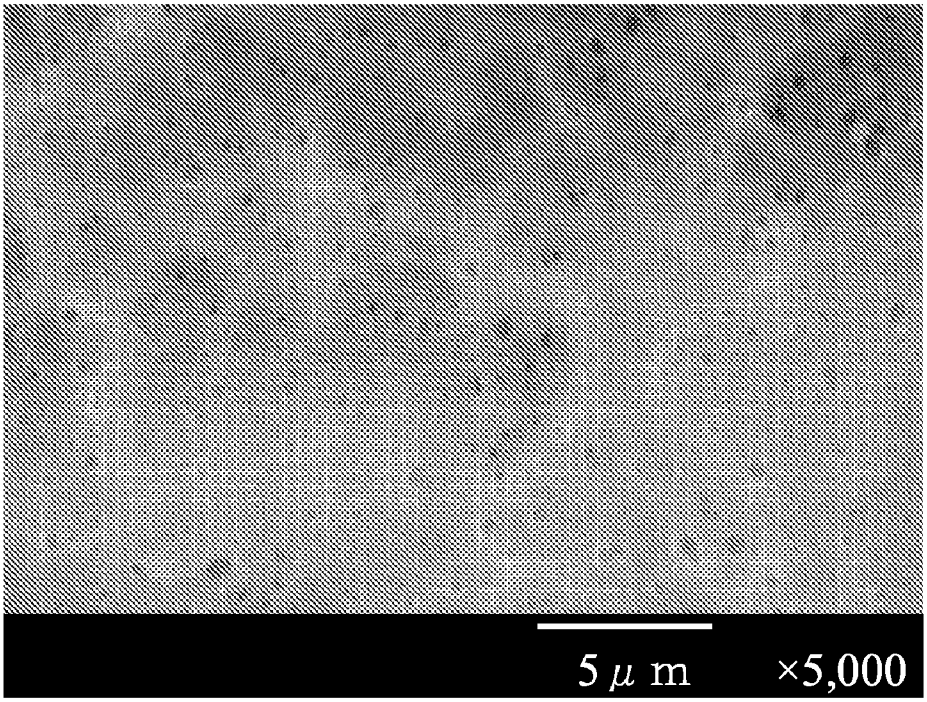
FIG. 13 shows an electron microscope photograph (5000-fold magnification) of a surface of a porous sheet 110 prepared in Comparative Example 3 of the present invention.
Figure 14:
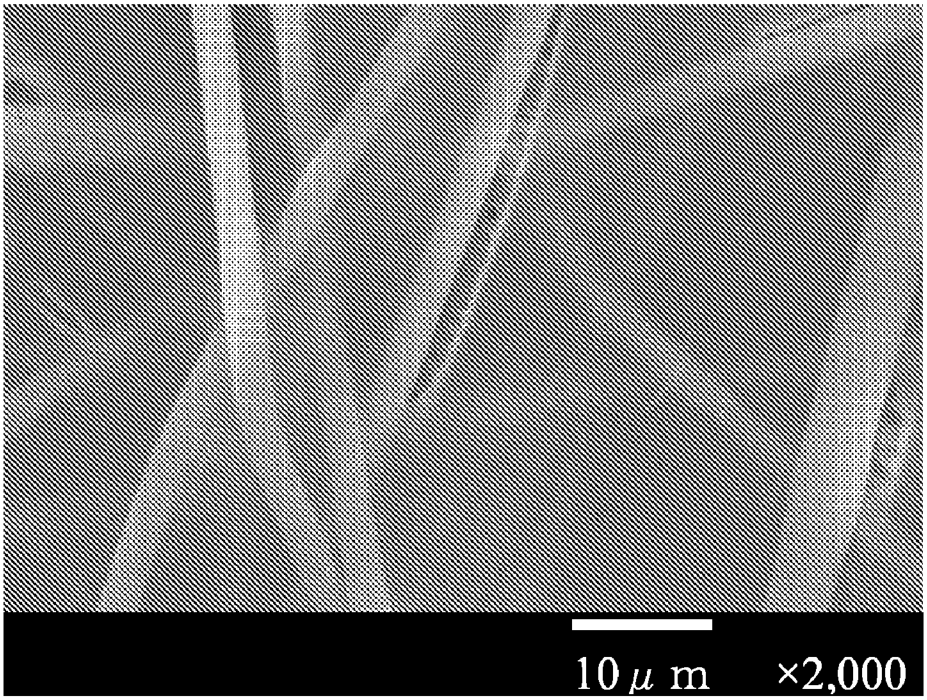
FIG. 14 shows an electron microscope photograph (2000-fold magnification) of a surface of a porous sheet 112 prepared in Comparative Example 5 of the present invention.

FIGS. 13 and 14 are electron microscope photographs of one example of the surface of the porous sheet other than the present invention. FIG. 13 shows a structural body, which is other than the net-like structural body according to the present invention, of which plane area percentage of penetrating pores is less than 10%. In FIG. 14, a film composed of a polymer which has no penetrating pore is formed on the entire surface of the porous substrate.

The thickness of the porous sheet according to the present invention is preferably 5-100 μm, more preferably 9-35 μm, and even more preferably 10-30 μm. The density of the porous sheet according to the present invention is preferably 0.300-0.900 $g/cm^3$, more preferably 0.500-0.850 $g/cm^3$, and even more preferably 0.600-0.800 $g/cm^3$. When the thickness is less than 5 μm, it may be torn or may be punctured during handling or processing. When the thickness is more than 100 μm, the area of electrode which can be stored when it is used as a separator for an electrochemical element becomes small, and thus there are cases where the capacity becomes insufficient. When the density is less than 0.300 $g/cm^3$, there are cases where the current leakage, when it is used as a separator for an electrochemical element, becomes large. When the density is more than 0.900 $g/cm^3$, there are cases where the dry-up resistance, when it is used as a separator for an electrochemical element, becomes insufficient.

The Gurley permeability of the porous sheet according to the present invention is preferably 0.1-100 s/100 ml, more preferably 0.1-20 s/100 ml, and even more preferably 0.1-9.9 s/100 ml. Ina case where the porous sheet is used as a separator for an electrical double layer capacitor, the Gurley permeability is preferably 1.0-20 s/100 ml, and more preferably 1.0-9.9 s/100 ml. In a case where the porous sheet is used as a separator for a solid electrolytic capacitor using a conductive polymer, the Gurley permeability is preferably 0.1-5.0 s/100 ml, and more preferably 0.1-3.0 s/100 ml. In a case where the porous sheet is used as a separator for a lithium ion battery, the Gurley permeability is preferably 1.0-100 s/100 ml. When the Gurley permeability of the porous sheet is less than 0.1 s/100 ml, there are cases where the current leakage becomes large when it is used as a separator for an electrochemical element. When the Gurley permeability is larger than 100 s/100 ml, there are cases where the internal resistance becomes large when it is used as a separator for an electrochemical element, and cases where the conductive polymer becomes difficult to be supported when it is used as a separator for a solid electrolytic capacitor using a conductive polymer.

The puncture strength of the porous sheet according to the present invention when it is in a state impregnated with the electrolytic solution is preferably 1.0 N or higher, more preferably 1.4 N or higher. When the puncture strength when it is in a state impregnated with the electrolytic solution is lower than 1.0 N, there are cases where the porous sheet may become torn or may become punctured when manufacturing an electrochemical element by using the porous sheet as a separator for an electrochemical element, resulting in degradation of the properties of the electrochemical element. In the present invention, the porous sheet is impregnated with an electrolytic solution for 10 minutes, followed by removing excess electrolytic solution adhered to the porous sheet by hanging the porous sheet for 1 minute and then allowing the porous sheet to stand still horizontally. Then, the maximum load (N) when a round-tipped metal needle having a diameter of 1 mm is lowered orthogonally against the porous sheet with a constant speed of 1 mm/s until the needle penetrates through, is taken as the puncture strength when it is in a state impregnated with the electrolytic solution The porous sheet according to the present invention can be suitably used as a separator for an electrochemical element. The electrochemical element in the present invention refers to a manganese battery, an alkaline manganese battery, a silver oxide battery, a lithium battery, a lead storage battery, a nickel-cadmium storage battery, a nickel-hydrogen storage battery, a nickel-zinc storage battery, a silver oxide-zinc storage battery, a lithium ion battery, a lithium polymer battery, various types of gel electrolyte battery, a zinc-air storage battery, an iron-air storage battery, an aluminum-air storage battery, a fuel battery, a solar battery, a sodium sulfur battery, a polyacene battery, an electrolytic capacitor, a solid electrolytic capacitor, an electrical double layer capacitor, an organic radical battery using a radical polymer, or the like.

As an electrode of the electrical double layer capacitor, it may be either one of a pair of electrical double layer electrodes or a combination with one being an electrical double layer electrode and the other being a redox electrode. As the electrical double layer electrode, electrodes comprising a carbon material such as active charcoal, non-porous carbon and black lead can be mentioned. Here, the non-porous carbon refers to a carbon of which manufacturing method differs from that of an active charcoal, and has a micro crystallite carbon similar with black lead. In the case of the active charcoal, ions go into and out of fine pores along with charge and discharge, while in the case of the non-porous carbon, ions go into and out of layer gaps of the micro crystallite carbon. One having lithium ions doped into these carbon materials can also be mentioned. The electrical double layer electrodes which make a pair may each be identical or different. As the redox electrode, conductive polymers such as polypyrrole, polythiophene, polyaniline, polyacetylene, polyacene, indole trimer, polyphenylquinoxaline, and derivatives thereof (for example, polyfluorophenylthiophene, poly (3-methylthiophene) or the like); polymer-metal complexes, and metal oxides such as ruthenium oxide, indium oxide and tungsten oxide can be mentioned; however, it shall not be limited to these.

As the electrolytic solution, an aqueous solution having an ion-dissociable salt dissolved therein; a solution prepared by dissolving an ion-dissociable salt in an organic solvent such as propylene carbonate, ethylene carbonate, dimethyl carbonate, diethyl carbonate, acetonitrile, y-butyrolactone, dimethylformamide, tetrahydrofuran, dimethoxyethane, dimethoxymethane, sulfolane, dimethyl sulfoxide, ethylene glycol, propylene glycol, methyl cellusolve and a solvent mixture of these; and an ionic liquid (solid molten salt) can be mentioned; however, it shall not be limited to these. In the case of an electrochemical element which can utilize either one of an aqueous solution type or an organic solvent type, the organic solvent type is preferable since the voltage resistance of the aqueous solution type is low. A conductive polymer film made of polypyrrole, polythiophene, polyaniline, polyacetylene, derivatives thereof, or the like can also be used in place of the electrolytic solution.

In the present invention, the solid electrolytic capacitor refers to a solid electrolytic capacitor which uses a conductive polymer as the solid electrolyte. As the conductive polymer, polypyrrole, polythiophene, polyaniline, polyacetylene, polyacene and derivatives thereof can be mentioned. The solid electrolytic capacitor may use these conductive polymers and an electrolytic solution in combination.

In the present invention, the lithium ion battery refers to a battery comprising an electrode which can store and release lithium ions; and an electrolytic solution and a solid electrolyte. A carbon material is used for the negative electrode, and a lithium metal oxide or the like is used for the positive electrode. As the lithium metal oxide, lithium cobaltate, lithium manganate and lithium nickelate can be mentioned; however, it shall not be limited to these. As the electrolytic solution, a solution prepared by dissolving a lithium salt in an organic solvent such as propylene carbonate, ethylene carbonate, dimethyl carbonate, diethyl carbonate, dimethoxyethane, dimethoxymethane and a solvent mixture of these, is used. As the lithium salt, lithium hexafluorophosphate and lithium tetrafluoroborate can be mentioned; however, it shall not be limited to these. As the solid electrolyte, an electrolyte prepared by dissolving a lithium salt in a gel polymer such as polyethylene glycol and derivatives thereof, polymethacrylic acid derivatives, polysiloxane and derivatives thereof and polyvinylidene fluoride can be used; however, it shall not be limited to these.

When the porous sheet according to the present invention is used as a separator for an electrochemical element, in order to avoid internal short circuit of the electrochemical element and an extraordinary current leakage, which are caused by a pinhole of the porous sheet or the insufficient puncture strength when the porous sheet is in a state impregnated with an electrolytic solution, the porous sheet should be manufactured so that the content of the net-like structural body in the porous sheet is increased, and/or the puncture strength of the porous substrate itself is strengthened.

As the manufacturing method for the porous sheet according to the present invention, a method in which a porous substrate is impregnated or coated with a polymer solution having an organic solvent as a main medium, followed by precipitation of a net-like structural body composed of a polymer by allowing the porous substrate to come in contact with an aqueous solution or to be immersed in the aqueous solution, can be mentioned. Alternatively, a method in which a porous substrate and a porous support that are in a laminated state is impregnated with a polymer solution having an organic solvent as a main medium, followed by precipitation of a net-like structural body composed of a polymer by allowing the surface of the porous support to come in contact with an aqueous solution or by immersing it in an aqueous solution, and then peeling off the porous support from the porous substrate, can be mentioned. In either method, after allowing the net-like structural body composed of a polymer to precipitate at the porous substrate, it is washed with water, and dried, and thus the porous sheet is manufactured.

The first method for manufacturing the porous sheet according to the present invention comprises a step of coating one surface of a porous substrate containing non-fibrillar fibers having an average fiber diameter of 0.01-10 μm with a polymer solution having an organic solvent as a main medium; and a step of allowing a surface of the porous substrate which is not coated with the polymer solution, to come in contact with an aqueous solution so as to allow precipitation of a net-like structural body composed of a polymer which entangles with the non-fibrillar fibers having an average fiber diameter of 0.01-10 μm, at the surface and at the internal of the porous substrate. With respect to the time during which the surface of the porous substrate which is not coated with the polymer solution is contacted with the aqueous solution, 5 or more seconds is preferable, and 1 or more minutes is more preferable. After the surface of the porous substrate which is not coated with the polymer solution is contacted with the aqueous solution for a predetermined time, the porous substrate may be left to stand in the aqueous solution in an immersed state, or may be moved while being immersed. When the porous substrate is immersed in the aqueous solution, the porous substrate may be turned over or may be placed longitudinally or obliquely. According to this first manufacturing method, a film without penetrating pores is hardly formed, and thus a porous sheet which is excellent in electrolytic solution permeability and dry-up resistance can be manufactured efficiently.

The second method for manufacturing the porous sheet according to the present invention comprises a step of coating one surface of a porous substrate containing non-fibrillar fibers having an average fiber diameter of 0.01-10 μm with a polymer solution having an organic solvent as a main medium; and a step of immersing the porous substrate with the surface coated with the polymer solution facing up so as to allow precipitation of a net-like structural body composed of a polymer which entangles with the non-fibrillar fibers having an average fiber diameter of 0.01-10 μm, at the surface and at the internal of the porous substrate. With respect to the time during which the porous substrate is immersed in the aqueous solution while the coated surface is facing up, 5 or more seconds is preferable, and 1 or more minutes is more preferable. After the porous substrate was immersed in the aqueous solution for a predetermined time while the coated surface is facing up, the porous substrate may be left to stand in the aqueous solution in an immersed state, or may be moved while being immersed. When the porous substrate is immersed in the aqueous solution, the porous substrate may be turned over or may be placed longitudinally or obliquely. According to this second manufacturing method, a film without penetrating pores is hardly formed, and thus a porous sheet which is excellent in electrolytic solution permeability and dry-up resistance can be manufactured efficiently.

The third method for manufacturing the porous sheet according to the present invention comprises a step of laminating a porous substrate containing non-fibrillar fibers having an average fiber diameter of 0.01-10 μm and a porous support; a step of impregnating the laminated body of the porous substrate and the porous support with a polymer solution having an organic solvent as the main medium; a step of allowing a surface of the porous support to come in contact with an aqueous solution so as to allow precipitation of a net-like structural body composed of a polymer which entangles with the non-fibrillar fibers having an average fiber diameter of 0.01-10 μm, at the surface and at the internal of the porous substrate; and a step of peeling off the porous support from the porous substrate. With respect to the time during which the surface of the porous support is contacted with the aqueous solution, 5 or more seconds is preferable, and 1 or more minutes is more preferable. After the surface of the porous support was contacted with the aqueous solution for a predetermined time, the laminated body of the porous substrate and the porous support may be left to stand in the aqueous solution in an immersed state, or may be moved while being immersed. When the laminated body of the porous substrate and the porous support is immersed in the aqueous solution, the laminated body may be turned over or may be placed longitudinally or obliquely. After the net-like structural body composed of a polymer is precipitated at the surface or at the internal of the porous substrate while the porous substrate and the porous support are in a laminated state, the porous support may be peeled off from the porous substrate, followed by washing of the porous substrate with water and drying thereof, or it may first be washed with water and dried, followed by peeling off of the porous support from the porous substrate.

According to this third manufacturing method, since the net-like structural body is formed at the front surface and at the back surface of the porous substrate, a porous sheet which is excellent in the balance between the electrolytic solution permeability and dry-up resistance can be obtained. In addition, there is a tendency that the net-like structural body is formed more at the surface which is on the other side of the surface that was contacted with the porous support, than the surface that was contacted with the porous support. As the porous support used in the third manufacturing method, the porous substrate according to the present invention can be used. The porous support may be the same as the porous substrate, or may be a different one. It is preferable that the porous support is manufactured by a wet paper-making method, an electrospinning method, a melt blown method, a flash spinning method or a combination of these.

As the medium of the polymer solution, an organic solvent which can dissolve the polymer is selected, depending on the polymer used. For example, N-methyl-2-pyrrolidone, N,N-dimethylformamide, N,N-dimethylacetamide, dimethylsulfoxide, amine oxide, tetrahydrofuran, xylene, toluene, dimethylether, diethylether, ethymethylether, methylethylketone, ethyl acetate, methanol, ethanol, butanol, 2-propanol, ethylene glycol, diethylene glycol, polyethylene glycol or the like can be mentioned. These may be used alone, or may be used in combination. Water may be combined with these organic solvents. Ion-exchanged water and distilled water are preferable as the water. In addition, metal halides such as lithium chloride, lithium bromide, lithium iodide and calcium chloride may be dissolved; however, in a case where the porous sheet is used as a separator for an electrical double layer capacitor or as a separator for an electrolytic capacitor, it is preferable that a chlorinated compound is not used, since where is a case where the aluminum power collecting body is corroded by the chlorine ion.

To use the organic solvent as the main medium means that the organic solvent accounts for 51% by mass or more of the entire medium. The polymer concentration of the polymer solution is preferably 1.0-20.0% by mass, more preferably 3.0-10.0% by mass. When the polymer concentration is less than 1.0% by mass, there are cases where the formation of the net-like structural body becomes insufficient. When the polymer concentration is more than 20.0% by mass, the viscosity of the polymer solution becomes too high, and thus results in cases where it impairs impregnating property and coating property regarding the porous substrate, and in cases where more than necessary amount of polymer adhere to the porous substrate which makes the formation of the net-like structural body difficult.

The aqueous solution used for the precipitation of the net-like structural body may be water alone, or alcohols such as methanol, ethanol, butanol, 2-proanol, ethylene glycol, diethylene glycol and polyethylene glycol, N-methyl-2-pyrrolidone, N,N-dimethylformamide, N,N-dimethylacetamide, dimethylsulfoxide, amine oxide or the like can be combined. The water content of the aqueous solution is preferably 30% by mass or higher, more preferably 51% by mass or higher. Ion-exchanged water and distilled water are preferably used as the water.

In the manufacturing method for the porous sheet according to the present invention, in order to impregnate the porous substrate with the polymer solution, known impregnating apparatuses, such as a dip coater, can be used. In order to coat the porous substrate with the polymer solution, known coating apparatuses, such as a transfer roll coater, a reverse roll coater, a blade coater, an air doctor coater, a rod coater, a gravure coater, a dye coater and a notch bar coater, can be used. After the porous substrate is impregnated with the polymer solution, it is preferable that the excess polymer solution on the surface of the porous substrate is removed. As the method for removing the excess polymer solution, a method which squeezes out the polymer solution by allowing the porous substrate to go through between two rolls, and a method which scratches off the polymer solution with a blade can be mentioned. The material of the roll used for removing the excess polymer solution on the surface of the porous substrate may be either one of rubber, resin or metal. Here, two rolls can be arranged as one set, and two or more sets of these may be used, or two or more blades may be used.

As the method to allow the surface of the porous substrate to come in contact with the aqueous solution, a method in which the porous substrate is allowed to float in a water bath, a method in which a transfer roll coater or a reverse roll coater is used to allow the porous substrate to come in contact with the rolls wet with water, a method in which a plurality of rotating rolls are arranged in a water bath in a manner that the water surface would not become higher than the upper end of the rolls so that the surface of the rolls are always wet with water, and the porous substrates are allowed to go through over the rolls, a method in which a shower water or a curtain-like water is applied onto the porous substrate, can be mentioned. In the case of the shower water or the curtain-like water, the polymer may run down from the porous substrate, or the polymer precipitation may become mottled. When the porous substrate is allowed to go through sequentially, a method in which a transfer roll coater or a reverse roll coater is used, or a method in which the porous substrate is allowed to go through a plurality of rolls arranged in a water bath is preferable. Although the temperature of the aqueous solution is not particularly limited, it is preferably in the range of 0-60° C.

As the method to immerse the porous substrate in the aqueous solution, the method in which the porous substrate is allowed to go through a water bath can be mentioned. Here, a plurality of water baths can be used. In a case where the porous substrate is allowed to go through the water bath sequentially, it is preferable that discharging of water and supplement of fresh water are carried out intermittently or continuously.

As the method to dry the porous substrate, it may be conducted by using a hot air dryer, a cylinder dryer, a Yankee dryer or the like. In the case of the hot air dryer, there is a tendency that the stretch at break of the porous sheet becomes comparatively short, and in the case of the cylinder dryer and the Yankee dryer, there is a tendency that the stretch at break of the porous sheet becomes comparatively long. In the case of the cylinder dryer and the Yankee dryer, there is a tendency that the porous substrate can be efficiently dried at lower temperature compared with the hot air dryer.

In the manufacturing method for the porous sheet according to the present invention, in order to allow a part of the non-fibrillar fibers having an average fiber diameter or 0.01-10 μm to be exposed at the surface of the porous sheet, several conditions among the conditions of using a porous substrate containing a plurality of fibers having a different average fiber diameter, decreasing the concentration of the polymer solution, adjusting the pressure of the roll or the pressing force of the blade applied after impregnation of the polymer solution to 5 N/cm or higher, preferably 10 N/cm or higher, or the like, can be combined, to manufacture the porous sheet.

EXAMPLES

Hereinafter, the present invention will be explained in more detail with reference to the Examples; however, the present invention shall not be limited to the Examples.

<Non-Fibrillar Fibers>

The non-fibrillar fibers used in the Examples are as follows.

PA1: a non-fibrillar fiber made of poly(para-phenylene terephthalamide)

PA3: a non-fibrillar fiber made of nylon 6,6 (manufactured by Asahi Kasei Fibers Corporation, Product name: Leona, fiber length 5 mm)

A1: a non-fibrillar fiber made of an acrylonitrile copolymer consisting of three components of acrylonitrile, methyl acrylate and methacrylic acid derivative (manufactured by Mitsubishi Rayon Co., Ltd., Product name: Vonnel M. V. P, fiber length 3 mm)

PP1: a non-fibrillar fiber made of polypropylene obtained by melt spinning (fiber length 3 mm)

G1: a non-fibrillar microglass fiber

PET1-3: a non-fibrillar fiber made of polyethylene terephthalate obtained by melt spinning (fiber length 2 mm)

PET4: a non-fibrillar fiber made of polyethylene terephthalate obtained by melt spinning (manufactured by Teijin Fibers Limited, Product name: TM04N, fiber length 3 mm)

PETS-6: a non-fibrillar fiber made of polyester with thermal fusing property (manufactured by Teijin Fibers Limited, Product name: TK08PN, fiber length 5 mm)

PET7: a non-fibrillar fiber made of polyethylene terephthalate obtained by melt spinning (manufactured by Teijin Fibers Limited, Product name: TT04N, fiber length 5 mm)

PET8: a non-fibrillar fiber made of polyester with thermal fusing property (manufactured by Teijin Fibers Limited, Product name: TJO4PN, fiber length 5 mm)

<Other Fibers>

Fibers other than the non-fibrillar fibers that were used in the Examples are as follows.

PA2: a fibrillar fiber made of poly(para-phenylene terephthalamide) (manufactured by Du Pont, Product name: Kevlar 1F361, Canadian Standard Freeness 150 ml)

C1: a fibrillar cellulose fiber (mass average fiber length 0.39 mm, Canadian Standard Freeness 0 ml)

C2: Manila hemp pulp (Canadian Standard Freeness 520 ml)

C3: a solvent-spun cellulose fiber which was subject to a beating process (Canadian Standard Freeness 70 ml)

<Porous Substrate>

In Table 1, porous substrates 1-8 and 11 containing non-fibrillar fibers having an average fiber diameter of 0.01-10 μm and porous substrates 9, 10, 12 and 13 that do not contain non-fibrillar fibers having an average fiber diameter of 0.01-10 μm, that were used in Examples and Comparative Examples, are shown. Porous substrates 1, 2 and 10 were prepared by the electro spinning method, and porous substrates 3-9, 11 and 12 were prepared by the wet paper-making method. In addition, the porous substrate 11 was prepared by carrying out the wet paper-making method using an inclined short wire paper-making machine, followed by a calendaring process with a heat calendar of 220° C. at a linear pressure of 4.7 kN/cm. The porous substrate 13 is an oriented polyolefine porous film which is prepared by melt extrusion of a resin.

TABLE 1

| | Fiber Formulation | | | | | |
|---|---|---|---|---|---|---|
| Porous Substrate | Fiber | Average Fiber Diameter [μm] | Content based on Porous Substrate [%] | Thickness [μm] | Density [g/cm$^3$] | Maximum Diameter [μm] |
| 1 | PA1 | 0.01 | 100 | 15 | 0.460 | 0.5 |
| 2 | PA1 | 0.1 | 100 | 20 | 0.400 | 1.0 |
| 3 | PET3 | 2.3 | 45 | 44 | 0.272 | 23 |
| | PET5 | 4.5 | 50 | | | |
| | C1 | — | 5 | | | |

TABLE 1-continued

| | Fiber Formulation | | | | | |
|---|---|---|---|---|---|---|
| Porous Substrate | Fiber | Average Fiber Diameter [μm] | Content based on Porous Substrate [%] | Thickness [μm] | Density [g/cm$^3$] | Maximum Diameter [μm] |
| 4 | PET1 | 0.09 | 45 | 40 | 0.500 | 45 |
| | PET3 | 0.9 | 5 | | | |
| | PET8 | 12.4 | 50 | | | |
| 5 | PET2 | 1 | 30 | 54 | 0.277 | 30 |
| | PP1 | 3.2 | 30 | | | |
| | PET6 | 9.6 | 40 | | | |
| 6 | PET5 | 4.5 | 40 | 40 | 0.337 | 17 |
| | PA3 | 7.9 | 50 | | | |
| | C1 | — | 10 | | | |
| 7 | A1 | 3.5 | 80 | 30 | 0.266 | 63 |
| | C1 | — | 20 | | | |
| 8 | G1 | 0.3 | 50 | 35 | 0.285 | 8 |
| | PET3 | 2.3 | 20 | | | |
| | PET5 | 4.5 | 25 | | | |
| | C1 | — | 5 | | | |
| 9 | PET7 | 12.4 | 50 | 60 | 0.250 | 110 |
| | PET8 | 12.4 | 50 | | | |
| 10 | PA1 | 0.009 | 100 | 15 | 0.460 | 0.08 |
| 11 | PET4 | 3.6 | 50 | 25 | 0.800 | 4.5 |
| | PA2 | — | 50 | | | |
| 12 | C2 | — | 50 | 50 | 0.400 | 1.3 |
| | C3 | — | 50 | | | |
| 13 | — | — | — | 25 | 0.500 | 0.01 |

<Polymer for Net-Like Structural Body>

Polymer A

A predetermined amount of meta-phenylene isophthalamide, triethylamine and triethylemine hydrochloride were dissolved in methylene chloride and the solution was stirred in a blender (manufactured by Waring Laboratory & Science). Whilst stirring, a methylene chloride solution of isophthaloyl chloride was added to allow condensation polymerization reaction, and thus poly(meta-phenylene isophthalamide) having a mass average molecular weight of 300000 was synthesized and was used as polymer A.

Polymer B

Polyether sulfone (manufactured by Sumitomo Chemical Co., Ltd, Product name: Sumika Excel 5003PS) was used as polymer B.

Polymer C

Polyamide imide (manufactured by Toyobo Co., Ltd., Product name: Vylomax HR16NN) was used as polymer C.

Polymer D

An aromatic polyamide containing an aromatic diamine derivative unit of the general formula (1) wherein $R^1$ is —O—, and a terephthalic acid derivative unit represented by the following general formula (3), was used as polymer D. Polymer D was obtained by subjecting the aromatic diamine and the terephthalic acid to a condensation polymerization reaction. The bonding positions to the phenylene group in the general formula (1) are all at the para-position.

Polymers E-N

Aromatic polyamides containing an aromatic diamine derivative unit of the general formula (1) wherein $R^1$ is —NH— (polymer E), —S— (polymer F), a sulfonyl group (polymer G), a carbonyl group (polymer H), a carbonate group (polymer I), an urea group (polymer J), an urethane group (polymer K), an arylene group (polymer L), an ethylene group (polymer M) and an ethynylene group (polymer N), respectively, and a terephthalic acid derivative unit represented by the following general formula (3) were each used as polymers E-N respectively. Polymers E-N were obtained by subjecting the aromatic diamine and the terephthalic acid to a condensation polymerization reaction. The bonding positions to the phenylene group in the general formula (1) are all at the para-position. Table 2 shows $R^1$ of polymers D-N.

Polymer O

An aromatic polyamide containing an aromatic dicarboxylic acid derivative unit of the general formula (2)wherein $R^2$ is —O—, and a para-phenylene diamine derivative unit represented by the following general formula (4), was used as polymer O. Polymer O was obtained by subjecting the para-phenylene diamine and the aromatic dicarboxylic acid to a condensation polymerization reaction. The bonding positions to the phenylene group in the general formula (2) are all at the para-position.

Polymer AA

An aromatic polyamide containing an aromatic diamine derivative unit of the general formula (1) wherein $R^1$ is —S(=O)$_2$—, and an isophthalic acid derivative unit represented by the following general formula (5), was used as polymer AA. Polymer AA was obtained by subjecting the aromatic diamine and the isophthalic acid to a condensation polymerization reaction. The bonding positions to the phenylene group in the general formula (1) are all at the meta-position.

(3)

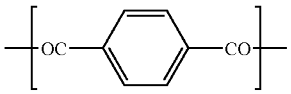

(4)

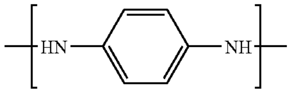

(5)

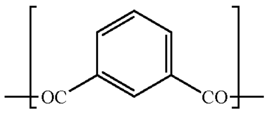

Polymers P-Y

Aromatic polyamides containing an aromatic dicarboxylic acid derivative unit of the general formula (2) wherein $R^2$ is —NH— (polymer P), —S— (polymer Q), a sulfonyl group (polymer R), a carbonyl group (polymer S), a carbonate group (polymer T), an urea group (polymer U), an urethane group (polymer V), an arylene group (polymer W), an ethylene group (polymer X) and an ethynylene group (polymer Y), respectively, and a para-phenylene diamine derivative unit represented by the general formula (3) were each used as polymers P-Y respectively. Polymers P-Y were obtained by subjecting the para-phenylene diamine and the aromatic dicarboxylic acid to a condensation polymerization reaction. The bonding positions to the phenylene group in the general formula (2) are all at the para-position. Table 2 shows $R^2$ of polymers O-Y.

Polymer Z

An aromatic polyamide containing an aromatic diamine derivative unit of general formula (1) wherein $R^1$ is a sulfonyl group, and an aromatic dicarboxylic acid derivative unit of the general formula (2) wherein $R^2$ is an ethylene group, was used as polymer Z. Polymer Z was obtained by subjecting the aromatic diamine and the aromatic dicarboxylic acid to a condensation polymerization reaction. The bonding positions to the phenylene group in the general formulas (1) and (2) are all at the para-position.

Polymer AB

An aromatic polyamide containing an aromatic dicarboxylic acid derivative unit of the general formula (2) wherein $R^2$ is —O—, and a meta-phenylene diamine derivative unit represented by the following general formula (6), was used as polymer AB. Polymer AB was obtained by subjecting the meta-phenylene diamine and the aromatic dicarboxylic acid to a condensation polymerization reaction. The bonding positions to the phenylene group in the general formula (2) are all at the meta-position.

(6)

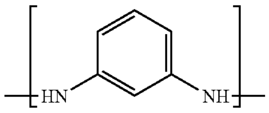

Polymer AC

Polyvinylidene fluoride (mass average molecular weight 300000) was used as polymer AC.

Polymer AD

An acryl fiber made of an acrylonitrile copolymer consisting of three components of acrylonitrile, methyl acrylate and methacrylic acid derivative (manufactured by Mitsubishi Rayon Co., Ltd., Product name: Vonnel M. V. P, fiber length 3 mm) was used as polymer AD.

TABLE 2

| Polymer | $R^1$ |
|---|---|
| D | —O— |
| E | —NH— |
| F | —S— |
| G | $—S(=O)_2—$ |
| H | —C(=O)— |
| I | —OC(=O)O— |
| J | —NHC(=O)NH— |
| K | —NHC(=O)O— |
| L | 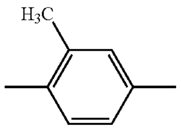 |
| M | $—C_2H_4—$ |
| N | —CH=CH— |
| AA | $—S(=O)_2—$ |
| | $R^2$ |
| O | —O— |
| P | —NH— |
| Q | —S— |
| R | $—S(=O)_2—$ |
| S | —C(=O)— |
| T | —OC(=O)O— |
| U | —NHC(=O)NH— |
| V | —NHC(=O)O— |
| W | 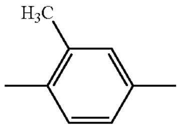 |
| X | $—CH_2—$ |
| Y | —CH=CH— |
| AB | —O— |

<Preparation of Polymer Solution>

Polymers A-Z and AA-AD were used to prepare the polymer solutions 1-32 shown in Table 3. In Table 3, NMP is N-methyl-2-pyrrolidone, MeOH is methanol, DMAc is N,N-dimethyl acetamide, IPA is 2-propanol, TPG is tripropylene glycol, PEG is polyethylene glycol (mass average molecular weight 2000), and DMF is N,N-dimethylformamide.

TABLE 3

| Polymer Solution | Polymer | Solvent [% by mass] | Polymer Concentration [% by mass] |
|---|---|---|---|
| 1 | A | NMP84.7/MeOH10.5/Water4.8 | 5.0 |
| 2 | B | NMP100 | 10.0 |
| 3 | C | NMP100 | 3.0 |
| 4 | D | NMP100 | 4.0 |
| 5 | E | NMP100 | 5.0 |
| 6 | F | NMP100 | 3.0 |
| 7 | G | NMP99.0/PEG1.0 | 4.0 |
| 8 | G | NMP100 | 2.0 |
| 9 | H | DMAc100 | 3.0 |
| 10 | I | DMAc97.0/Ethyl Acetate3.0 | 10.0 |
| 11 | J | DMAc100 | 8.0 |
| 12 | K | NMP100 | 6.0 |
| 13 | L | NMP100 | 5.0 |
| 14 | M | NMP100 | 5.0 |
| 15 | N | NMP100 | 3.0 |
| 16 | O | DMAc100 | 3.0 |
| 17 | P | DMAc100 | 5.0 |
| 18 | Q | DMAc95/MeOH5.0 | 7.0 |
| 19 | R | DMAc100 | 5.0 |
| 20 | S | DMAc95.0/MeOH5.0 | 4.0 |
| 21 | T | DMAc100 | 10.0 |
| 22 | U | NMP100 | 5.0 |
| 23 | V | NMP100 | 6.0 |
| 24 | W | NMP100 | 4.0 |
| 25 | X | NMP100 | 3.0 |
| 26 | Y | NMP100 | 4.0 |
| 27 | Z | NMP95.0/MeOH5.0 | 4.0 |
| 28 | AA | NMP100 | 4.0 |
| 29 | AB | DMAc100 | 3.0 |
| 30 | AC | DMAc94.7/IPA5.3 | 5.0 |
| 31 | AD | DMF89.3/MeOH5.3/Water5.4 | 10.0 |
| 32 | A | DMAc85.0/TPG15.0 | 8.0 |

<Aqueous Solution Used for the Precipitation of the Net-Like Structural Body>

Aqueous Solution 1

Ion-exchanged water at 20° C. was used as aqueous solution 1. Discharging of water and supplement of fresh water was carried out with the speed of 0.1 liter/min with respect to the water bath of aqueous solution 1.

Aqueous Solution 2

A solution mixture of 95.0% by mass of ion-exchanged water and 5.0% by mass of methanol at 20° C. was used as aqueous solution 2.

Aqueous Solution 3

A solution mixture of 55% by mass of N,N-dimethylacetamide and 45% by mass of ion-exchanged water at 30° C. was used as aqueous solution 3.

<Preparation of Porous Sheet>

Manufacturing conditions for porous sheets 1-119 are shown in Tables 4-9. Here, the porous substrate is used as the porous support, and the numeric numbers of the porous supports given in the Tables are the numeric numbers of the porous substrates.

TABLE 4

| Example | Porous Sheet | Porous Substrate | Polymer Solution | Impregnation/ Coating | Porous Support | Squeezing Pressure [N/cm] |
|---|---|---|---|---|---|---|
| Example 1 | 1 | 3 | 1 | Impregnation | None | 30 |
| Example 2 | 2 | | | | | |
| Example 3 | 3 | | 2 | Impregnation | None | 30 |
| Example 4 | 4 | | 1 | One-side | None | None |
| Example 5 | 5 | | | Coating | | |
| Example 6 | 6 | | | Impregnation | 3 | 30 |
| Example 7 | 7 | | 2 | One-side | None | None |
| Example 8 | 8 | | | Coating | | |
| Example 9 | 9 | | | Impregnation | 3 | 30 |
| Example 10 | 10 | | | | | 5 |
| Example 11 | 11 | | | | | 3 |
| Example 12 | 12 | | | | | 30 |
| Example 13 | 13 | | | | | 30 |
| Example 14 | 14 | | 3 | One-side | None | None |
| Example 15 | 15 | | | Coating | | |
| Example 16 | 16 | | | Impregnation | 3 | 30 |
| Example 17 | 17 | 1 | 4 | One-side | None | None |
| Example 18 | 18 | | | Coating | | |
| Example 19 | 19 | | | Impregnation | 1 | 30 |
| Example 20 | 20 | 5 | 5 | One-side | None | None |
| Example 21 | 21 | | | Coating | | |
| Example 22 | 22 | | | Impregnation | 5 | 30 |
| Example 23 | 23 | 2 | 6 | One-side | None | None |
| Example 24 | 24 | | | Coating | | |
| Example 25 | 25 | | | Impregnation | 2 | 20 |
| Example 26 | 26 | 3 | 7 | One-side | None | None |
| Example 27 | 27 | | | Coating | | |
| Example 28 | 28 | | | Impregnation | 3 | 10 |
| Example 29 | 29 | 3 | 8 | One-side | None | None |
| Example 30 | 30 | | | Coating | | |
| Example 31 | 31 | | | Impregnation | 3 | 10 |
| Example 32 | 32 | 4 | 9 | One-side | None | None |
| Example 33 | 33 | | | Coating | | |
| Example 34 | 34 | | | Impregnation | 4 | 10 |
| Example 35 | 35 | 5 | 10 | One-side | None | None |
| Example 36 | 36 | | | Coating | | |
| Example 37 | 37 | | | Impregnation | 5 | 10 |
| Example 38 | 38 | 6 | 11 | One-side | None | None |
| Example 39 | 39 | | | Coating | | |
| Example 40 | 40 | | | Impregnation | 6 | 20 |

TABLE 5

| Example | Porous Sheet | Porous Substrate | Polymer Solution | Impregnation/ Coating | Porous Support | Squeezing Pressure [N/cm] |
|---|---|---|---|---|---|---|
| Example 41 | 41 | 7 | 12 | One-side | None | None |
| Example 42 | 42 | | | Coating | | |
| Example 43 | 43 | | | Impregnation | 7 | 20 |
| Example 44 | 44 | 8 | 13 | One-side | None | None |
| Example 45 | 45 | | | Coating | | |
| Example 46 | 46 | | | Impregnation | 8 | 30 |
| Example 47 | 47 | 5 | 14 | One-side | None | None |
| Example 48 | 48 | | | Coating | | |
| Example 49 | 49 | | | Impregnation | 5 | 30 |
| Example 50 | 50 | 2 | 15 | One-side | None | None |
| Example 51 | 51 | | | Coating | | |
| Example 52 | 52 | | | Impregnation | 2 | 10 |
| Example 53 | 53 | 8 | 16 | One-side | None | None |
| Example 54 | 54 | | | Coating | | |
| Example 55 | 55 | | | Impregnation | 8 | 10 |
| Example 56 | 56 | 7 | 17 | One-side | None | None |
| Example 57 | 57 | | | Coating | | |
| Example 58 | 58 | | | Impregnation | 7 | 30 |
| Example 59 | 59 | 6 | 18 | One-side | None | None |
| Example 60 | 60 | | | Coating | | |
| Example 61 | 61 | | | Impregnation | 6 | 10 |
| Example 62 | 62 | 3 | 19 | One-side | None | None |
| Example 63 | 63 | | | Coating | | |
| Example 64 | 64 | | | Impregnation | 3 | 20 |
| Example 65 | 65 | 1 | 20 | One-side | None | None |
| Example 66 | 66 | | | Coating | | |

TABLE 5-continued

| Example | Porous Sheet | Porous Substrate | Polymer Solution | Impregnation/ Coating | Porous Support | Squeezing Pressure [N/cm] |
|---|---|---|---|---|---|---|
| Example 67 | 67 | | | Impregnation | 1 | 30 |
| Example 68 | 68 | 3 | 21 | One-side | None | None |
| Example 69 | 69 | | | Coating | | |
| Example 70 | 70 | | | Impregnation | 3 | 30 |
| Example 71 | 71 | 8 | 22 | One-side | None | None |
| Example 72 | 72 | | | Coating | | |
| Example 73 | 73 | | | | | |
| Example 74 | 74 | | | | | |
| Example 75 | 75 | | | | | |
| Example 76 | 76 | | | | | |
| Example 77 | 77 | | | | | |
| Example 78 | 78 | | | | | |
| Example 79 | 79 | | | | | |
| Example 80 | 80 | | | Impregnation | 8 | 30 |

TABLE 6

| Example | Porous Sheet | Porous Substrate | Polymer Solution | Impregnation/ Coating | Porous Support | Squeezing Pressure [N/cm] |
|---|---|---|---|---|---|---|
| Example 81 | 81 | 6 | 23 | One-side | None | None |
| Example 82 | 82 | | | Coating | | |
| Example 83 | 83 | | | Impregnation | 6 | 30 |
| Example 84 | 84 | 6 | 24 | One-side | None | None |
| Example 85 | 85 | | | Coating | | |
| Example 86 | 86 | | | Impregnation | 6 | 10 |
| Example 87 | 87 | 4 | 25 | One-side | None | None |
| Example 88 | 88 | | | Coating | | |
| Example 89 | 89 | | | Impregnation | 4 | 10 |
| Example 90 | 90 | 5 | 26 | One-side | None | None |
| Example 91 | 91 | | | Coating | | |
| Example 92 | 92 | | | Impregnation | 5 | 40 |
| Example 93 | 93 | 3 | 27 | One-side | None | None |
| Example 94 | 94 | | | Coating | | |
| Example 95 | 95 | | | Impregnation | 3 | 20 |
| Example 96 | 96 | 3 | 28 | One-side | None | None |
| Example 97 | 97 | | | Coating | | |
| Example 98 | 98 | | | Impregnation | 3 | 10 |
| Example 99 | 99 | 8 | 29 | One-side | None | None |
| Example 100 | 100 | | | Coating | | |
| Example 101 | 101 | | | Impregnation | 8 | 10 |
| Example 102 | 102 | 3 | 30 | One-side | None | None |
| Example 103 | 103 | | | Coating | | |
| Example 104 | 104 | | | Impregnation | 3 | 30 |
| Example 105 | 105 | 7 | 31 | One-side | None | None |
| Example 106 | 106 | | | Coating | | |
| Example 107 | 107 | | | Impregnation | 7 | 40 |
| Comparative Example 1 | 108 | 9 | 2 | Impregnation | 9 | 20 |
| Comparative Example 2 | 109 | 10 | 3 | Impregnation | 10 | 20 |
| Comparative Example 3 | 110 | 3 | 32 | Both-side Coating | None | None |
| Comparative Example 4 | 111 | | 32 | | | |
| Comparative Example 5 | 112 | | 2 | | | |
| Comparative Example 6 | 113 | | 3 | | | |
| Comparative Example 7 | 114 | 3 | None | None | None | None |
| Comparative Example 8 | 115 | 1 | | | | |
| Comparative Example 9 | 116 | 5 | | | | |
| Comparative Example 10 | 117 | 11 | | | | |
| Comparative Example 11 | 118 | 12 | | | | |
| Comparative Example 12 | 119 | 13 | | | | |

TABLE 7

| Example | Porous Sheet | Precipitation Method | Calendar Linear Pressure [N/cm] |
|---|---|---|---|
| Example 1 | 1 | Immersion in Aqueous Solution 1 | 200 |
| Example 2 | 2 | Contact with Aqueous Solution 1 | 200 |
| Example 3 | 3 | Contact with Aqueous Solution 1 | 220 |
| Example 4 | 4 | Contact with Aqueous Solution 1 | 180 |
| Example 5 | 5 | Immersion in Aqueous Solution 1 | 180 |
| Example 6 | 6 | Contact with Aqueous Solution 1 | 200 |
| Example 7 | 7 | Contact with Aqueous Solution 1 | 190 |
| Example 8 | 8 | Immersion in Aqueous Solution 1 | 190 |
| Example 9 | 9 | Contact with Aqueous Solution 1 | 250 |
| Example 10 | 10 | Contact with Aqueous Solution 1 | 180 |
| Example 11 | 11 | Contact with Aqueous Solution 1 | 200 |
| Example 12 | 12 | Contact with Aqueous Solution 1 | 350 |
| Example 13 | 13 | Contact with Aqueous Solution 1 | 370 |
| Example 14 | 14 | Contact with Aqueous Solution 1 | 210 |
| Example 15 | 15 | Immersion in Aqueous Solution 1 | 210 |
| Example 16 | 16 | Contact with Aqueous Solution 1 | 230 |
| Example 17 | 17 | Contact with Aqueous Solution 1 | 240 |
| Example 18 | 18 | Immersion in Aqueous Solution 1 | 240 |
| Example 19 | 19 | Contact with Aqueous Solution 1 | 210 |
| Example 20 | 20 | Contact with Aqueous Solution 2 | 180 |
| Example 21 | 21 | Immersion in Aqueous Solution 2 | 180 |
| Example 22 | 22 | Contact with Aqueous Solution 2 | 220 |
| Example 23 | 23 | Contact with Aqueous Solution 2 | 110 |
| Example 24 | 24 | Immersion in Aqueous Solution 2 | 110 |
| Example 25 | 25 | Contact with Aqueous Solution 2 | 130 |
| Example 26 | 26 | Contact with Aqueous Solution 1 | 180 |
| Example 27 | 27 | Immersion in Aqueous Solution 1 | 180 |
| Example 28 | 28 | Contact with Aqueous Solution 1 | 190 |
| Example 29 | 29 | Contact with Aqueous Solution 1 | 160 |
| Example 30 | 30 | Immersion in Aqueous Solution 1 | 160 |
| Example 31 | 31 | Contact with Aqueous Solution 1 | 180 |
| Example 32 | 32 | Contact with Aqueous Solution 1 | 300 |
| Example 33 | 33 | Immersion in Aqueous Solution 1 | 300 |
| Example 34 | 34 | Contact with Aqueous Solution 1 | 300 |
| Example 35 | 35 | Contact with Aqueous Solution 1 | 220 |
| Example 36 | 36 | Immersion in Aqueous Solution 1 | 220 |
| Example 37 | 37 | Contact with Aqueous Solution 1 | 220 |
| Example 38 | 38 | Contact with Aqueous Solution 2 | 250 |

TABLE 7-continued

| Example | Porous Sheet | Precipitation Method | Calendar Linear Pressure [N/cm] |
|---|---|---|---|
| Example 39 | 39 | Immersion in Aqueous Solution 2 | 250 |
| Example 40 | 40 | Contact with Aqueous Solution 2 | 250 |

TABLE 8

| Example | Porous Sheet | Precipitation Method | Calendar Linear Pressure [N/cm] |
|---|---|---|---|
| Example 41 | 41 | Contact with Aqueous Solution 1 | 290 |
| Example 42 | 42 | Immersion in Aqueous Solution 1 | 290 |
| Example 43 | 43 | Contact with Aqueous Solution 1 | 300 |
| Example 44 | 44 | Contact with Aqueous Solution 1 | 150 |
| Example 45 | 45 | Immersion in Aqueous Solution 1 | 150 |
| Example 46 | 46 | Contact with Aqueous Solution 1 | 170 |
| Example 47 | 47 | Contact with Aqueous Solution 1 | 200 |
| Example 48 | 48 | Immersion in Aqueous Solution 1 | 200 |
| Example 49 | 49 | Contact with Aqueous Solution 1 | 210 |
| Example 50 | 50 | Contact with Aqueous Solution 1 | 330 |
| Example 51 | 51 | Immersion in Aqueous Solution 1 | 330 |
| Example 52 | 52 | Contact with Aqueous Solution 1 | 360 |
| Example 53 | 53 | Contact with Aqueous Solution 2 | 250 |
| Example 54 | 54 | Immersion in Aqueous Solution 2 | 250 |
| Example 55 | 55 | Contact with Aqueous Solution 2 | 250 |
| Example 56 | 56 | Contact with Aqueous Solution 1 | 200 |
| Example 57 | 57 | Immersion in Aqueous Solution 1 | 200 |
| Example 58 | 58 | Contact with Aqueous Solution 1 | 210 |
| Example 59 | 59 | Contact with Aqueous Solution 1 | 250 |
| Example 60 | 60 | Immersion in Aqueous Solution 1 | 250 |
| Example 61 | 61 | Contact with Aqueous Solution 1 | 250 |
| Example 62 | 62 | Contact with Aqueous Solution 2 | 180 |
| Example 63 | 63 | Immersion in Aqueous Solution 2 | 180 |
| Example 64 | 64 | Contact with Aqueous Solution 2 | 180 |
| Example 65 | 65 | Contact with Aqueous Solution 2 | 320 |
| Example 66 | 66 | Immersion in Aqueous Solution 2 | 320 |
| Example 67 | 67 | Contact with Aqueous Solution 2 | 300 |
| Example 68 | 68 | Contact with Aqueous Solution 1 | 200 |
| Example 69 | 69 | Immersion in Aqueous Solution 1 | 200 |
| Example 70 | 70 | Contact with Aqueous Solution 1 | 200 |
| Example 71 | 71 | Contact with Aqueous Solution 1 | None |
| Example 72 | 72 | Contact with Aqueous Solution 1 | 20 |

TABLE 8-continued

| Example | Porous Sheet | Precipitation Method | Calendar Linear Pressure [N/cm] |
|---|---|---|---|
| Example 73 | 73 | Contact with Aqueous Solution 1 | 40 |
| Example 74 | 74 | Contact with Aqueous Solution 1 | 90 |
| Example 75 | 75 | Contact with Aqueous Solution 1 | 150 |
| Example 76 | 76 | Contact with Aqueous Solution 1 | 230 |
| Example 77 | 77 | Contact with Aqueous Solution 1 | 330 |
| Example 78 | 78 | Contact with Aqueous Solution 1 | 340 |
| Example 79 | 79 | Immersion in Aqueous Solution 1 | 150 |
| Example 80 | 80 | Contact with Aqueous Solution 1 | 180 |

TABLE 9

| Example | Porous Sheet | Precipitation Method | Calendar Linear Pressure [N/cm] |
|---|---|---|---|
| Example 81 | 81 | Contact with Aqueous Solution 1 | 250 |
| Example 82 | 82 | Immersion in Aqueous Solution 1 | 250 |
| Example 83 | 83 | Contact with Aqueous Solution 1 | 250 |
| Example 84 | 84 | Contact with Aqueous Solution 1 | 240 |
| Example 85 | 85 | Immersion in Aqueous Solution 1 | 240 |
| Example 86 | 86 | Contact with Aqueous Solution 1 | 240 |
| Example 87 | 87 | Contact with Aqueous Solution 1 | 250 |
| Example 88 | 88 | Immersion in Aqueous Solution 1 | 250 |
| Example 89 | 89 | Contact with Aqueous Solution 1 | 250 |
| Example 90 | 90 | Contact with Aqueous Solution 1 | 280 |
| Example 91 | 91 | Immersion in Aqueous Solution 1 | 280 |
| Example 92 | 92 | Contact with Aqueous Solution 1 | 310 |
| Example 93 | 93 | Contact with Aqueous Solution 1 | 280 |
| Example 94 | 94 | Immersion in Aqueous Solution 1 | 280 |
| Example 95 | 95 | Contact with Aqueous Solution 1 | 280 |
| Example 96 | 96 | Contact with Aqueous Solution 1 | 180 |
| Example 97 | 97 | Immersion in Aqueous Solution 1 | 180 |
| Example 98 | 98 | Contact with Aqueous Solution 1 | 190 |
| Example 99 | 99 | Contact with Aqueous Solution 2 | 250 |
| Example 100 | 100 | Immersion in Aqueous Solution 2 | 250 |
| Example 101 | 101 | Contact with Aqueous Solution 2 | 250 |
| Example 102 | 102 | Contact with Aqueous Solution 1 | 200 |
| Example 103 | 103 | Immersion in Aqueous Solution 1 | 200 |
| Example 104 | 104 | Contact with Aqueous Solution 1 | 200 |
| Example 105 | 105 | Contact with Aqueous Solution 1 | 200 |
| Example 106 | 106 | Immersion in Aqueous Solution 1 | 200 |

TABLE 9-continued

| Example | Porous Sheet | Precipitation Method | Calendar Linear Pressure [N/cm] |
|---|---|---|---|
| Example 107 | 107 | Contact with Aqueous Solution 1 | 200 |
| Comparative Example 1 | 108 | Contact with Aqueous Solution 1 | 200 |
| Comparative Example 2 | 109 | Contact with Aqueous Solution 1 | 200 |
| Comparative Example 3 | 110 | Immersion in Aqueous Solution 3 | 80 |
| Comparative Example 4 | 111 | Immersion in Aqueous Solution 3 | 220 |
| Comparative Example 5 | 112 | Immersion in Aqueous Solution 3 | 280 |
| Comparative Example 6 | 113 | Immersion in Aqueous Solution 3 | 320 |
| Comparative Example 7 | 114 | None | 150 |
| Comparative Example 8 | 115 | None | None |
| Comparative Example 9 | 116 | None | 150 |
| Comparative Example 10 | 117 | None | None |
| Comparative Example 11 | 118 | None | None |
| Comparative Example 12 | 119 | None | None |

Example 1

Porous substrate 3, which was impregnated with polymer solution 1 by using a dip coater, was allowed to go through between two gum rolls having a diameter of 50 mm at a squeezing pressure of 30 N/cm to remove excess polymer solution, and was further immersed in aqueous solution 1 for 5 minutes to allow precipitation of the net-like structural body. Then, porous substrate 3 was washed with ion-exchanged water, dried by contacting it with a Yankee dryer at 130° C., and was subject to a calendar processing with a linear pressure of 200 N/cm to give the porous sheet 1.

Example 2

Porous substrate 3, which was impregnated with polymer solution 2 by using a dip coater, was allowed to go through between two gum rolls having a diameter of 50 mm at a squeezing pressure of 30 N/cm to remove excess polymer solution, and was further contacted with aqueous solution 1 for 1 minute to allow precipitation of the net-like structural body. Then, porous substrate 3 was washed with ion-exchanged water, dried by contacting it with a Yankee dryer at 130° C., and was subject to a calendar processing with a linear pressure of 200 N/cm to give the porous sheet 2.

Example 3

A net-like structural body was allowed to precipitate by using the conditions shown in Tables 4 and 7 in a similar manner as Example 2, to give the porous sheet 3.

Example 4

Porous substrate 3, one side surface of which was coated with polymer solution 1 by using a blade coater, was allowed to float in aqueous solution 1 for 1 minute in a manner that the non-coated surface contacts with the aqueous solution, thereby allowing precipitation of the net-like structural body.

Then, porous substrate 3 was washed with ion-exchanged water, dried by contacting it with a Yankee dryer at 130° C., and was subject to a calendar processing with a linear pressure of 180 N/cm to give the porous sheet 4.

Example 5

Porous substrate 3, one side surface of which was coated with polymer solution 1 by using a blade coater, was immersed in aqueous solution 1 for 3 minutes in a manner that the non-coated surface faces up, thereby allowing precipitation of the net-like structural body. Then, porous substrate 3 was washed with ion-exchanged water, dried by contacting it with a Yankee dryer at 130° C., and was subject to a calendar processing with a linear pressure of 180 N/cm to give the porous sheet 5.

Example 6

Porous substrate 3 and a porous support in a laminated state was impregnated with polymer solution 1 by using a dip coater, and was then allowed to go through between two gum rolls having a diameter of 50 mm at squeezing pressure of 30 N/cm to remove excess polymer solution. Then, porous substrate 3 and the porous support in a laminated state was allowed to flow in aqueous solution 1 for 5 minutes in a manner that the porous support contacts with the aqueous solution, to allow precipitation of the net-like structural body at the laminated body of porous substrate 3 and the porous support. Then, the laminated body was washed with ion-exchanged water, dried by contacting it with a Yankee dryer at 130° C., and then the porous support was peeled off from the porous substrate 3. Porous substrate 3 having the net-like structural body was subject to a calendar processing with a linear pressure of 200 N/cm to give the porous sheet 6. Porous substrate 3 was used as the porous support.

Examples 7, 20, 23, 35, 38, 41, 44, 59, 62, 65, 68, 71-78, 96 and 99

Net-like structural body was allowed to precipitate by using the conditions shown in Tables 4-9 in a similar manner as Example 4, to give porous sheets 7, 20, 23, 35, 38, 41, 44, 59, 62, 65, 68, 71-78, 96 and 99.

Examples 8 15 18 21 24 27 30 33 36 39 42 45 48 51 54 57 60 63 66 69 79 82, 85, 88, 91, 94, 97, 100, 103 and 106

Net-like structural body was allowed to precipitate by using the conditions shown in Tables 4-9 in a similar manner as Example 5, to give porous sheets 8, 15, 18, 21, 24, 27, 30, 33, 36, 39, 42, 45, 48, 51, 54, 57, 60, 63, 66, 69, 79, 82, 85, 88, 91, 94, 97, 100, 103 and 106.

Examples 9-13, 19, 22, 25, 40, 43, 46, 49, 64, 67, 70, 80, 95, 98 and 101

Net-like structural body was allowed to precipitate by using the conditions shown in Tables 4-9 in a similar manner as Example 6, to give porous sheets 9-13, 19, 22, 25, 40, 43, 46, 49, 64, 67, 70, 80, 95, 98 and 101.

Example 14

A bath with 5 gum rolls having a diameter of 100 mm being arranged at the same height so that the center distance of the adjacent gum rolls have an equal interval of 300 mm was prepared. Aqueous solution 1 was filled in the bath until the height of the surface of the solution reaches the range of from the lowest point of the gum roll to a point 50 mm higher from the lowest point of the gum roll. The 5 gum rolls were rotatably arranged, in a manner that the surface of the gum rolls are constantly wet with water. One surface of the porous substrate 3 was coated with polymer solution 3 by using a blade coater, and then the substrate was allowed to go through the bath of aqueous solution 1 at the speed of 1.2 m/min, while allowing the non-coated surface of the substrate to contact with the gum roll, to allow precipitation of the net-like structural body at the porous substrate 3. Then, the substrate was washed with ion-exchanged water, dried by contacting it with a Yankee dryer at 130° C., and was subject to a calendar processing with a linear pressure of 210 N/cm to give the porous sheet 14.

Example 16

Porous substrate 3 and a porous support in a laminated state was impregnated with polymer solution 3 by using a dip coater, and was then allowed to go through between two gum rolls having a diameter of 50 mm at a squeezing pressure of 30 N/cm to remove excess polymer solution. Then, porous substrate 3 and the porous support in a laminated state was allowed to go through the bath of aqueous solution 1 used in Example 14 at the speed of 0.6 m/min, while allowing the surface of the porous support to contact with the gum roll, to allow precipitation of the net-like structural body at the laminated body of the porous substrate 3 and the porous support. Then, the laminated body was washed with ion-exchanged water, dried by contacting it with a Yankee dryer at 130° C., and then the porous support was peeled off from the porous substrate 3. Porous substrate 3 having the net-like structural body was subject to a calendar processing with a linear pressure of 230 N/cm to give the porous sheet 16. Porous substrate 3 was used as the porous support.

Examples 17, 26, 29, 32, 47, 50, 53, 56, 81, 84, 87, 90, 93, 102 and 105

Net-like structural body was allowed to precipitate by using the conditions shown in Tables 4-9 in a similar manner as Example 14, to give porous sheets 17, 26, 29, 32, 47, 50, 53, 56, 81, 84, 87, 90, 93, 102 and 105.

Examples 28, 31, 34, 37, 52, 55, 58, 61, 83, 86, 89, 92, 104 and 107

Net-like structural body was allowed to precipitate by using the conditions shown in Tables 4-9 in a similar manner as Example 16, to give porous sheets 28, 31, 34, 37, 52, 55, 58, 61, 83, 86, 89, 92, 104 and 107.

Comparative Example 1

Porous substrate 9 and a porous support in a laminated state was impregnated with polymer solution 2 by using a dip coater, and was then allowed to go through between two gum rolls having a diameter of 50 mm at a squeezing pressure of 20 N/cm to remove excess polymer solution. Then, porous substrate 9 and the porous support in a laminated state was allowed to float in aqueous solution 1 for 5 minutes in a manner that the surface of the porous support contacts with the aqueous solution, thereby allowing precipitation of the net-like structural body at the laminated body of the porous substrate 9 and the porous support. Then, the laminated body was washed with ion-exchanged water, dried by contacting it with a Yankee dryer at 130° C., and then the porous support was peeled off from the porous substrate 9. Porous substrate 9 having the net-like structural body was subject to a calendar processing with a linear pressure of 200 N/cm to give the porous sheet 108. Porous substrate 9 was used as the porous support.

Comparative Example 2

Net-like structural body was allowed to precipitate by using the conditions shown in Tables 6 and 9 in a similar manner as Comparative Example 1, to give the porous sheet 109.

Comparative Example 3

Both surfaces of porous substrate 3 were coated with polymer solution 32 by using a blade coater. The amount of coating was adjusted to 50.6 g/m$^2$ per one surface. Then, after the substrate was immersed in aqueous solution 3 for 60 seconds, it was immersed in aqueous solution 1 of 50° C. for 10 minutes. Further, after drying with hot air of 120° C. for 10 minutes, the substrate was subject to calendar processing with a linear pressure of 80 N/cm to give porous sheet 110.

Comparative Example 4

Conditions shown in Tables 6 and 9 were used, and the process was conducted in a similar manner as Comparative Example 3, while the amount of coating was adjusted to 11.8 g/m$^2$ per one surface, to give the porous sheet 111.

Comparative Example 5

Both surfaces of porous substrate 3 were coated with polymer solution 2. Then, after the substrate was immersed in aqueous solution 3 for 60 seconds, it was immersed in aqueous solution 1 of 50° C. for 10 minutes. Further, after drying with hot air of 120° C. for 10 minutes, the substrate was subject to a calendar processing with a linear pressure of 280 N/cm to give the porous sheet 112.

Comparative Example 6

Both surfaces of porous substrate 3 were coated with polymer solution 3. Then, after the substrate was immersed inaqueous solution 3 for 60 seconds, it was immersed in aqueous solution 1 of 50° C. for 10 minutes. Further, after drying with hot air of 120° C. for 10 minutes, the substrate was subject to a calendar processing with a linear pressure of 320 N/cm to give the porous sheet 113.

Comparative Example 7

Porous substrate 3 was subject to a calendar processing with a linear pressure of 150 N/cm, and was used as the porous sheet 114.

Comparative Example 8

Porous substrate 1 was used as the porous sheet 115.

Comparative Example 9

Porous substrate 5 was subject to a calendar processing with a linear pressure of 150 N/cm, and was used as the porous sheet 116.

Comparative Example 10

Porous substrate 11 was used as the porous sheet 117.

Comparative Example 11

Porous substrate 12 was used as the porous sheet 118.

Comparative Example 12

Porous substrate 13 was used as the porous sheet 119.

With respect to porous substrates 1-13 and porous sheets 1-119, evaluation was conducted by the following test methods. Physical properties of porous substrates 1-13 are shown in Table 1, and physical properties of porous sheets 1-119 are shown in Tables 10-18. Further, evaluation as a separator for an electrochemical element was conducted for porous sheets 1-119 by the following test methods, and the results are shown in Tables 19-24.

<Thickness>

Thickness of porous substrates 1-13 and porous sheets 1-119 were measured in accordance with JIS C2111.

<Density>

Density of porous substrates 1-13 and porous sheets 1-119 were measured in accordance with JIS C2111.

<Maximum Pore Diameter>

Maximum pore diameter of porous substrates 1-13 was measured in accordance with the Bubble Point Method of ASTM F316-86.

<Air Permeability>

Gurley air permeability tester having a circular pore with an outer diameter of 28.6 mm was used to measure the Gurley air permeability of porous sheets 1-119 in accordance with JIS P8117.

<Amount of Polymer Precipitate>

Value W3, which is obtained by subtracting the mass W2 of the porous substrate before precipitation of polymer from the mass W1 of the porous substrate after precipitation of the polymer, is divided by W1 then multiplied with 100. The value thus obtained is the amount of polymer precipitate.

<Area Share>

Electron microscope photographs of the front surface and the back surface of porous sheets 1-119 were taken, and the total area S1 of the polymer precipitate that exist in a square region which is 50 μm on a side, each of the square region being selected arbitrarily, and the total area S2 of the net-like structural body having penetrating pores with a pore diameter of 0.01-10 μm, were calculated. Then, S2 was divided with S1 and then multiplied with 100. The value thus obtained is the area share of the net-like structural body having penetrating pores with a pore diameter of 0.01-10 μm that accounts for the polymer precipitate.

<Average Pore Diameter>

Electron microscope photographs of the net-like structural body present in the porous sheets 1-119 are taken, and the size of randomly-selected 20 penetrating pores were measured, and their average value was taken as the average pore diameter of the net-like structural body. The diameter when the area of the penetrating pore was converted to an area of a perfect circle was taken as the pore diameter of the net-like structural body.

<Number>

Electron microscope photographs of the net-like structural body present in the porous sheets 1-119 are taken, and the number of penetrating pores that exist in a square region having 10-fold length of the average pore diameter of the penetrating pores as the side of the square was measured.

<Plane Area Percentage of Pore>

The average pore diameter and the number obtained for porous sheets 1-119 were used for the calculation of the plane area percentage of pore. The area of the penetrating pore having the average pore diameter was multiplied with the number of the penetrating pores to calculate the total plane area S3 of the penetrating pores. The total plane area S4 of the net-like structural body existing in a square region having 10-fold length of the average pore diameter of the penetrating pores as the side of the square is measured, and S3 is divided by S4 then multiplied with 100. The value thus obtained is the plane area percentage of pore.

<Electrolytic Solution Permeability>

Porous sheets 1-119 were cut out with the size of 20 mm by 20 mm, and was horizontally supported so that nothing comes in contact with the back surface. One drop of an electrolytic solution was dropped thereon, and permeability was studied. When the electrolytic solution permeated to the back surface instantly, and spread 10 mm in lateral direction within 5 seconds, it was rated A. When the electrolytic solution permeated to the back surface instantly, but required more than 5 seconds to spread 10 mm in lateral direction, it was rated B. When the electrolytic solution did not spread 10 mm in lateral direction even after 15 seconds, or when the electrolytic solution did not permeate to the back surface even after 1 second, it was rated C. When the electrolytic solution did not penetrate into the internal of the porous sheet even after 1 minute, it was rated D. A solution which was prepared by dissolving $(C_2H_5)_3(CH_3)NBF_4$ in propylene carbonate to be 1.5 mol/1 was used as the electrolytic solution.

<Dry-Up Resistance>

Porous sheets 1-119 were cut out with the size of 50 mm by 50 mm, and was impregnated with the electrolytic solution. The mass W5 of the porous sheet before the impregnation of the electrolytic solution was subtracted from the mass W4 of the porous sheet after the excess electrolytic solution was wiped off from the surface of the porous sheet, and the value thus obtained was taken as W6. The porous sheet impregnated with the electrolytic solution was sealed in an aluminum laminated storage bag, and was kept at 30° C. for 500 hours. The mass of the porous sheet after the process was taken as W7. The value W8, which is obtained by subtracting W5 from W7, was divided by W6 and then multiplied with 100. The value thus obtained is the dry-up resistance. The larger the value, the less the electrolytic solution oozes from the porous sheet, meaning that the porous sheet is excellent in dry-up resistance.

<Puncture Strength>

Porous sheets 1-119 were cut in strips having a width of 50 mm, and were impregnated with propylene carbonate for 10 minutes. Subsequently, the strips were hung for 1 minute to remove the excess propylene carbonate adhered on the porous sheets. Then, measurement of puncture strength of the porous sheets in a state where the porous sheets hold propylene carbonate was conducted. A metal needle having a diameter of 1 mm with round tip (curvature factor 1.6) (manufactured by Orientec Co., Ltd) was mounted to a desk-top material testing instrument (manufactured by Orientec Co., Ltd, product name: STA-1150), and the needle was lowered orthogonally with respect to the surface of the test sample, with a constant speed of 1 mm/s until the needle penetrates the test sample. The maximum load (N) during the process was measured, and was taken as the puncture strength. For each test sample, 5 or more points were measured, and the average value of all of the measured value was shown.

<Electrical Double Layer Capacitors 1-119>

An electrode structured by forming an electrode active material layer of 120 μm in thickness onto an aluminum foil power collecting body having a thickness of 30 μm with its surface being subject to etching treatment, was used as a positive electrode and a negative electrode. The electrode active material layer consists of 85% by mass of a powdered active charcoal having an average particle diameter of 5 μm and a BET specific surface area of 1400 $m^2/g$, 7% by mass of acetylene black having an average particle diameter of 200 nm, and 8% by mass of polyvinylidene fluoride. Porous sheets 1-119 were inserted in between the negative electrode and the positive electrode and laminated, and were then placed in an aluminum laminated storage bag to form stack-type elements. Each of the elements were heated under vacuum for 10 hours at 200° C., and moisture contained in the electrode and the porous sheet was removed. The stack-type element was allowed to cool to room temperature in vacuum, and then the electrolytic solution was injected into the element. After the injection opening was sealed, the stack-type element was fixed by applying pressure at 0.5 MPa, and thus electrical double layer capacitors 1-119 corresponding to porous sheets 1-119 were prepared by 500 for each. A solution which was prepared by dissolving $(C_2H_5)_3(CH_3)NBF_4$ in propylene carbonate to reach 1.5 mol/1 was used as the electrolytic solution.

<Fraction Defective of Manufacture 1>

The ratio of defective property occurrence due to tearing or puncture of the porous sheet caused by insufficient puncture strength of the porous sheet leading to internal short circuit, which occurred during the manufacture of each of the 500 electrical double layer capacitors 1-119 was taken as fraction defective of manufacture <Current Leakage>

The electrical double layer capacitors 1-119 were charged with a voltage of 3.5 V, and then the value of current measured during retention for 24 hours was taken as the current leakage. The smaller the current leakage, the more preferable.

<Internal Resistance>

The electrical double layer capacitors 1-119 were charged with a voltage of 3.5 V, and then the internal resistance was calculated from the voltage drop immediately after starting electrical discharge with a constant current of 20 A. The average value of 100 capacitors was taken as the internal resistance.

<Lifetime>

Charge and discharge was repeated within the voltage of 3.5 V-1.0 V for the electrical double layer capacitors 1-119, capacity after 1000 hours elapse was measured, and then calculation was made to obtain what percentage of the initial capacity would correspond. The value thus obtained was taken as the lifetime. The discharge current was 20 A. The larger the value of lifetime, the better.

<Lithium Ion Batteries 1-119>

A slurry was prepared by mixing 97% by mass of natural graphite (manufactured by Kansai Coke and Chemicals Co., Ltd, product name: NG) and 3% by mass of polyvinylidene fluoride, and then dispersing the mixture in N-methyl-2-pyrrolidone. The slurry was applied on both surfaces of a copper foil of 15 μm thickness, rolled, and then dried under vacuum for 2 hours at 150° C. to prepare a negative electrode. A slurry was prepared by mixing 95% by mass of $LiMn_2O_4$, 2% by mass of acetylene black, and 3% by mass of polyvinylidene fluoride, and then dispersing the mixture in N-methyl-2-pyrrolidone. The slurry was applied on both surfaces of an aluminum foil of 20 μm thickness, rolled, and then dried under vacuum for 2 hours at 150° C. to prepare a positive electrode. Porous sheets 1-119 were inserted in between the negative electrode and the positive electrode and wound, then placed in a cylinder container made of an aluminum alloy, and then the leads were welded. Subsequently, the cylinder container in whole was dried under vacuum for 10 hours at 200° C., and thus moisture contained in the electrode and the porous sheet was removed. The container was allowed to cool to room temperature under vacuum, followed by injection of the electrolytic solution and sealing, and thus lithium ion batteries 1-119 corresponding to porous sheets 1-119 were prepared by 500 for each. A solution prepared by dissolving $LiPF_6$ in a solvent mixture consisting of 30% by mass of ethylene carbonate and 70% by mass of diethylcarbonate to be 1.2 M was used as the electrolytic solution.

<Fraction Defective of Manufacture 2>

The ratio of defective property occurrence due to tearing or puncture of the porous sheet caused by insufficient puncture strength of the porous sheet leading to internal short circuit, which occurred during the manufacture of each of the 500 lithium ion batteries 1-119 was taken as fraction defective of manufacture 2.

<Internal Resistance>

The lithium ion batteries 1-119 were charged at 1 C for 30 minutes, and then the internal resistance was measured with an alternate current of 1 kHz.

<Initial Capacity>

The lithium ion batteries 1-119 were charged at 1 C until they reach 4.2 V, then were further charged for 3 hours with a constant voltage of 4.2 V. Then, discharge capacity when discharged at 0.2 C until they reached 3.0 V was taken as the initial capacity.

<High-Rate Property>

In the measurement of <Initial Capacity>, after discharge was conducted at 0.2 C until it reached 3.0 V, it was charged at 1 C until it reached 4.2 V, then further charged for 3 hours with a constant voltage of 4.2 V, followed by discharge at 2 C until it reached 3.0 V to measure the discharge capacity. The ratio of the discharge capacity against the initial capacity was calculated, and was taken as the high-rate property. When the value of high-rate property is large, it means that the lithium ion battery is excellent in high-rate property.

TABLE 10

| Example | Porous Sheet | Thickness [μm] | Density [g/cm$^3$] | Air Permeability [s/100 ml] | Amount of Polymer Precipitate [% by mass] |
|---|---|---|---|---|---|
| Example 1 | 1 | 20 | 0.680 | 35.5 | 11.8 |
| Example 2 | 2 | 20 | 0.680 | 35.8 | 11.8 |
| Example 3 | 3 | 20 | 0.705 | 38.7 | 14.9 |
| Example 4 | 4 | 20 | 0.640 | 3.6 | 6.3 |
| Example 5 | 5 | 20 | 0.640 | 3.6 | 6.3 |
| Example 6 | 6 | 20 | 0.685 | 5.6 | 12.4 |
| Example 7 | 7 | 20 | 0.665 | 4.5 | 9.8 |
| Example 8 | 8 | 20 | 0.665 | 4.5 | 9.8 |
| Example 9 | 9 | 20 | 0.740 | 9.5 | 18.9 |
| Example 10 | 10 | 30 | 0.647 | 28.1 | 38.1 |
| Example 11 | 11 | 30 | 0.677 | 31.6 | 40.9 |
| Example 12 | 12 | 17 | 0.871 | 13.5 | 18.9 |
| Example 13 | 13 | 16 | 0.925 | 15.3 | 18.9 |
| Example 14 | 14 | 18 | 0.689 | 1.1 | 3.2 |
| Example 15 | 15 | 18 | 0.689 | 1.1 | 3.2 |
| Example 16 | 16 | 18 | 0.722 | 3.3 | 7.7 |

TABLE 10-continued

| Example | Porous Sheet | Thickness [μm] | Density [g/cm$^3$] | Air Permeability [s/100 ml] | Amount of Polymer Precipitate [% by mass] |
|---|---|---|---|---|---|
| Example 17 | 17 | 10 | 0.730 | 4.6 | 5.5 |
| Example 18 | 18 | 10 | 0.730 | 4.6 | 5.5 |
| Example 19 | 19 | 11 | 0.691 | 7.9 | 9.2 |
| Example 20 | 20 | 25 | 0.648 | 3.2 | 7.4 |
| Example 21 | 21 | 25 | 0.648 | 3.2 | 7.4 |
| Example 22 | 22 | 25 | 0.712 | 6.8 | 15.7 |
| Example 23 | 23 | 15 | 0.553 | 2.3 | 3.6 |
| Example 24 | 24 | 15 | 0.553 | 2.3 | 3.6 |
| Example 25 | 25 | 15 | 0.580 | 5.6 | 8.0 |
| Example 26 | 26 | 20 | 0.640 | 3.5 | 6.3 |
| Example 27 | 27 | 20 | 0.640 | 3.5 | 6.3 |
| Example 28 | 28 | 22 | 0.655 | 8.1 | 16.7 |
| Example 29 | 29 | 20 | 0.615 | 0.9 | 2.4 |
| Example 30 | 30 | 20 | 0.615 | 0.9 | 2.4 |
| Example 31 | 31 | 20 | 0.645 | 3.2 | 7.0 |
| Example 32 | 32 | 26 | 0.800 | 1.1 | 3.8 |
| Example 33 | 33 | 26 | 0.800 | 1.1 | 3.8 |
| Example 34 | 34 | 28 | 0.793 | 3.9 | 9.9 |
| Example 35 | 35 | 24 | 0.696 | 4.0 | 10.2 |
| Example 36 | 36 | 24 | 0.696 | 4.0 | 10.2 |
| Example 37 | 37 | 30 | 0.700 | 13.3 | 28.6 |
| Example 38 | 38 | 20 | 0.740 | 2.8 | 8.8 |
| Example 39 | 39 | 20 | 0.740 | 2.8 | 8.8 |
| Example 40 | 40 | 22 | 0.750 | 12.2 | 18.2 |

TABLE 11

| Example | Porous Sheet | Thickness [μm] | Density [g/cm$^3$] | Air Permeability [s/100 ml] | Amount of Polymer Precipitate [% by mass] |
|---|---|---|---|---|---|
| Example 41 | 41 | 11 | 0.791 | 1.3 | 8.0 |
| Example 42 | 42 | 11 | 0.791 | 1.3 | 8.0 |
| Example 43 | 43 | 12 | 0.808 | 5.0 | 17.5 |
| Example 44 | 44 | 18 | 0.600 | 3.4 | 7.4 |
| Example 45 | 45 | 18 | 0.600 | 3.4 | 7.4 |
| Example 46 | 46 | 19 | 0.626 | 9.0 | 16.0 |
| Example 47 | 47 | 24 | 0.675 | 3.2 | 7.4 |
| Example 48 | 48 | 24 | 0.675 | 3.2 | 7.4 |
| Example 49 | 49 | 26 | 0.688 | 7.0 | 16.2 |
| Example 50 | 50 | 10 | 0.830 | 3.3 | 3.6 |
| Example 51 | 51 | 10 | 0.830 | 3.3 | 3.6 |
| Example 52 | 52 | 10 | 0.880 | 6.4 | 9.1 |
| Example 53 | 53 | 14 | 0.743 | 3.3 | 3.8 |
| Example 54 | 54 | 14 | 0.743 | 3.3 | 3.8 |
| Example 55 | 55 | 15 | 0.740 | 8.6 | 9.9 |
| Example 56 | 56 | 13 | 0.669 | 1.0 | 8.0 |
| Example 57 | 57 | 13 | 0.669 | 1.0 | 8.0 |
| Example 58 | 58 | 14 | 0.686 | 3.2 | 16.7 |
| Example 59 | 59 | 20 | 0.735 | 2.7 | 8.2 |
| Example 60 | 60 | 20 | 0.735 | 2.7 | 8.2 |
| Example 61 | 61 | 23 | 0.748 | 14.5 | 21.5 |
| Example 62 | 62 | 20 | 0.650 | 7.1 | 7.7 |
| Example 63 | 63 | 20 | 0.650 | 7.1 | 7.7 |
| Example 64 | 64 | 22 | 0.650 | 11.6 | 16.1 |
| Example 65 | 65 | 9 | 0.822 | 5.2 | 6.8 |
| Example 66 | 66 | 9 | 0.822 | 5.2 | 6.8 |
| Example 67 | 67 | 10 | 0.800 | 8.4 | 13.8 |
| Example 68 | 68 | 20 | 0.680 | 7.1 | 11.8 |
| Example 69 | 69 | 20 | 0.680 | 7.1 | 11.8 |
| Example 70 | 70 | 24 | 0.675 | 13.5 | 25.9 |
| Example 71 | 71 | 37 | 0.295 | 0.8 | 8.3 |
| Example 72 | 72 | 35 | 0.311 | 1.0 | 8.3 |
| Example 73 | 73 | 27 | 0.404 | 1.6 | 8.3 |
| Example 74 | 74 | 21 | 0.519 | 3.0 | 8.3 |
| Example 75 | 75 | 18 | 0.606 | 4.0 | 8.3 |
| Example 76 | 76 | 15 | 0.727 | 6.2 | 8.3 |
| Example 77 | 77 | 13 | 0.838 | 8.7 | 8.3 |
| Example 78 | 78 | 12 | 0.908 | 10.3 | 8.3 |

TABLE 11-continued

| Example | Porous Sheet | Thickness [μm] | Density [g/cm$^3$] | Air Permeability [s/100 ml] | Amount of Polymer Precipitate [% by mass] |
|---|---|---|---|---|---|
| Example 79 | 79 | 18 | 0.606 | 3.9 | 8.3 |
| Example 80 | 80 | 18 | 0.650 | 8.5 | 14.5 |

TABLE 12

| Example | Porous Sheet | Thickness [μm] | Density [g/cm$^3$] | Air Permeability [s/100 ml] | Amount of Polymer Precipitate [% by mass] |
|---|---|---|---|---|---|
| Example 81 | 81 | 20 | 0.735 | 2.6 | 8.2 |
| Example 82 | 82 | 20 | 0.735 | 2.6 | 8.2 |
| Example 83 | 83 | 22 | 0.745 | 11.5 | 17.7 |
| Example 84 | 84 | 20 | 0.725 | 2.0 | 6.9 |
| Example 85 | 85 | 20 | 0.725 | 2.0 | 6.9 |
| Example 86 | 86 | 22 | 0.727 | 9.3 | 15.6 |
| Example 87 | 87 | 28 | 0.743 | 1.0 | 3.8 |
| Example 88 | 88 | 28 | 0.743 | 1.0 | 3.8 |
| Example 89 | 89 | 30 | 0.740 | 3.7 | 9.9 |
| Example 90 | 90 | 20 | 0.785 | 1.8 | 4.5 |
| Example 91 | 91 | 20 | 0.785 | 1.8 | 4.5 |
| Example 92 | 92 | 20 | 0.815 | 4.3 | 8.0 |
| Example 93 | 93 | 16 | 0.781 | 1.5 | 4.0 |
| Example 94 | 94 | 16 | 0.781 | 1.5 | 4.0 |
| Example 95 | 95 | 17 | 0.776 | 4.6 | 9.1 |
| Example 96 | 96 | 20 | 0.640 | 3.8 | 6.3 |
| Example 97 | 97 | 20 | 0.640 | 3.8 | 6.3 |
| Example 98 | 98 | 22 | 0.655 | 8.8 | 16.7 |
| Example 99 | 99 | 14 | 0.743 | 3.6 | 3.8 |
| Example 100 | 100 | 14 | 0.743 | 3.6 | 3.8 |
| Example 101 | 101 | 15 | 0.740 | 9.4 | 9.9 |
| Example 102 | 102 | 20 | 0.675 | 6.9 | 11.1 |
| Example 103 | 103 | 20 | 0.675 | 6.9 | 11.1 |
| Example 104 | 104 | 23 | 0.678 | 13.1 | 23.1 |
| Example 105 | 105 | 13 | 0.685 | 3.4 | 10.1 |
| Example 106 | 106 | 13 | 0.685 | 3.4 | 10.1 |
| Example 107 | 107 | 15 | 0.687 | 8.8 | 22.3 |
| Comparative Example 1 | 108 | 25 | 0.680 | 0.6 | 11.8 |
| Comparative Example 2 | 109 | 12 | 0.667 | 37.7 | 13.8 |
| Comparative Example 3 | 110 | 40 | 0.503 | 29.5 | 40.3 |
| Comparative Example 4 | 111 | 20 | 0.695 | 23.7 | 13.7 |
| Comparative Example 5 | 112 | 20 | 0.780 | 42.4 | 23.1 |
| Comparative Example 6 | 113 | 20 | 0.825 | 46.7 | 27.3 |
| Comparative Example 7 | 114 | 20 | 0.600 | 0.3 | 0 |
| Comparative Example 8 | 115 | 15 | 0.460 | 0.6 | 0 |
| Comparative Example 9 | 116 | 25 | 0.600 | 0.2 | 0 |
| Comparative Example 10 | 117 | 25 | 0.800 | 15.0 | 0 |
| Comparative Example 11 | 118 | 50 | 0.400 | 7.0 | 0 |
| Comparative Example 12 | 119 | 25 | 0.500 | 350 | 0 |

TABLE 13

| Example | Porous Sheet | Area Share [%] | Average Pore Diameter [μm] | Number | Plane Area Percentage of Pore [%] |
|---|---|---|---|---|---|
| Example 1 | 1 | 33.6 | 0.56 | 18 | 14.1 |
| Example 2 | 2 | 35.4 | 0.56 | 19 | 14.9 |
| Example 3 | 3 | 35.1 | 0.41 | 20 | 15.7 |
| Example 4 | 4 | 88.5 | 3.28 | 54 | 42.3 |
| Example 5 | 5 | 88.0 | 3.35 | 52 | 40.8 |
| Example 6 | 6 | 91.5 | 5.30 | 76 | 59.6 |
| Example 7 | 7 | 94.6 | 0.38 | 53 | 41.6 |
| Example 8 | 8 | 94.6 | 0.37 | 54 | 42.3 |
| Example 9 | 9 | 96.7 | 1.84 | 65 | 51.0 |
| Example 10 | 10 | 96.0 | 0.58 | 30 | 23.5 |
| Example 11 | 11 | 95.0 | 0.55 | 23 | 18.0 |
| Example 12 | 12 | 96.7 | 1.63 | 65 | 51.0 |
| Example 13 | 13 | 96.7 | 1.63 | 65 | 51.0 |
| Example 14 | 14 | 95.5 | 0.74 | 85 | 66.7 |
| Example 15 | 15 | 95.5 | 0.86 | 83 | 65.1 |
| Example 16 | 16 | 97.9 | 0.56 | 88 | 69.1 |
| Example 17 | 17 | 90.6 | 0.33 | 77 | 60.4 |
| Example 18 | 18 | 90.8 | 0.32 | 77 | 60.4 |
| Example 19 | 19 | 93.0 | 0.64 | 79 | 62.0 |
| Example 20 | 20 | 92.8 | 0.41 | 78 | 61.2 |
| Example 21 | 21 | 92.4 | 0.42 | 78 | 61.2 |
| Example 22 | 22 | 93.7 | 1.16 | 81 | 63.5 |
| Example 23 | 23 | 91.2 | 0.35 | 76 | 59.6 |
| Example 24 | 24 | 91.5 | 0.36 | 77 | 60.4 |
| Example 25 | 25 | 93.7 | 0.58 | 79 | 62.0 |
| Example 26 | 26 | 93.3 | 0.56 | 81 | 63.5 |
| Example 27 | 27 | 93.5 | 0.55 | 81 | 63.5 |
| Example 28 | 28 | 94.2 | 0.88 | 85 | 66.7 |
| Example 29 | 29 | 92.7 | 0.49 | 80 | 62.8 |
| Example 30 | 30 | 92.5 | 0.48 | 80 | 62.8 |
| Example 31 | 31 | 93.6 | 0.82 | 82 | 64.3 |
| Example 32 | 32 | 93.5 | 0.71 | 78 | 61.2 |
| Example 33 | 33 | 93.3 | 0.73 | 77 | 60.4 |
| Example 34 | 34 | 94.0 | 1.29 | 77 | 60.4 |
| Example 35 | 35 | 92.2 | 1.58 | 77 | 60.4 |
| Example 36 | 36 | 92.2 | 1.65 | 77 | 60.4 |
| Example 37 | 37 | 93.9 | 4.52 | 77 | 60.4 |
| Example 38 | 38 | 92.0 | 0.88 | 80 | 62.8 |
| Example 39 | 39 | 92.2 | 0.85 | 81 | 63.5 |
| Example 40 | 40 | 92.8 | 1.46 | 83 | 65.1 |

TABLE 14

| Example | Porous Sheet | Area Share [%] | Average Pore Diameter [μm] | Number | Plane Area Percentage of Pore [%] |
|---|---|---|---|---|---|
| Example 41 | 41 | 91.4 | 0.33 | 78 | 61.2 |
| Example 42 | 42 | 91.5 | 0.34 | 78 | 61.2 |
| Example 43 | 43 | 93.2 | 0.77 | 80 | 62.8 |
| Example 44 | 44 | 92.2 | 0.55 | 80 | 62.8 |
| Example 45 | 45 | 92.1 | 0.56 | 80 | 62.8 |
| Example 46 | 46 | 93.8 | 0.92 | 81 | 63.5 |
| Example 47 | 47 | 91.7 | 0.64 | 82 | 64.3 |
| Example 48 | 48 | 91.5 | 0.65 | 82 | 64.3 |
| Example 49 | 49 | 93.6 | 1.86 | 82 | 64.3 |
| Example 50 | 50 | 91.5 | 0.12 | 77 | 60.4 |
| Example 51 | 51 | 91.5 | 0.14 | 77 | 60.4 |
| Example 52 | 52 | 94.0 | 0.31 | 80 | 62.8 |
| Example 53 | 53 | 93.0 | 0.66 | 79 | 62.0 |
| Example 54 | 54 | 93.0 | 0.65 | 78 | 61.2 |
| Example 55 | 55 | 93.7 | 1.08 | 78 | 61.2 |
| Example 56 | 56 | 92.5 | 0.96 | 79 | 62.0 |
| Example 57 | 57 | 92.6 | 0.96 | 80 | 62.8 |
| Example 58 | 58 | 93.5 | 2.42 | 80 | 62.8 |
| Example 59 | 59 | 93.6 | 0.25 | 79 | 62.0 |
| Example 60 | 60 | 93.6 | 0.24 | 79 | 62.0 |
| Example 61 | 61 | 94.0 | 0.63 | 78 | 61.2 |
| Example 62 | 62 | 93.3 | 0.52 | 81 | 63.5 |
| Example 63 | 63 | 93.2 | 0.52 | 81 | 63.5 |
| Example 64 | 64 | 93.7 | 1.56 | 84 | 65.9 |

TABLE 14-continued

| Example | Porous Sheet | Area Share [%] | Average Pore Diameter [μm] | Number | Plane Area Percentage of Pore [%] |
|---|---|---|---|---|---|
| Example 65 | 65 | 91.5 | 0.11 | 80 | 62.8 |
| Example 66 | 66 | 91.5 | 0.11 | 80 | 62.8 |
| Example 67 | 67 | 92.8 | 0.38 | 81 | 63.5 |
| Example 68 | 68 | 92.2 | 0.74 | 78 | 61.2 |
| Example 69 | 69 | 92.3 | 0.76 | 78 | 61.2 |
| Example 70 | 70 | 93.3 | 1.61 | 77 | 60.4 |
| Example 71 | 71 | 93.1 | 0.82 | 77 | 60.4 |
| Example 72 | 72 | 93.1 | 0.82 | 77 | 60.4 |
| Example 73 | 73 | 93.1 | 0.82 | 77 | 60.4 |
| Example 74 | 74 | 93.1 | 0.82 | 77 | 60.4 |
| Example 75 | 75 | 93.1 | 0.82 | 77 | 60.4 |
| Example 76 | 76 | 93.1 | 0.82 | 77 | 60.4 |
| Example 77 | 77 | 93.1 | 0.82 | 77 | 60.4 |
| Example 78 | 78 | 93.1 | 0.82 | 77 | 60.4 |
| Example 79 | 79 | 93.1 | 0.84 | 77 | 60.4 |
| Example 80 | 80 | 94.2 | 1.76 | 78 | 61.2 |

TABLE 15

| Example | Porous Sheet | Area Share [%] | Average Pore Diameter [μm] | Number | Plane Area Percentage of Pore [%] |
|---|---|---|---|---|---|
| Example 81 | 81 | 92.8 | 0.76 | 80 | 62.8 |
| Example 82 | 82 | 92.5 | 0.75 | 80 | 62.8 |
| Example 83 | 83 | 93.3 | 1.18 | 81 | 63.5 |
| Example 84 | 84 | 92.5 | 0.82 | 77 | 60.4 |
| Example 85 | 85 | 92.5 | 0.82 | 77 | 60.4 |
| Example 86 | 86 | 93.4 | 1.36 | 79 | 62.0 |
| Example 87 | 87 | 92.8 | 0.61 | 82 | 64.3 |
| Example 88 | 88 | 92.8 | 0.62 | 80 | 62.8 |
| Example 89 | 89 | 93.9 | 0.95 | 78 | 61.2 |
| Example 90 | 90 | 93.1 | 0.43 | 81 | 63.5 |
| Example 91 | 91 | 93.1 | 0.44 | 80 | 62.8 |
| Example 92 | 92 | 93.8 | 0.78 | 81 | 63.5 |
| Example 93 | 93 | 92.7 | 1.14 | 82 | 64.3 |
| Example 94 | 94 | 92.5 | 1.10 | 80 | 62.8 |
| Example 95 | 95 | 93.4 | 3.36 | 80 | 62.8 |
| Example 96 | 96 | 91.6 | 0.67 | 80 | 62.8 |
| Example 97 | 97 | 91.8 | 0.68 | 81 | 63.5 |
| Example 98 | 98 | 93.1 | 0.93 | 81 | 63.5 |
| Example 99 | 99 | 92.6 | 0.85 | 82 | 64.3 |
| Example 100 | 100 | 92.6 | 0.86 | 82 | 64.3 |
| Example 101 | 101 | 93.7 | 1.33 | 83 | 65.1 |
| Example 102 | 102 | 85.0 | 0.36 | 28 | 21.9 |
| Example 103 | 103 | 86.0 | 0.37 | 27 | 17.8 |
| Example 104 | 104 | 89.5 | 0.48 | 23 | 18.0 |
| Example 105 | 105 | 71.0 | 0.22 | 27 | 21.1 |
| Example 106 | 106 | 70.5 | 0.23 | 26 | 20.4 |
| Example 107 | 107 | 80.5 | 0.35 | 21 | 16.4 |
| Comparative Example 1 | 108 | 92.5 | 0.36 | 32 | 25.1 |
| Comparative Example 2 | 109 | 93.0 | 0.23 | 15 | 11.7 |
| Comparative Example 3 | 110 | 40.5 | 0.29 | 10 | 7.8 |
| Comparative Example 4 | 111 | 41.2 | 0.46 | 12 | 9.4 |
| Comparative Example 5 | 112 | 34.6 | None | 0 | 0 |
| Comparative Example 6 | 113 | 34.0 | None | 0 | 0 |
| Comparative Example 7 | 114 | 0 | None | 0 | 0 |
| Comparative Example 8 | 115 | 0 | None | 0 | 0 |
| Comparative Example 9 | 116 | 0 | None | 0 | 0 |
| Comparative Example 10 | 117 | 0 | None | 0 | 0 |

TABLE 15-continued

| Example | Porous Sheet | Area Share [%] | Average Pore Diameter [μm] | Number | Plane Area Percentage of Pore [%] |
|---|---|---|---|---|---|
| Comparative Example 11 | 118 | 0 | None | 0 | 0 |
| Comparative Example 12 | 119 | 0 | None | 0 | 0 |

TABLE 16

| Example | Porous Sheet | Electrolytic Solution Permeability | Dry-up Resistance [%] | Puncture Strength [N] |
|---|---|---|---|---|
| Example 1 | 1 | B | 83.7 | 2.6 |
| Example 2 | 2 | B | 85.2 | 2.6 |
| Example 3 | 3 | B | 85.0 | 2.2 |
| Example 4 | 4 | A | 96.1 | 2.5 |
| Example 5 | 5 | A | 96.1 | 2.5 |
| Example 6 | 6 | A | 95.7 | 2.6 |
| Example 7 | 7 | A | 95.9 | 2.1 |
| Example 8 | 8 | A | 95.9 | 2.1 |
| Example 9 | 9 | A | 95.1 | 2.3 |
| Example 10 | 10 | A | 96.0 | 3.0 |
| Example 11 | 11 | B | 95.0 | 3.1 |
| Example 12 | 12 | A | 93.8 | 2.3 |
| Example 13 | 13 | B | 93.3 | 2.3 |
| Example 14 | 14 | A | 95.6 | 2.3 |
| Example 15 | 15 | A | 95.6 | 2.3 |
| Example 16 | 16 | A | 95.5 | 2.4 |
| Example 17 | 17 | A | 95.2 | 1.4 |
| Example 18 | 18 | A | 95.2 | 1.4 |
| Example 19 | 19 | A | 95.6 | 1.5 |
| Example 20 | 20 | A | 96.0 | 2.9 |
| Example 21 | 21 | A | 96.0 | 2.9 |
| Example 22 | 22 | A | 95.4 | 3.2 |
| Example 23 | 23 | A | 97.0 | 1.6 |
| Example 24 | 24 | A | 97.0 | 1.6 |
| Example 25 | 25 | A | 96.7 | 1.7 |
| Example 26 | 26 | A | 96.1 | 2.5 |
| Example 27 | 27 | A | 96.1 | 2.5 |
| Example 28 | 28 | A | 96.0 | 2.7 |
| Example 29 | 29 | A | 96.4 | 2.4 |
| Example 30 | 30 | A | 96.4 | 2.4 |
| Example 31 | 31 | A | 96.1 | 2.4 |
| Example 32 | 32 | A | 94.5 | 3.6 |
| Example 33 | 33 | A | 94.5 | 3.6 |
| Example 34 | 34 | A | 94.6 | 3.8 |
| Example 35 | 35 | A | 95.5 | 2.9 |
| Example 36 | 36 | A | 95.5 | 2.9 |
| Example 37 | 37 | A | 95.5 | 3.7 |
| Example 38 | 38 | A | 95.1 | 2.7 |
| Example 39 | 39 | A | 95.1 | 2.7 |
| Example 40 | 40 | A | 95.0 | 3.0 |

TABLE 17

| Example | Porous Sheet | Electrolytic Solution Permeability | Dry-up Resistance [%] | Puncture Strength [N] |
|---|---|---|---|---|
| Example 41 | 41 | A | 94.6 | 1.5 |
| Example 42 | 42 | A | 94.6 | 1.5 |
| Example 43 | 43 | A | 94.4 | 1.7 |
| Example 44 | 44 | A | 96.6 | 1.9 |
| Example 45 | 45 | A | 96.5 | 1.9 |
| Example 46 | 46 | A | 96.2 | 2.1 |
| Example 47 | 47 | A | 95.8 | 2.9 |
| Example 48 | 48 | A | 95.8 | 2.9 |
| Example 49 | 49 | A | 95.6 | 3.2 |
| Example 50 | 50 | A | 94.2 | 1.6 |
| Example 51 | 51 | A | 94.2 | 1.6 |
| Example 52 | 52 | A | 93.7 | 1.7 |

TABLE 17-continued

| Example | Porous Sheet | Electrolytic Solution Permeability | Dry-up Resistance [%] | Puncture Strength [N] |
|---|---|---|---|---|
| Example 53 | 53 | A | 95.1 | 1.9 |
| Example 54 | 54 | A | 95.1 | 1.9 |
| Example 55 | 55 | A | 95.1 | 2.0 |
| Example 56 | 56 | A | 95.8 | 1.5 |
| Example 57 | 57 | A | 95.8 | 1.5 |
| Example 58 | 58 | A | 95.6 | 1.7 |
| Example 59 | 59 | A | 95.2 | 2.7 |
| Example 60 | 60 | A | 95.2 | 2.7 |
| Example 61 | 61 | A | 95.0 | 3.1 |
| Example 62 | 62 | A | 96.0 | 2.5 |
| Example 63 | 63 | A | 96.0 | 2.5 |
| Example 64 | 64 | A | 96.0 | 2.6 |
| Example 65 | 65 | A | 94.3 | 1.4 |
| Example 66 | 66 | A | 94.3 | 1.4 |
| Example 67 | 67 | A | 94.5 | 1.5 |
| Example 68 | 68 | A | 95.7 | 2.7 |
| Example 69 | 69 | A | 95.7 | 2.7 |
| Example 70 | 70 | A | 95.8 | 3.1 |
| Example 71 | 71 | A | 99.6 | 1.9 |
| Example 72 | 72 | A | 99.4 | 1.9 |
| Example 73 | 73 | A | 98.5 | 1.9 |
| Example 74 | 74 | A | 97.4 | 1.9 |
| Example 75 | 75 | A | 96.5 | 1.9 |
| Example 76 | 76 | A | 95.3 | 1.9 |
| Example 77 | 77 | A | 94.2 | 1.9 |
| Example 78 | 78 | B | 93.4 | 1.9 |
| Example 79 | 79 | A | 96.5 | 1.9 |
| Example 80 | 80 | A | 96.0 | 2.1 |

TABLE 18

| Example | Porous Sheet | Electrolytic Solution Permeability | Dry-up Resistance [%] | Puncture Strength [N] |
|---|---|---|---|---|
| Example 81 | 81 | A | 95.2 | 2.7 |
| Example 82 | 82 | A | 95.2 | 2.7 |
| Example 83 | 83 | A | 95.0 | 3.0 |
| Example 84 | 84 | A | 95.3 | 2.7 |
| Example 85 | 85 | A | 95.3 | 2.7 |
| Example 86 | 86 | A | 95.2 | 2.9 |
| Example 87 | 87 | A | 95.1 | 3.6 |
| Example 88 | 88 | A | 95.1 | 3.6 |
| Example 89 | 89 | A | 95.1 | 3.8 |
| Example 90 | 90 | A | 94.7 | 2.8 |
| Example 91 | 91 | A | 94.7 | 2.8 |
| Example 92 | 92 | A | 94.4 | 2.9 |
| Example 93 | 93 | A | 94.7 | 2.4 |
| Example 94 | 94 | A | 94.7 | 2.4 |
| Example 95 | 95 | A | 94.7 | 2.5 |
| Example 96 | 96 | A | 95.5 | 2.5 |
| Example 97 | 97 | A | 95.5 | 2.5 |
| Example 98 | 98 | A | 95.2 | 2.8 |
| Example 99 | 99 | A | 94.8 | 1.9 |
| Example 100 | 100 | A | 94.8 | 1.9 |
| Example 101 | 101 | A | 94.5 | 1.9 |
| Example 102 | 102 | A | 95.8 | 2.2 |
| Example 103 | 103 | A | 95.8 | 2.2 |
| Example 104 | 104 | B | 95.7 | 2.5 |
| Example 105 | 105 | A | 95.7 | 1.5 |
| Example 106 | 106 | A | 95.7 | 1.5 |
| Example 107 | 107 | B | 95.6 | 1.7 |
| Comparative Example 1 | 108 | A | 95.2 | 2.8 |
| Comparative Example 2 | 109 | C | 94.0 | 1.9 |
| Comparative Example 3 | 110 | C | 85.1 | 3.5 |
| Comparative Example 4 | 111 | C | 85.7 | 2.5 |
| Comparative Example 5 | 112 | C | 74.5 | 2.7 |

TABLE 18-continued

| Example | Porous Sheet | Electrolytic Solution Permeability | Dry-up Resistance [%] | Puncture Strength [N] |
|---|---|---|---|---|
| Comparative Example 6 | 113 | C | 72.8 | 2.8 |
| Comparative Example 7 | 114 | A | 96.0 | 0.3 |
| Comparative Example 8 | 115 | A | 97.4 | 0.8 |
| Comparative Example 9 | 116 | A | 96.0 | 0.4 |
| Comparative Example 10 | 117 | C | 94.0 | 0.2 |
| Comparative Example 11 | 118 | A | 93.3 | 0.2 |
| Comparative Example 12 | 119 | D | 84.5 | 3.6 |

TABLE 19

| Porous Sheet | Electrical Double Layer Capacitor | Fraction Defective of Manufacture 1 [%] | Current Leakage [mA] | Internal Resistance [mΩ] | Lifetime [%] |
|---|---|---|---|---|---|
| 1 | 1 | 0.0 | 0.22 | 6.3 | 71.8 |
| 2 | 2 | 0.0 | 0.22 | 6.3 | 71.5 |
| 3 | 3 | 0.0 | 0.21 | 6.9 | 70.9 |
| 4 | 4 | 0.0 | 0.79 | 1.2 | 91.1 |
| 5 | 5 | 0.0 | 0.79 | 1.2 | 91.1 |
| 6 | 6 | 0.0 | 0.50 | 1.6 | 90.3 |
| 7 | 7 | 0.0 | 0.60 | 1.5 | 90.3 |
| 8 | 8 | 0.0 | 0.60 | 1.5 | 90.3 |
| 9 | 9 | 0.0 | 0.33 | 2.7 | 85.1 |
| 10 | 10 | 0.0 | 0.25 | 4.1 | 81.7 |
| 11 | 11 | 0.0 | 0.24 | 4.7 | 78.1 |
| 12 | 12 | 0.0 | 0.30 | 3.9 | 80.6 |
| 13 | 13 | 0.0 | 0.25 | 4.4 | 76.4 |
| 14 | 14 | 0.0 | 0.95 | 0.5 | 93.3 |
| 15 | 15 | 0.0 | 0.95 | 0.5 | 93.3 |
| 16 | 16 | 0.0 | 0.65 | 0.9 | 93.8 |
| 17 | 17 | 1.8 | 0.60 | 1.5 | 90.0 |
| 18 | 18 | 1.8 | 0.60 | 1.5 | 90.0 |
| 19 | 19 | 1.0 | 0.39 | 2.0 | 88.9 |
| 20 | 20 | 0.0 | 0.70 | 0.9 | 93.2 |
| 21 | 21 | 0.0 | 0.70 | 0.9 | 93.2 |
| 22 | 22 | 0.0 | 0.46 | 2.0 | 88.4 |
| 23 | 23 | 0.0 | 0.85 | 0.6 | 93.8 |
| 24 | 24 | 0.0 | 0.85 | 0.6 | 93.8 |
| 25 | 25 | 0.0 | 0.50 | 1.5 | 91.3 |
| 26 | 26 | 0.0 | 0.68 | 1.1 | 91.9 |
| 27 | 27 | 0.0 | 0.68 | 1.1 | 91.9 |
| 28 | 28 | 0.0 | 0.40 | 2.3 | 87.5 |
| 29 | 29 | 0.0 | 1.15 | 0.3 | 79.2 |
| 30 | 30 | 0.0 | 1.15 | 0.3 | 79.2 |
| 31 | 31 | 0.0 | 0.70 | 1.0 | 92.3 |
| 32 | 32 | 0.0 | 0.95 | 0.5 | 92.7 |
| 33 | 33 | 0.0 | 0.95 | 0.5 | 92.7 |
| 34 | 34 | 0.0 | 0.66 | 1.2 | 91.0 |
| 35 | 35 | 0.0 | 0.65 | 1.3 | 91.0 |
| 36 | 36 | 0.0 | 0.65 | 1.3 | 91.0 |
| 37 | 37 | 0.0 | 0.25 | 3.8 | 80.6 |
| 38 | 38 | 0.0 | 0.77 | 1.0 | 91.3 |
| 39 | 39 | 0.0 | 0.77 | 1.0 | 91.3 |
| 40 | 40 | 0.0 | 0.28 | 3.5 | 81.7 |

TABLE 20

| Porous Sheet | Electrical Double Layer Capacitor | Fraction Defective of Manufacture 1 [%] | Current Leakage [mA] | Internal Resistance [mΩ] | Lifetime [%] |
|---|---|---|---|---|---|
| 41 | 41 | 0.6 | 0.94 | 0.5 | 92.8 |
| 42 | 42 | 0.6 | 0.94 | 0.5 | 92.8 |
| 43 | 43 | 0.0 | 0.55 | 1.4 | 90.3 |

TABLE 20-continued

| Porous Sheet | Electrical Double Layer Capacitor | Fraction Defective of Manufacture 1 [%] | Current Leakage [mA] | Internal Resistance [mΩ] | Lifetime [%] |
|---|---|---|---|---|---|
| 44 | 44 | 0.0 | 0.70 | 1.0 | 92.5 |
| 45 | 45 | 0.0 | 0.70 | 1.0 | 92.5 |
| 46 | 46 | 0.0 | 0.35 | 2.5 | 86.9 |
| 47 | 47 | 0.0 | 0.70 | 1.1 | 91.8 |
| 48 | 48 | 0.0 | 0.70 | 1.1 | 91.8 |
| 49 | 49 | 0.0 | 0.43 | 2.0 | 88.6 |
| 50 | 50 | 0.0 | 0.70 | 1.2 | 90.5 |
| 51 | 51 | 0.0 | 0.70 | 1.2 | 90.5 |
| 52 | 52 | 0.0 | 0.46 | 1.8 | 88.5 |
| 53 | 53 | 0.0 | 0.71 | 1.2 | 90.7 |
| 54 | 54 | 0.0 | 0.71 | 1.2 | 90.7 |
| 55 | 55 | 0.0 | 0.37 | 2.4 | 86.8 |
| 56 | 56 | 0.0 | 0.97 | 0.5 | 93.3 |
| 57 | 57 | 0.0 | 0.97 | 0.5 | 93.3 |
| 58 | 58 | 0.0 | 0.69 | 1.1 | 91.7 |
| 59 | 59 | 0.0 | 0.80 | 1.0 | 91.4 |
| 60 | 60 | 0.0 | 0.80 | 1.0 | 91.4 |
| 61 | 61 | 0.0 | 0.24 | 3.4 | 82.4 |
| 62 | 62 | 0.0 | 0.39 | 2.0 | 89.1 |
| 63 | 63 | 0.0 | 0.39 | 2.0 | 89.1 |
| 64 | 64 | 0.0 | 0.24 | 2.9 | 85.3 |
| 65 | 65 | 2.4 | 0.55 | 1.7 | 88.8 |
| 66 | 66 | 2.4 | 0.55 | 1.7 | 88.8 |
| 67 | 67 | 1.6 | 0.38 | 2.2 | 87.4 |
| 68 | 68 | 0.0 | 0.55 | 2.0 | 88.0 |
| 69 | 69 | 0.0 | 0.55 | 2.0 | 88.0 |
| 70 | 70 | 0.0 | 0.24 | 3.3 | 83.3 |
| 71 | 71 | 0.0 | 1.45 | 0.3 | 89.4 |
| 72 | 72 | 0.0 | 1.00 | 0.3 | 91.2 |
| 73 | 73 | 0.0 | 0.90 | 0.4 | 92.5 |
| 74 | 74 | 0.0 | 0.85 | 0.9 | 93.2 |
| 75 | 75 | 0.0 | 0.70 | 1.1 | 93.7 |
| 76 | 76 | 0.0 | 0.65 | 2.0 | 91.8 |
| 77 | 77 | 0.0 | 0.60 | 3.5 | 79.5 |
| 78 | 78 | 0.0 | 0.30 | 4.2 | 78.9 |
| 79 | 79 | 0.0 | 0.70 | 1.1 | 92.7 |
| 80 | 80 | 0.0 | 0.50 | 2.2 | 92.2 |

TABLE 21

| Porous Sheet | Electrical Double Layer Capacitor | Fraction Defective of Manufacture 1 [%] | Current Leakage [mA] | Internal Resistance [mΩ] | Lifetime [%] |
|---|---|---|---|---|---|
| 81 | 81 | 0.0 | 0.80 | 2.7 | 91.6 |
| 82 | 82 | 0.0 | 0.80 | 2.7 | 91.6 |
| 83 | 83 | 0.0 | 0.25 | 3.0 | 84.3 |
| 84 | 84 | 0.0 | 0.88 | 0.7 | 92.4 |
| 85 | 85 | 0.0 | 0.88 | 0.7 | 92.4 |
| 86 | 86 | 0.0 | 0.33 | 2.5 | 86.5 |
| 87 | 87 | 0.0 | 1.00 | 0.5 | 92.7 |
| 88 | 88 | 0.0 | 1.00 | 0.5 | 92.7 |
| 89 | 89 | 0.0 | 0.73 | 1.2 | 90.7 |
| 90 | 90 | 0.0 | 0.78 | 0.7 | 92.7 |
| 91 | 91 | 0.0 | 0.78 | 0.7 | 92.7 |
| 92 | 92 | 0.0 | 0.70 | 1.5 | 89.0 |
| 93 | 93 | 0.0 | 0.79 | 0.6 | 93.3 |
| 94 | 94 | 0.0 | 0.79 | 0.6 | 93.3 |
| 95 | 95 | 0.0 | 0.69 | 1.6 | 88.9 |
| 96 | 96 | 0.0 | 0.68 | 1.3 | 87.5 |
| 97 | 97 | 0.0 | 0.68 | 1.3 | 87.5 |
| 98 | 98 | 0.0 | 0.40 | 2.5 | 82.9 |
| 99 | 99 | 0.0 | 0.71 | 1.4 | 86.5 |
| 100 | 100 | 0.0 | 0.71 | 1.4 | 86.5 |
| 101 | 101 | 0.0 | 0.37 | 2.7 | 82.7 |
| 102 | 102 | 0.0 | 0.42 | 3.0 | 88.8 |
| 103 | 103 | 0.0 | 0.42 | 3.0 | 83.8 |
| 104 | 104 | 0.0 | 0.30 | 4.6 | 76.4 |
| 105 | 105 | 0.0 | 0.63 | 2.9 | 83.1 |
| 106 | 106 | 0.0 | 0.63 | 2.9 | 83.1 |
| 107 | 107 | 0.0 | 0.40 | 4.3 | 74.0 |

TABLE 21-continued

| Porous Sheet | Electrical Double Layer Capacitor | Fraction Defective of Manufacture 1 [%] | Current Leakage [mA] | Internal Resistance [mΩ] | Lifetime [%] |
|---|---|---|---|---|---|
| 108 | 108 | 0.0 | 1.85 | 0.2 | 67.3 |
| 109 | 109 | 0.0 | 0.21 | 6.3 | 64.5 |
| 110 | 110 | 0.0 | 0.10 | 9.0 | 48.5 |
| 111 | 111 | 0.0 | 0.15 | 7.0 | 58.8 |
| 112 | 112 | 0.0 | 0.10 | 10.5 | 34.3 |
| 113 | 113 | 0.0 | 0.10 | 12.3 | 24.4 |
| 114 | 114 | 5.6 | 2.34 | 0.1 | 61.1 |
| 115 | 115 | 3.4 | 2.68 | 0.1 | 61.6 |
| 116 | 116 | 5.0 | 2.11 | 0.1 | 62.8 |
| 117 | 117 | 3.2 | 0.60 | 7.7 | 55.5 |
| 118 | 118 | 2.8 | 0.77 | 0.8 | 0.0 |
| 119 | 119 | 0.0 | 0.05 | 19.5 | 35.5 |

TABLE 22

| Porous Sheet | Lithium Ion Battery | Fraction Defective of Manufacture 2 [%] | Internal Resistance [mΩ] | Initial Capacity [mA] | High-rate Property [%] |
|---|---|---|---|---|---|
| 1 | 1 | 0.0 | 50 | 865 | 78.5 |
| 2 | 2 | 0.0 | 50 | 865 | 78.4 |
| 3 | 3 | 0.0 | 50 | 850 | 76.2 |
| 4 | 4 | 0.0 | 26 | 1190 | 93.4 |
| 5 | 5 | 0.0 | 26 | 1190 | 93.4 |
| 6 | 6 | 0.0 | 27 | 1133 | 92.3 |
| 7 | 7 | 0.0 | 27 | 1146 | 92.9 |
| 8 | 8 | 0.0 | 27 | 1146 | 92.9 |
| 9 | 9 | 0.0 | 29 | 1053 | 90.4 |
| 10 | 10 | 0.0 | 40 | 939 | 85.2 |
| 11 | 11 | 0.0 | 45 | 915 | 83.7 |
| 12 | 12 | 0.0 | 31 | 1042 | 87.8 |
| 13 | 13 | 0.0 | 34 | 994 | 86.7 |
| 14 | 14 | 0.0 | 25 | 1259 | 93.7 |
| 15 | 15 | 0.0 | 25 | 1259 | 93.7 |
| 16 | 16 | 0.0 | 26 | 1206 | 92.7 |
| 17 | 17 | 6.2 | 27 | 1575 | 92.2 |
| 18 | 18 | 6.2 | 27 | 1575 | 92.2 |
| 19 | 19 | 4.8 | 28 | 1530 | 91.5 |
| 20 | 20 | 0.0 | 26 | 1038 | 93.5 |
| 21 | 21 | 0.0 | 26 | 1038 | 93.5 |
| 22 | 22 | 0.0 | 28 | 961 | 91.6 |
| 23 | 23 | 0.0 | 25 | 1535 | 94.7 |
| 24 | 24 | 0.0 | 25 | 1535 | 94.7 |
| 25 | 25 | 0.0 | 27 | 1439 | 93.3 |
| 26 | 26 | 0.0 | 26 | 1190 | 93.4 |
| 27 | 27 | 0.0 | 26 | 1190 | 93.4 |
| 28 | 28 | 0.0 | 27 | 1085 | 91.8 |
| 29 | 29 | 0.0 | 23 | 1056 | 94.6 |
| 30 | 30 | 0.0 | 23 | 1056 | 94.6 |
| 31 | 31 | 0.0 | 26 | 1187 | 93.5 |
| 32 | 32 | 0.0 | 25 | 983 | 92.6 |
| 33 | 33 | 0.0 | 25 | 983 | 92.6 |
| 34 | 34 | 0.0 | 26 | 977 | 91.8 |
| 35 | 35 | 0.0 | 26 | 1029 | 92.7 |
| 36 | 36 | 0.0 | 26 | 1029 | 92.7 |
| 37 | 37 | 0.0 | 30 | 990 | 89.6 |
| 38 | 38 | 0.0 | 26 | 1124 | 92.7 |
| 39 | 39 | 0.0 | 26 | 1124 | 92.7 |
| 40 | 40 | 0.0 | 29 | 1016 | 89.4 |

TABLE 23

| Porous Sheet | Lithium Ion Battery | Fraction Defective of Manufacture 2 [%] | Internal Resistance [mΩ] | Initial Capacity [mA] | High-rate Property [%] |
|---|---|---|---|---|---|
| 41 | 41 | 3.4 | 25 | 1492 | 92.7 |
| 42 | 42 | 3.4 | 25 | 1492 | 92.7 |

TABLE 23-continued

| Porous Sheet | Lithium Ion Battery | Fraction Defective of Manufacture 2 [%] | Internal Resistance [mΩ] | Initial Capacity [mA] | High-rate Property [%] |
|---|---|---|---|---|---|
| 43 | 43 | 2.0 | 27 | 1373 | 91.3 |
| 44 | 44 | 0.0 | 26 | 1300 | 93.9 |
| 45 | 45 | 0.0 | 26 | 1300 | 93.9 |
| 46 | 46 | 0.0 | 28 | 1185 | 91.7 |
| 47 | 47 | 0.0 | 26 | 1042 | 93.2 |
| 48 | 48 | 0.0 | 26 | 1042 | 93.2 |
| 49 | 49 | 0.0 | 27 | 1010 | 91.8 |
| 50 | 50 | 0.4 | 26 | 1480 | 91.6 |
| 51 | 51 | 0.4 | 26 | 1480 | 91.6 |
| 52 | 52 | 0.0 | 27 | 1408 | 90.1 |
| 53 | 53 | 0.0 | 26 | 1360 | 92.5 |
| 54 | 54 | 0.0 | 26 | 1360 | 92.5 |
| 55 | 55 | 0.0 | 29 | 1245 | 90.7 |
| 56 | 56 | 0.0 | 25 | 1516 | 94.0 |
| 57 | 57 | 0.0 | 25 | 1516 | 94.0 |
| 58 | 58 | 0.0 | 26 | 1415 | 93.1 |
| 59 | 59 | 0.0 | 26 | 1130 | 92.8 |
| 60 | 60 | 0.0 | 26 | 1130 | 92.8 |
| 61 | 61 | 0.0 | 32 | 1020 | 88.7 |
| 62 | 62 | 0.0 | 29 | 1105 | 92.1 |
| 63 | 63 | 0.0 | 29 | 1105 | 92.1 |
| 64 | 64 | 0.0 | 29 | 1038 | 90.6 |
| 65 | 65 | 7.0 | 27 | 1530 | 91.0 |
| 66 | 66 | 7.0 | 27 | 1530 | 91.0 |
| 67 | 67 | 5.6 | 29 | 1450 | 90.2 |
| 68 | 68 | 0.0 | 28 | 1111 | 91.8 |
| 69 | 69 | 0.0 | 28 | 1111 | 91.8 |
| 70 | 70 | 0.0 | 31 | 1041 | 89.8 |
| 71 | 71 | 0.0 | 20 | 1093 | 97.8 |
| 72 | 72 | 0.0 | 20 | 1170 | 97.8 |
| 73 | 73 | 0.0 | 23 | 1215 | 96.4 |
| 74 | 74 | 0.0 | 25 | 1275 | 94.8 |
| 75 | 75 | 0.0 | 26 | 1297 | 93.6 |
| 76 | 76 | 0.0 | 29 | 1327 | 91.7 |
| 77 | 77 | 0.0 | 33 | 1321 | 89.7 |
| 78 | 78 | 0.0 | 41 | 1057 | 88.5 |
| 79 | 79 | 0.0 | 26 | 1297 | 93.6 |
| 80 | 80 | 0.0 | 28 | 1206 | 91.7 |

TABLE 24

| Porous Sheet | Lithium Ion Battery | Fraction Defective of Manufacture 2 [%] | Internal Resistance [mΩ] | Initial Capacity [mA] | High-rate Property [%] |
|---|---|---|---|---|---|
| 81 | 81 | 0.0 | 25 | 1153 | 92.8 |
| 82 | 82 | 0.0 | 25 | 1153 | 92.8 |
| 83 | 83 | 0.0 | 30 | 1025 | 89.7 |
| 84 | 84 | 0.0 | 25 | 1159 | 93.1 |
| 85 | 85 | 0.0 | 25 | 1159 | 93.1 |
| 86 | 86 | 0.0 | 28 | 1033 | 90.6 |
| 87 | 87 | 0.0 | 25 | 956 | 93.2 |
| 88 | 88 | 0.0 | 25 | 956 | 93.2 |
| 89 | 89 | 0.0 | 26 | 940 | 92.4 |
| 90 | 90 | 0.0 | 25 | 1120 | 92.6 |
| 91 | 91 | 0.0 | 25 | 1120 | 92.6 |
| 92 | 92 | 0.0 | 26 | 1078 | 91.4 |
| 93 | 93 | 0.0 | 25 | 1265 | 92.7 |
| 94 | 94 | 0.0 | 25 | 1265 | 92.7 |
| 95 | 95 | 0.0 | 27 | 1180 | 91.7 |
| 96 | 96 | 0.0 | 26 | 1180 | 92.3 |
| 97 | 97 | 0.0 | 26 | 1180 | 92.2 |
| 98 | 98 | 0.0 | 27 | 1070 | 92.2 |
| 99 | 99 | 0.0 | 26 | 1350 | 90.4 |
| 100 | 100 | 0.0 | 26 | 1350 | 91.3 |
| 101 | 101 | 0.0 | 29 | 1230 | 91.3 |
| 102 | 102 | 0.0 | 33 | 1003 | 89.5 |
| 103 | 103 | 0.0 | 33 | 1003 | 85.0 |
| 104 | 104 | 0.0 | 38 | 980 | 82.9 |
| 105 | 105 | 0.0 | 32 | 1320 | 84.5 |
| 106 | 106 | 0.0 | 32 | 1320 | 84.5 |

TABLE 24-continued

| Porous Sheet | Lithium Ion Battery | Fraction Defective of Manufacture 2 [%] | Internal Resistance [mΩ] | Initial Capacity [mA] | High-rate Property [%] |
|---|---|---|---|---|---|
| 107 | 107 | 0.0 | 37 | 1113 | 82.7 |
| 108 | 108 | 0.0 | 22 | 910 | 93.0 |
| 109 | 109 | 0.0 | 56 | 872 | 80.8 |
| 110 | 110 | 0.0 | 64 | 855 | 76.0 |
| 111 | 111 | 0.0 | 60 | 867 | 78.9 |
| 112 | 112 | 0.0 | 67 | 758 | 76.1 |
| 113 | 113 | 0.0 | 69 | 722 | 75.2 |
| 114 | 114 | 24.8 | 20 | 816 | 93.9 |
| 115 | 115 | 10.2 | 20 | 889 | 95.2 |
| 116 | 116 | 19.6 | 20 | 851 | 93.9 |
| 117 | 117 | 41.4 | 61 | 620 | 84.3 |
| 118 | 118 | 32.2 | 25 | 890 | 93.7 |
| 119 | 119 | 0.0 | 58 | 1100 | 73.6 |

The porous sheets 1-107 prepared in Examples 1-107 comprise a porous substrate containing non-fibrillar fibers with an average fiber diameter of 0.01-10 μm, and a net-like structural body having penetrating pores having a pore diameter of 0.01-10 μm, wherein the net-like structural body is present at the surface and at the internal of the porous sheet, and the non-fibrillar fibers having an average fiber diameter of 0.01-10 μm and the net-like structural body are entangled. Accordingly, the net-like structural body did not separate nor breakup from the porous substrate. Each of the net-like structural bodies of the porous sheets 1-107 prepared in Examples 1-107 had a plane area percentage of pore of 10% or higher. In addition, the net-like structural bodies of the porous sheets 1-107 have 20 or more penetrating pores in a square region having 10-fold length of the average pore diameter as a side of the square. As shown in Tables 16-21, the porous sheets 1-107 are excellent in the balance between the electrolytic solution permeability and dry-up resistance, even though the thickness is as thin as 37 μm or less. The electrical double layer capacitors 1-107 provided with the porous sheets 1-107 have low fraction defective of manufacture, little current leakage, and a low internal resistance, and are excellent regarding lifetime. In addition, as shown in Tables 22-24, the lithium ion batteries 1-107 provided with the porous sheets 1-107 have a low internal resistance and a large initial capacity, and are excellent in high-rate property.

When the porous sheets 9, 12 and 13, which were prepared by a similar method using the same porous substrate and the same polymer, are compared, the porous sheet 13 has a density higher than 0.90 g/cm$^3$, and thus has somewhat inferior electrolytic solution permeability than the porous sheets 9 and 12. Therefore, the internal resistance of the electrical double layer capacitor provided with the porous sheet 13 was somewhat higher than the electrical double layer capacitors provided with the porous sheets 9 or 12. The lithium ion battery provided with the porous sheet 13 had an internal resistance somewhat higher, an initial capacity somewhat less, and a high-rate property somewhat lower, compared with the lithium ion batteries provided with the porous sheets 9 or 12.

When the porous sheets 71-78, which were prepared by a similar method using the same porous substrate and the same polymer, are compared, the porous sheet 71 has a density lower than 0.30 g/cm$^3$, and thus current leakage of the electrical double layer capacitor provided with the porous sheet 71 was somewhat larger than the electrical double layer capacitors provided with the porous sheets 72-78. In addition, the lithium ion battery provided with the porous sheet 71 had an initial capacity somewhat less than the lithium ion batteries provided with the porous sheets 72-77.

Since the porous sheet 78 has density higher than 0.90 g/cm$^3$, its electrolytic solution permeability is somewhat inferior than the porous sheets 71-77, and the internal resistance of the electrical double layer capacitor provided with the porous sheet 78 was somewhat higher than the electrical double layer capacitors provided with the porous sheets 71-77. In addition, the internal resistance of the lithium ion battery provided with the porous sheet 78 was somewhat higher than the lithium ion batteries provided with the porous sheets 71-77.

As shown in FIG. 4, the surface of the porous sheet 11 of Example 11 is covered with a net-like structural body, and a part of the non-fibrillar fibers having an average fiber diameter of 0.01-10 μm is not exposed at the surface of the porous sheet.

Therefore, the electrolytic solution permeability was somewhat inferior when compared with the porous sheets 4-10, 12, 14-77, 79-103, 105 and 106 of Examples 4-10, 12, 14-77, 79-103, 105 and 106, in which a part of the non-fibrillar fibers having an average fiber diameter of 0.01-10 μm is exposed at the surface of the porous sheet. The internal resistance of the electrical double layer capacitor 11 provided with the porous sheet 11 was somewhat higher than the electrical double layer capacitors 4-10 and 12-107 provided with the porous sheets 4-10 and 12-107. In addition, the internal resistance of the lithium ion battery 11 provided with the porous sheet 11 was somewhat higher than the lithium ion batteries 4-10 and 12-107 provided with the porous sheets 4-10 and 12-107.

When the porous sheets 1, 2, 7, 8, 62, 63, 68, 69, 102 and 103, which contain the same porous substrate and have a close content of polymer precipitant, are compared, since the net-like structural bodies of the porous sheets 1, 2, 62, 63, 68 and 69 are structured by polyamide, the puncture strength when it is in a state impregnated with the electrolytic solution was strong and excellent than the porous sheets 7, 8, 102 and 103, of which net-like structural bodies were structured by polymer other than polyamide. In particular, the net-like structural bodies of porous sheets 17-101 are excellent since they are aromatic polyamide containing an aromatic diamine derivative unit represented by the general formula (1) or an aromatic dicarboxylic acid derivative unit represented by the general formula (2), and the plane area percentage of pore is high.

The porous sheets 7-13 prepared in Examples 7-13 are excellent since they contain a net-like structural body which is structured with polyethersulfone that has high solubility in organic solvents and easily forms the net-like structural body, and are prepared by the first, second, and third manufacturing methods according to the present invention, and thus the area share of the net-like structural body having penetrating pores with a pore diameter of 0.01-10 μm is high. The porous sheet 3 prepared in Example 3 contains a net-like structural body structured with polyethersulfone; however, was prepared by a manufacturing method other than the first, second, and third manufacturing methods according to the present invention. Therefore, the area share of the net-like structural body having penetrating pores with a pore diameter of 0.01-10 μm was low.

The porous sheets 14-16 prepared in Examples 14-16 are excellent since they contain a net-like structural body which is structured with polyamide imide that has high solubility in organic solvents and easily forms the net-like structural body, and thus the area share and the plane area percentage of pore of the net-like structural body having penetrating pores with a pore diameter of 0.01-10 μm are high.

Although the porous sheets 1-16, 26-31, 38-46, 53-64, 68-86 and 93-107 prepared in Examples 1-16, 26-31, 38-46, 53-64, 68-86 and 93-107 contain cellulose fibers, the net-like structural body suppressed the degradation of the cellulose fibers caused by the voltage. Therefore, the electrical double layer capacitors provided with the porous sheets were excellent and had a longer lifetime than one provided with the porous sheet 118 consisting of 100% cellulose which does not contain a net-like structural body.

With respect to the porous sheet 108 in Comparative Example 1, the porous substrate does not contain non-fibrillar fibers having an average fiber diameter of 0.01-10 μm, and is structured with a thick fiber having an average fiber diameter of more than 10 μm. Therefore, there were many pinholes. The electrical double layer capacitor 108 provided with the porous sheet 108 had a large amount of current leakage, and its lifetime was short. In addition, the lithium ion battery 108 provided with the porous sheet 108 had a small initial capacity.

With respect to the porous sheet 109 in Comparative Example 2, the porous substrate does not contain non-fibrillar fibers having an average fiber diameter of 0.01-10 μm, and is structured with only the fibers having an average fiber diameter of less than 0.01 μm. Therefore, the air-gaps between the fibers of the porous substrate are too small, and the net-like structural body is formed intensively at the surface of the porous substrate. This resulted in poor electrolytic solution permeability. The electrical double layer capacitor 109 provided with the porous sheet 109 had a high internal resistance. In addition, the lithium ion battery 109 provided with the porous sheet 109 had a high internal resistance, and its high-rate property was low. Further, since the fibers structuring the porous substrate and the net-like structural body are not entangled, interlayer delamination of the net-like structural body from the porous substrate occurred easily.

The porous sheet 110 in Comparative Example 3 is, as shown in FIG. 13, structured so that the porous body comprising an aromatic polyamide completely covers both surfaces of the porous substrate. Therefore, the electrolytic solution permeability was poor. The porous body comprising an aromatic polyamide has a plane area percentage of pore of less than 10%, and thus the contact resistance with the electrode becomes large. Therefore, the electrical double layer capacitor 110 provided with the porous sheet 110 had a high internal resistance, and its lifetime was short. In addition, the lithium ion battery 110 provided with the porous sheet 110 had a small initial capacity.

With respect to the porous sheet 111 in Comparative Example 4, a porous body comprising an aromatic polyamide was formed on both surfaces of the porous substrate, and a film comprising an aromatic polyamide was formed under the porous body so as to cover the entire surface of the porous substrate. The plane area percentage of pore of the porous body was less than 10%, and the electrolytic solution permeability was poor. The electrical double layer capacitor 111 provided with the porous sheet 111 had a high internal resistance, and its lifetime was short. In addition, the lithium ion battery 111 provided with the porous sheet 111 had a small initial capacity.

With respect to the porous sheet 112 in Comparative Example 5, a polyethersulfone film without penetrating pores is formed on both surfaces of the porous substrate, as shown in FIG. 14. Therefore, the electrolytic solution permeability and dry-up resistance were poor. The electrical double layer capacitor 112 provided with the porous sheet 112 had an extremely high internal resistance, and its lifetime was short. The lithium ion battery 112 provided with the porous sheet 112 had a high internal resistance and a small initial capacity, and its high-rate property was low.

With respect to the porous sheet 113 in Comparative Example 6, an acryl film without penetrating pores was formed on both surfaces of the porous substrate, and thus the electrolytic solution permeability and the dry-up resistance were poor. The electrical double layer capacitor 113 provided with the porous sheet 113 had an extremely high internal resistance, and its lifetime was short. The lithium ion battery 113 provided with the porous sheet 113 had a high internal resistance and a small initial capacity, and its high-rate property was low.

With respect to the porous sheet 114 in Comparative Example 7, since it was structured only by the porous substrate 3 and had no net-like structural body, the puncture strength when it is in a state impregnated with the electrolytic solution was weaker than the porous sheets 1-16, 26-31, 62-64, 68-70, 93-98 and 102-104 in Examples 1-16, 26-31, 62-64, 68-70, 93-98 and 102-104, which were structured with the porous substrate 3 and the net-like structural body. The electrical double layer capacitor 114 provided with the porous sheet 114 had a higher fraction defective of manufacture and a larger current leakage, and its lifetime was shorter, when compared with the electrical double layer capacitors 1-16, 26-31, 62-64, 68-70, 93-98 and 102-104, which were provided with the porous sheets 1-16, 26-31, 62-64, 68-70, 93-98 and 102-104. The lithium ion battery 114 provided with the porous sheet 114 had a higher fraction defective of manufacture when compared with the lithium ion batteries 1-16, 26-31, 62-64, 68-70, 93-98 and 102-104, which were provided with the porous sheets 1-16, 26-31, 62-64, 68-70, 93-98 and 102-104.

With respect to the porous sheet 115 in Comparative Example 8, since it was structured only by the porous substrate 1 and had no net-like structural body, the puncture strength when it is in a state impregnated with the electrolytic solution was weaker than the porous sheets 17-19 and 65-67 in Examples 17-19 and 65-67, which were structured with the porous substrate 1 and the net-like structural body. The electrical double layer capacitor 115 provided with the porous sheet 115 had a higher fraction defective of manufacture and a larger current leakage, and its lifetime was shorter, when compared with the electrical double layer capacitors 17-19 and 65-67, which were provided with the porous sheets 17-19 and 65-67. The lithium ion battery 115 provided with the porous sheet 115 had a higher fraction defective of manufacture when compared with the lithium ion batteries 17-19 and 65-67, which were provided with the porous sheets 17-19 and 65-67.

With respect to the porous sheet 116 in Comparative Example 9, since it was structured only by the porous substrate 5 and had no net-like structural body, the puncture strength when it is in a state impregnated with the electrolytic solution was weaker than the porous sheets 20-22, 35-37, 47-49 and 90-92 in Examples 20-22, 35-37, 47-49 and 90-92, which were structured with the porous substrate 5 and the net-like structural body. The electrical double layer capacitor 116 provided with the porous sheet 116 had a higher fraction defective of manufacture and a larger current leakage, and its lifetime was shorter, when compared with the electrical double layer capacitors 20-22, 35-37, 47-49 and 90-92, which were provided with the porous sheets 20-22, 35-37, 47-49 and 90-92. The lithium ion battery 116 provided with the porous sheet 116 had a higher fraction defective of manufacture when compared with the lithium ion batteries 20-22, 35-37, 47-49 and 90-92, which were provided with the porous sheets 20-22, 35-37, 47-49 and 90-92.

With respect to the porous sheet 117 in Comparative Example 10, since it was structured only by the porous substrate 11 and had no net-like structural body, the electrolytic solution permeability was poor, and the puncture strength in a state impregnated with the electrolytic solution was weak. The electrical double layer capacitor 117 provided with the porous sheet 117 had a high fraction defective of manufacture and an extremely high internal resistance, and its lifetime was short. The lithium ion battery 117 provided with the porous sheet 117 had a high internal resistance, and its initial capacity was small.

With respect to the porous sheet 118 used in Comparative Example 11, it was structured with 100% cellulose which is easily oxidized with high voltage, and thus the puncture strength in a state impregnated with the electrolytic solution was extremely weak. The electrical double layer capacitor 118 provided with the porous sheet 118 had a high fraction defective of manufacture, and its lifetime was short. The lithium ion battery 118 provided with the porous sheet 118 had a high fraction defective of manufacture.

With respect to the porous sheet 119 used in Comparative Example 12, it was structured with a porous film, and thus the electrolytic solution permeability was extremely poor. The electrical double layer capacitor 119 provided with the porous sheet 119 had an extremely high internal resistance, and its lifetime was short. The lithium ion battery 119 provided with the porous sheet 119 had a high internal resistance.

The porous sheet 1 in Example 1 is manufactured by impregnating a porous substrate containing non-fibrillar fibers having an average fiber diameter of 0.01-10 μm, with a polymer solution having an organic solvent as the main medium, followed by immersion of the substrate in an aqueous solution, thereby allowing precipitation of a net-like structural body comprising the polymer. Therefore, the content of the net-like structural body is low, and has poor electrolytic solution permeability when compared with the porous sheets 4-10, 12, 14-77, 79-103, 105 and 106. In addition, contact area with the electrode is large, and thus the electrical double layer capacitor provided with the porous sheet 1 had an internal resistance somewhat higher when compared with the electrical double layer capacitors provided with the porous sheets 4-10, 12, 14-77, 79-103, 105 or 106.

The porous sheets 2 and 3 in Examples 2 and 3 are manufactured by impregnating a porous substrate containing non-fibrillar fibers having an average fiber diameter of 0.01-10 μm with a polymer solution having an organic solvent as the main medium, and then allowing the substrate to come in contact with an aqueous solution, thereby allowing precipitation of a net-like structural body comprising the polymer. Therefore, the content of the net-like structural body is low, and has poor electrolytic solution permeability when compared with the porous sheets 4-10, 12, 14-77, 79-103, 105 and 106. In addition, contact area with the electrode is large, and thus the electrical double layer capacitors provided with the porous sheets 2 or 3 had an internal resistance somewhat higher when compared with the electrical double layer capacitors provided with the porous sheets 4-10, 12, 14-77, 79-103, 105 or 106.

Figure 5:
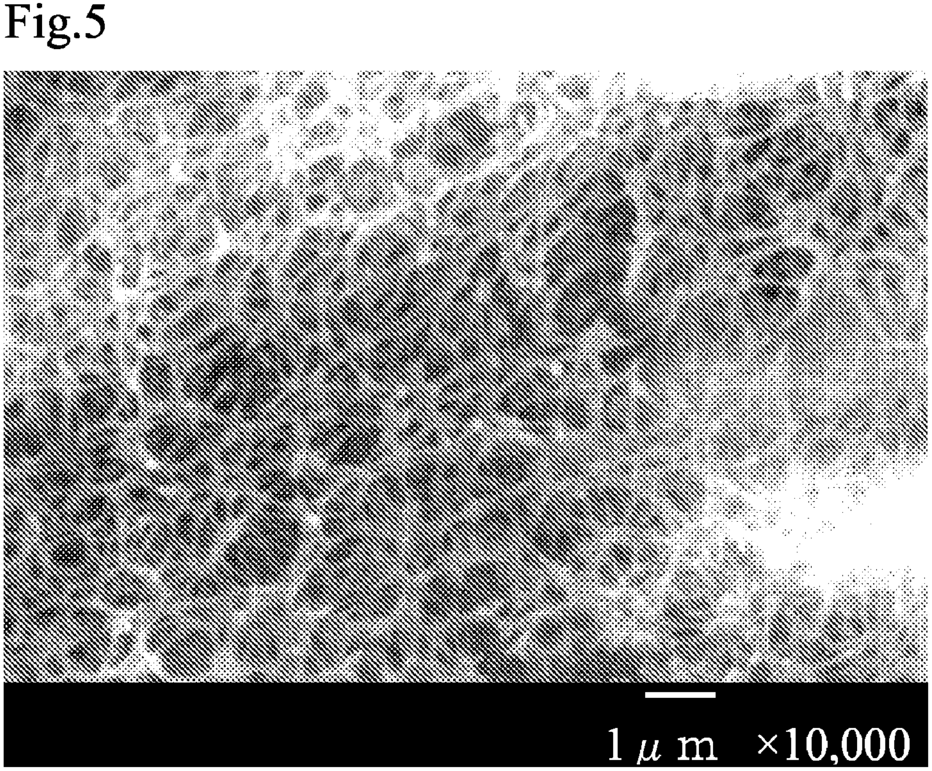
FIG. 5 shows an electron microscope photograph (10000-fold magnification) of a net-like structural body contained in a porous sheet 26 prepared in Example 26 of the present invention.
Figure 6:
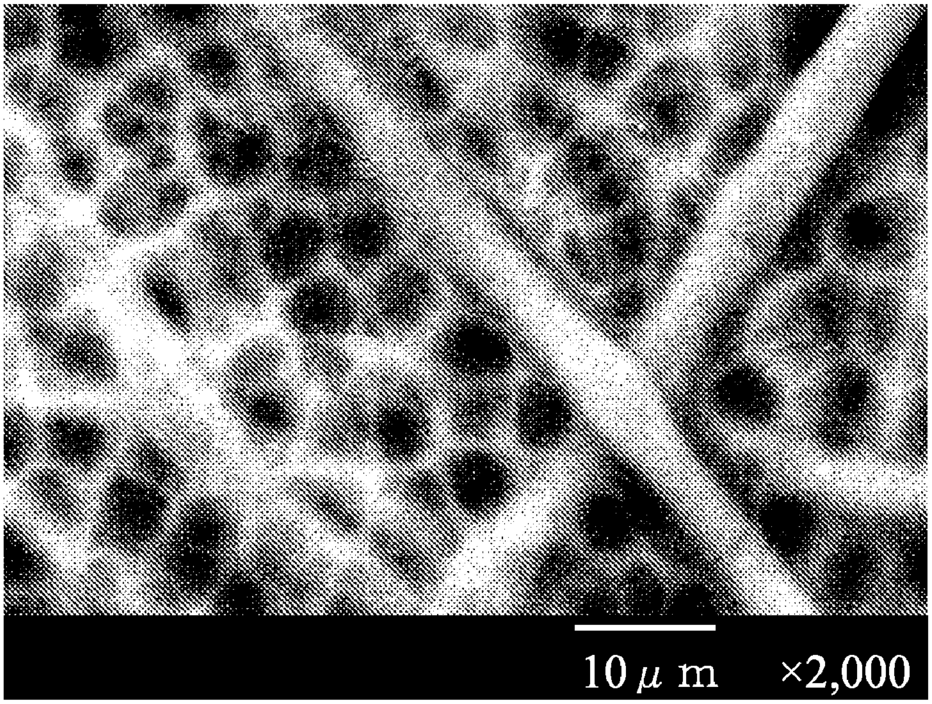
FIG. 6 shows an electron microscope photograph (2000-fold magnification) of a net-like structural body contained in a porous sheet 6 prepared in Example 6 of the present invention.
Figure 7:
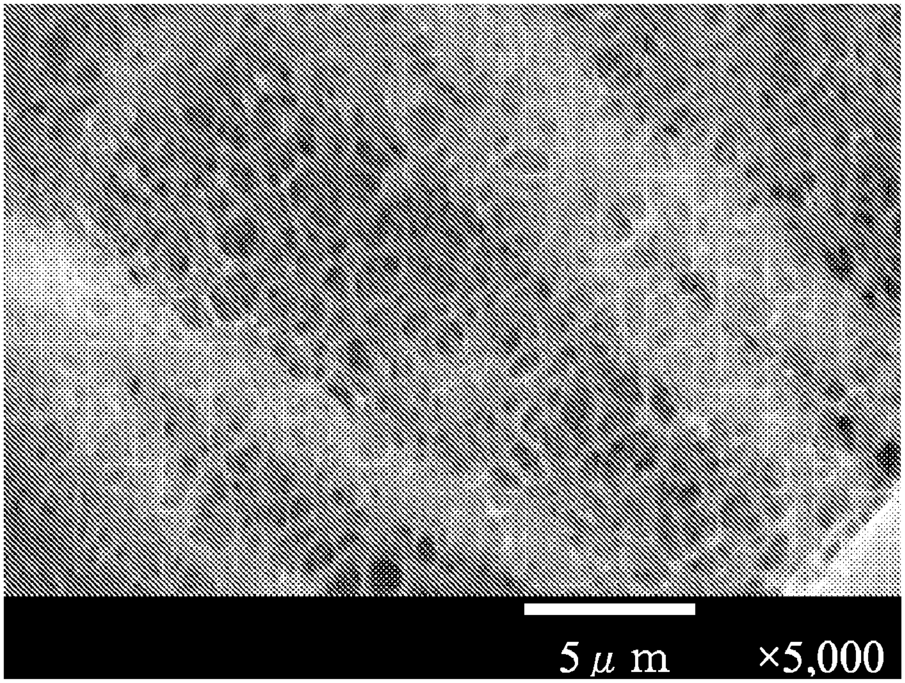
FIG. 7 shows an electron microscope photograph (5000-fold magnification) of a net-like structural body contained in a porous sheet 28 prepared in Example 28 of the present invention.
Figure 8:
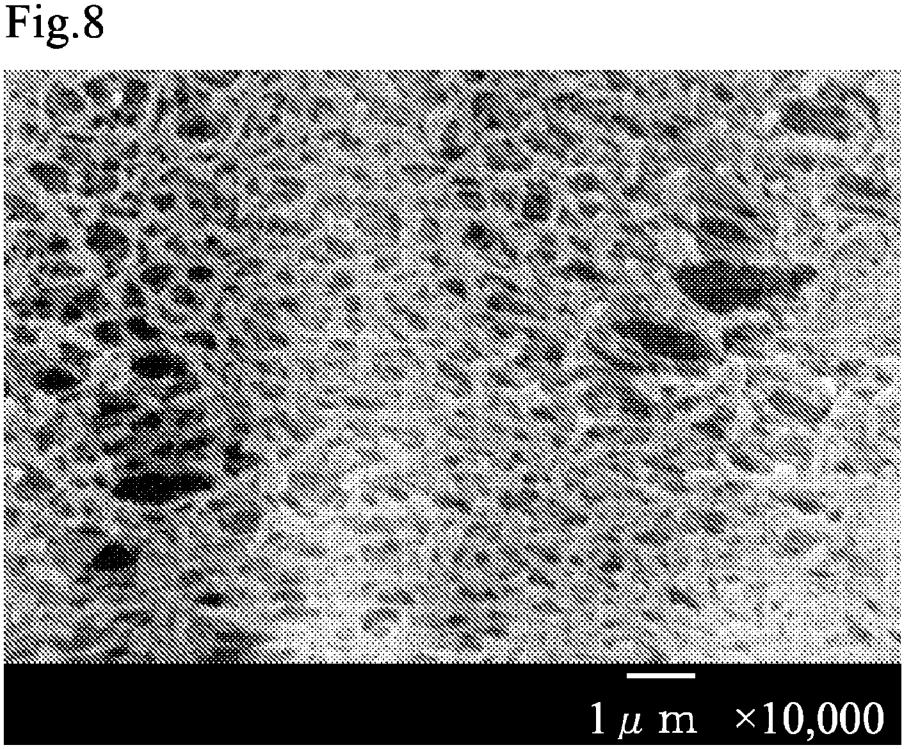
FIG. 8 shows an electron microscope photograph (10000-fold magnification) of a net-like structural body contained in a porous sheet 7 prepared in Example 7 of the present invention.
Figure 9:
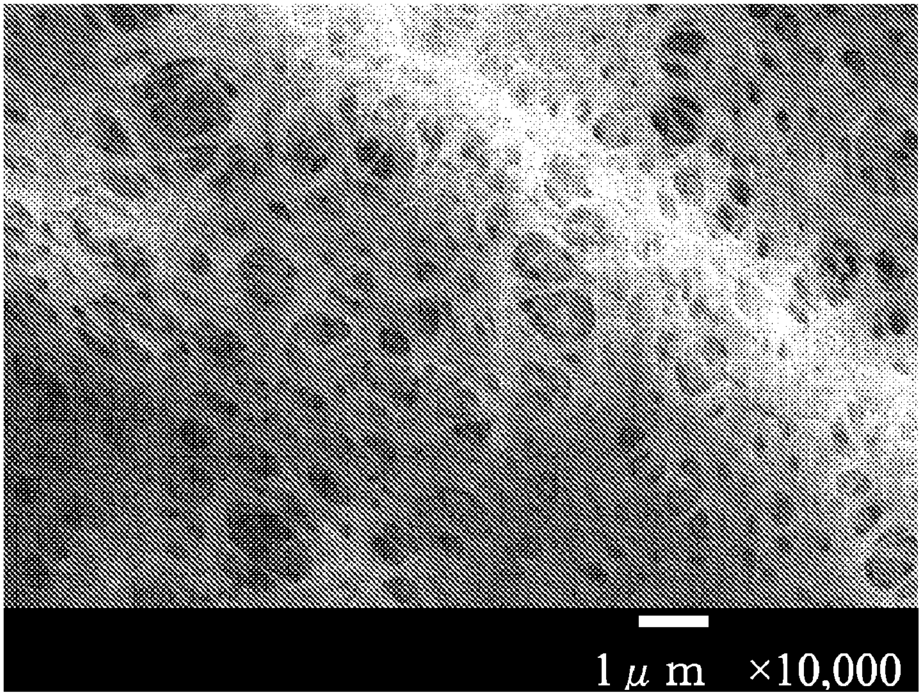
FIG. 9 shows an electron microscope photograph (10000-fold magnification) of a net-like structural body contained in a porous sheet 107 prepared in Example 107 of the present invention.
Figure 10:
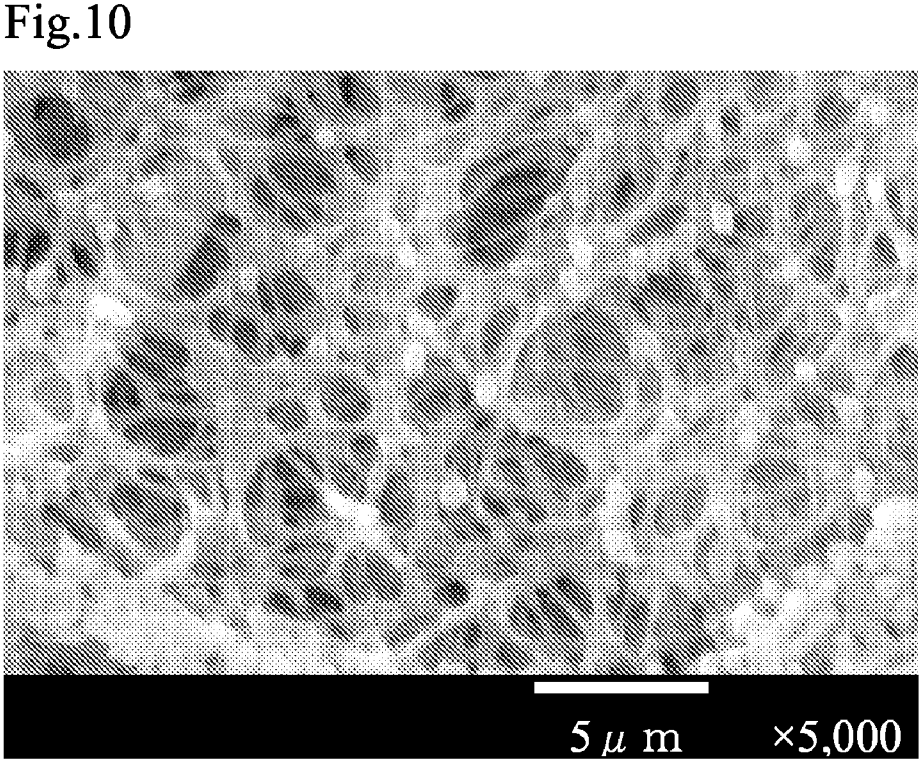
FIG. 10 shows an electron microscope photograph (5000-fold magnification) of a net-like structural body contained in a porous sheet 9 prepared in Example 9 of the present invention.

The porous sheets 4, 7, 14, 17, 20, 23, 26, 29, 32, 35, 38, 41, 44, 47, 50, 53, 56, 59, 62, 65, 68, 71-78, 81, 84, 87, 90, 93, 96, 99, 102 and 105 in Examples 4, 7, 14, 17, 20, 23, 26, 29, 32, 35, 38, 41, 44, 47, 50, 53, 56, 59, 62, 65, 68, 71-78, 81, 84, 87, 90, 93, 96, 99, 102 and 105 are manufactured by coating one surface of a porous substrate containing non-fibrillar fibers having an average fiber diameter of 0.01-10 μm, with a polymer solution having an organic solvent as the main medium, and then allowing the non-coated surface of the substrate to come in contact with an aqueous solution, thereby allowing precipitation of a net-like structural body comprising the polymer. Therefore, the content of the net-like structural body is high, as shown in FIGS. 3, 5 and 8, and thus porous sheets having an excellent balance between the electrolytic solution permeability and dry-up resistance could be manufactured efficiently.

The porous sheets 5, 8, 15, 18, 21, 24, 27, 30, 33, 36, 39, 42, 45, 48, 51, 54, 57, 60, 63, 66, 69, 79, 82, 85, 88, 91, 94, 97, 100, 103 and 106 in Examples 5, 8, 15, 18, 21, 24, 27, 30, 33, 36, 39, 42, 45, 48, 51, 54, 57, 60, 63, 66, 69, 79, 82, 85, 88, 91, 94, 97, 100, 103 and 106 are manufactured by coating one surface of a porous substrate containing non-fibrillar fibers having an average fiber diameter of 0.01-10 μm, with a polymer solution having an organic solvent as the main medium, and then allowing the substrate to be immersed in an aqueous solution, thereby allowing precipitation of a net-like structural body comprising the polymer. Therefore, the content of the net-like structural body comprising the polymer is high, as shown in FIGS. 1 and 11, and thus porous sheets having an excellent balance between the electrolytic solution permeability and dry-up resistance could be manufactured efficiently.

The porous sheets 6, 9-13, 16, 19, 22, 25, 28, 31, 34, 37, 40, 43, 46, 49, 52, 55, 58, 61, 64, 67, 70, 80, 83, 86, 89, 92, 95, 98, 101, 104 and 107 in Examples 6, 9-13, 16, 19, 22, 25, 28, 31, 34, 37, 40, 43, 46, 49, 52, 55, 58, 61, 64, 67, 70, 80, 83, 86, 89, 92, 95, 98, 101, 104 and 107 are manufactured by impregnating a porous substrate containing non-fibrillar fibers having an average fiber diameter of 0.01-10 μm and a porous support in a laminated state, with a polymer solution having an organic solvent as the main medium, and then allowing the surface of the porous support in a state that the porous substrate and the porous support are laminated to come in contact with an aqueous solution, thereby allowing precipitation of a net-like structural body comprising the polymer, followed by peeling off of the porous support from the porous substrate. Therefore, the content of the net-like structural body is high, as shown in FIGS. 2, 4, 6, 7, 9, 10 and 12, and thus porous sheets having an excellent balance between the electrolytic solution permeability and dry-up resistance could be manufactured.

INDUSTRIAL APPLICABILITY

In the present invention, a porous sheet which is suitable as a separator for an electrochemical element which elongates the lifetime of the electrochemical element, thin, has good balance between the electrolytic solution permeability and dry-up resistance, and is superior in high-rate property, was obtained. In addition, the manufacturing method of the porous sheet according to the present invention provided a porous sheet without the disadvantage such as film formation and wrinkles, even when a polymer other than an aromatic polyamide, or a special aromatic polyamide was used. As an application example of the porous sheet according to the present invention, a separator for an electrochemical element such as an electrical double layer capacitor, an electrolytic capacitor, a solid electrolytic capacitor, a lithium ion battery, a polyacene battery, an organic radical battery or the like, an ultrafiltration membrane, an air filter, an oil filter, a blood filter of the like are preferable.

The invention claimed is:

1. A porous sheet comprising:

a porous substrate containing non-fibrillar fibers having an average fiber diameter of 0.01-10 μm; and a net-like structural body composed of a polymer, the net-like structural body having penetrating pores with a pore diameter of 0.01-10 μm; wherein the net-like structural body is present at the surface and at the internal of the porous substrate, and the non-fibrillar fibers having an average fiber diameter of 0.01-10 μm and the net-like structural body are entangled.

2. The porous sheet according to claim 1, wherein the net-like structural body has 20 or more penetrating pores, in a square region having 10-fold length of an average pore diameter of the penetrating pores as a side of the square.

3. The porous sheet according to claim 2, wherein the polymer structuring the net-like structural body is at least one selected from the group consisting of polyamide, polyethersulfone, and polyamide imide.

4. The porous sheet according to claim 3, wherein the polymer structuring the net-like structural body is polyamide, and the polyamide comprises an aromatic polyamide containing an aromatic diamine derivative unit represented by the following general formula (1), and/or an aromatic dicarboxylic acid derivative unit represented by the following general formula (2):

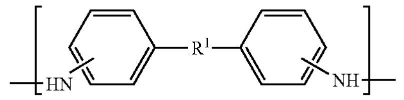

(1)

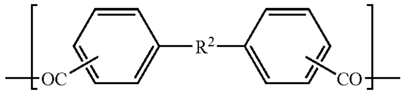

(2)

wherein, $R^1$ and $R^2$ independently represent —O—, —NH—, —S—, a sulfonyl group, a carbonyl group, a carbonate group, an urea group, an urethane group, an arylene group, an alkylene group having 1-30 carbons, and an alkenylene group having 2-30 carbons.

5. A separator for an electrochemical element comprising the porous sheet according to claim 4.

6. A separator for an electrochemical element comprising the porous sheet according to claim 3.

7. A separator for an electrochemical element comprising the porous sheet according to claim 2.

8. The porous sheet according to claim 1, wherein the polymer structuring the net-like structural body is at least one selected from the group consisting of polyamide, polyethersulfone, and polyamide imide.

9. The porous sheet according to claim 8, wherein the polymer structuring the net-like structural body is polyamide, and the polyamide comprises an aromatic polyamide containing an aromatic diamine derivative unit represented by the following general formula (1), and/or an aromatic dicarboxylic acid derivative unit represented by the following general formula (2):

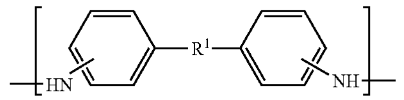

(1)

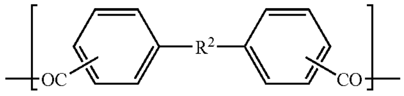

(2)

wherein, $R^1$ and $R^2$ independently represent —O—, —NH—, —S—, a sulfonyl group, a carbonyl group, a carbonate group, an urea group, an urethane group, an arylene group, an alkylene group having 1-30 carbons, and an alkenylene group having 2-30 carbons.

10. A separator for an electrochemical element comprising the porous sheet according to claim 9.

11. A separator for an electrochemical element comprising the porous sheet according to claim 8.

12. A separator for an electrochemical element comprising the porous sheet according to claim 1.

13. A method for manufacturing a porous sheet comprising:

a step of coating one surface of a porous substrate containing non-fibrillar fibers having an average fiber diameter of 0.01-10 μm with a polymer solution having an organic solvent as a main medium; and a step of allowing a surface of the porous substrate which is not coated with the polymer solution, to come in contact with an aqueous solution so as to allow precipitation of a net-like structural body composed of a polymer which entangles with the non-fibrillar fibers having an average fiber diameter of 0.01-10 μm, at a surface and at an internal of the porous substrate.

14. A method for manufacturing a porous sheet comprising:

a step of coating one surface of a porous substrate containing non-fibrillar fibers having an average fiber diameter of 0.01-10 μm with a polymer solution having an organic solvent as a main medium; and a step of immersing the porous substrate in an aqueous solution, while a surface of the porous substrate coated with the polymer solution facing up, so as to allow precipitation of a net-like structural body composed of a polymer which entangles with the non-fibrillar fibers having an average fiber diameter of 0.01-10 μm, at a surface and at an internal of the porous substrate.

15. A method for manufacturing a porous sheet comprising:

a step of laminating a porous substrate containing non-fibrillar fibers having an average fiber diameter of 0.01-10 μm and a porous support;

a step of impregnating the laminated body of the porous substrate and the porous support with a polymer solution having an organic solvent as a main medium;

a step of allowing a surface of the porous support to come in contact with an aqueous solution so as to allow precipitation of a net-like structural body composed of a polymer which entangles with the non-fibrillar fibers having an average fiber diameter of 0.01-10 μm, at a surface and at an internal of the porous substrate; and a step of peeling off the porous support from the porous substrate.

* * * * *